United States Patent
Shin et al.

(10) Patent No.: US 9,984,072 B2
(45) Date of Patent: May 29, 2018

(54) METHOD, APPARATUS, AND SYSTEM FOR PROVIDING TRANSLATED CONTENT

(71) Applicant: SAMSUNG ELECTRONICS CO., LTD., Suwon-si (KR)

(72) Inventors: Hyun-jae Shin, Seoul (KR); Hak-jung Kim, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 14/813,551

(22) Filed: Jul. 30, 2015

(65) Prior Publication Data

US 2016/0034447 A1   Feb. 4, 2016

(30) Foreign Application Priority Data

Jul. 31, 2014   (KR) .................. 10-2014-0098584
Feb. 23, 2015  (KR) .................. 10-2015-0025235

(51) Int. Cl.
*G06F 17/00*     (2006.01)
*H04L 12/00*    (2006.01)
(Continued)

(52) U.S. Cl.
CPC .......... *G06F 17/289* (2013.01); *G06F 17/275* (2013.01); *G06F 17/2836* (2013.01); *G06Q 10/107* (2013.01)

(58) Field of Classification Search
CPC .... G06F 17/271; G06F 17/274; G06F 17/275; G06F 17/277; G06F 17/289;
(Continued)

(56) References Cited

U.S. PATENT DOCUMENTS 5,175,684 A * 12/1992 Chong ................ G06F 17/2264
                                                             379/100.07
5,568,383 A * 10/1996 Johnson ............... G06Q 10/107
                                                             704/2
(Continued)

FOREIGN PATENT DOCUMENTS

JP    2002-175247 A    6/2002
JP    2013125475 A    6/2013
(Continued)

OTHER PUBLICATIONS

Communication dated Oct. 20, 2015, issued by the International Searching Authority in counterpart International Application No. PCT/KR2015/007731 (PCT/ISA/210 & PCT/ISA/237).
(Continued)

*Primary Examiner* — Fariba Sirjani
(74) *Attorney, Agent, or Firm* — Sughrue Mion, PLLC

(57) ABSTRACT

An apparatus configured to provide translated content to a receiver includes a storage configured to store address book information including identification information identifying a user of the receiver; a user inputter configured to receive input including the identification information and content to be transmitted to the receiver; a controller configured to determine a language corresponding to the user of the receiver identified by the receiver identification information based on the address book information and the identification information; and a communicator configured to transmit a request to translate the content into the determined language.

16 Claims, 50 Drawing Sheets

(51) Int. Cl.
  *H04M 1/00* (2006.01)
  *G10L 11/00* (2006.01)
  *G06Q 10/00* (2012.01)
  *G06F 17/28* (2006.01)
  *G06Q 10/10* (2012.01)
  *G06F 17/27* (2006.01)

(58) Field of Classification Search
  CPC ............ G06F 17/2715; G06F 17/2735; G06F 17/2755; G06F 17/2785; G06F 17/2795; G06F 17/2818; G06F 17/2827; G06F 17/2836; G06F 17/2863; G06F 17/2872; G06F 9/4448
  USPC ........................................................ 704/1–10
  See application file for complete search history.

(56) References Cited

U.S. PATENT DOCUMENTS

| | | | | |
|---|---|---|---|---|
| 5,884,246 A * | 3/1999 | Boucher | G06F 17/289 | 704/2 |
| 5,960,382 A * | 9/1999 | Steiner | G06F 17/2827 | 704/2 |
| 6,119,078 A * | 9/2000 | Kobayakawa | G06F 17/272 | 704/3 |
| 6,161,082 A * | 12/2000 | Goldberg | G06F 17/289 | 704/3 |
| 6,738,827 B1 * | 5/2004 | Abir | G06F 17/30864 | 704/8 |
| 6,857,022 B1 * | 2/2005 | Scanlan | G06F 17/2836 | 704/3 |
| 7,584,216 B2 * | 9/2009 | Travieso | G06F 17/289 | |
| 7,680,948 B2 * | 3/2010 | McLennan | G06Q 10/10 | 709/202 |
| 8,380,486 B2 * | 2/2013 | Soricut | G06F 17/289 | 704/2 |
| 8,468,149 B1 * | 6/2013 | Lung | G06Q 50/01 | 707/713 |
| 8,515,729 B2 * | 8/2013 | Tomko | G06F 9/4448 | 704/2 |
| 8,578,266 B2 * | 11/2013 | Davison | G06F 17/30893 | 715/234 |
| 8,831,928 B2 * | 9/2014 | Marcu | G06F 17/289 | 701/1 |
| 8,990,064 B2 * | 3/2015 | Marcu | ............................. | 704/10 |
| 9,268,762 B2 * | 2/2016 | Buryak | G06F 17/248 | |
| 2002/0004822 A1 * | 1/2002 | Azuma | G06F 17/289 | 709/206 |
| 2002/0022954 A1 * | 2/2002 | Shimohata | G06F 17/289 | 704/3 |
| 2002/0169592 A1 * | 11/2002 | Aityan | G06F 17/289 | 704/2 |
| 2002/0188670 A1 * | 12/2002 | Stringham | G06F 17/289 | 709/203 |
| 2003/0115040 A1 * | 6/2003 | Xing | G06F 17/275 | 704/8 |
| 2003/0125927 A1 * | 7/2003 | Seme | G06F 17/289 | 704/3 |
| 2004/0068411 A1 * | 4/2004 | Scanlan | G06F 17/2827 | 704/277 |
| 2004/0102956 A1 * | 5/2004 | Levin | G06F 17/2735 | 704/2 |
| 2005/0267738 A1 * | 12/2005 | Wilkinson | G06F 17/275 | 704/9 |
| 2006/0133585 A1 * | 6/2006 | Daigle | G06F 17/275 | 379/88.06 |
| 2007/0041370 A1 * | 2/2007 | Cleveland | G06F 17/289 | 370/352 |
| 2007/0287484 A1 | 12/2007 | Chava et al. | | |
| 2008/0066080 A1 * | 3/2008 | Campbell | G06F 17/3089 | 719/314 |
| 2008/0120087 A1 | 5/2008 | Scanlan | | |
| 2008/0155080 A1 * | 6/2008 | Marlow | H04L 12/581 | 709/223 |
| 2009/0217196 A1 * | 8/2009 | Neff | G06Q 10/10 | 715/799 |
| 2010/0241417 A1 * | 9/2010 | Bassett | G06F 17/289 | 704/8 |
| 2010/0284015 A1 * | 11/2010 | Sewell | G03F 7/70266 | 356/450 |
| 2010/0286977 A1 * | 11/2010 | Chin | G06F 17/289 | 704/4 |
| 2011/0010162 A1 * | 1/2011 | Elgazzar | G06F 17/289 | 704/2 |
| 2011/0035207 A1 * | 2/2011 | Abe | G06F 17/2735 | 704/2 |
| 2011/0096174 A1 * | 4/2011 | King | G06F 21/31 | 348/207.1 |
| 2011/0125485 A1 * | 5/2011 | Prakash | G06Q 10/10 | 704/3 |
| 2012/0016865 A1 * | 1/2012 | Travieso | G06F 17/2827 | 707/711 |
| 2012/0030359 A1 * | 2/2012 | Piernot | G06F 17/30887 | 709/226 |
| 2012/0316962 A1 * | 12/2012 | Rathod | G06F 17/30861 | 705/14.54 |
| 2013/0066624 A1 | 3/2013 | Pattan et al. | | |
| 2013/0318173 A1 * | 11/2013 | Kaplinger | H04L 61/301 | 709/206 |
| 2014/0173417 A1 * | 6/2014 | He | G06F 17/2247 | 715/234 |
| 2014/0229551 A1 * | 8/2014 | Carter | H04L 51/32 | 709/206 |
| 2016/0034447 A1 * | 2/2016 | Shin | G06F 17/275 | 704/3 |

FOREIGN PATENT DOCUMENTS

| | | |
|---|---|---|
| JP | 20146913 A | 1/2014 |
| KR | 2002-0043937 A | 6/2002 |
| KR | 10-2011-0058649 A | 6/2011 |
| WO | 2004042603 A2 | 5/2004 |

OTHER PUBLICATIONS

Communication dated Nov. 20, 2015, issued by the European Patent Office in counterpart European Application No. 15178504.5.

* cited by examiner

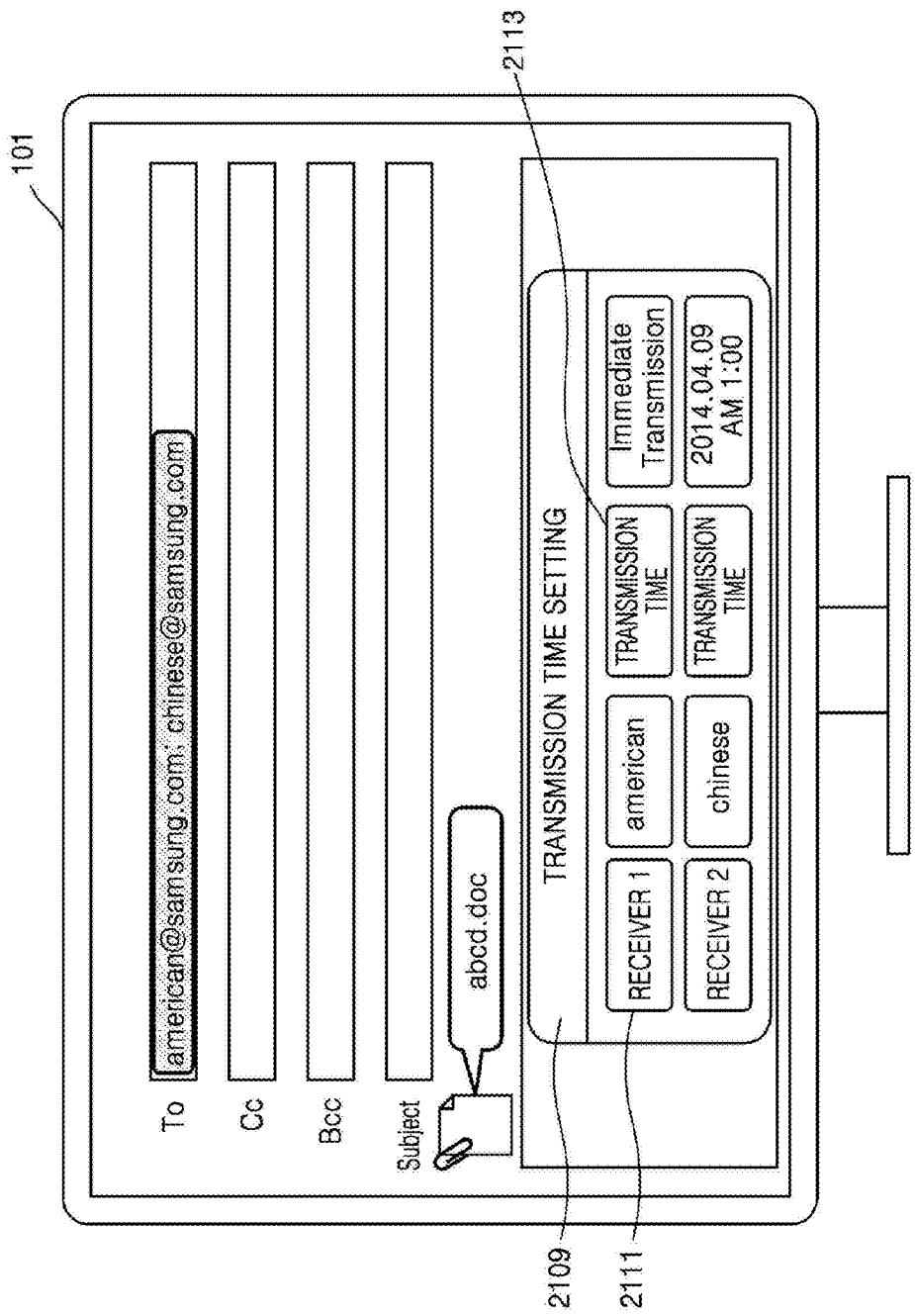

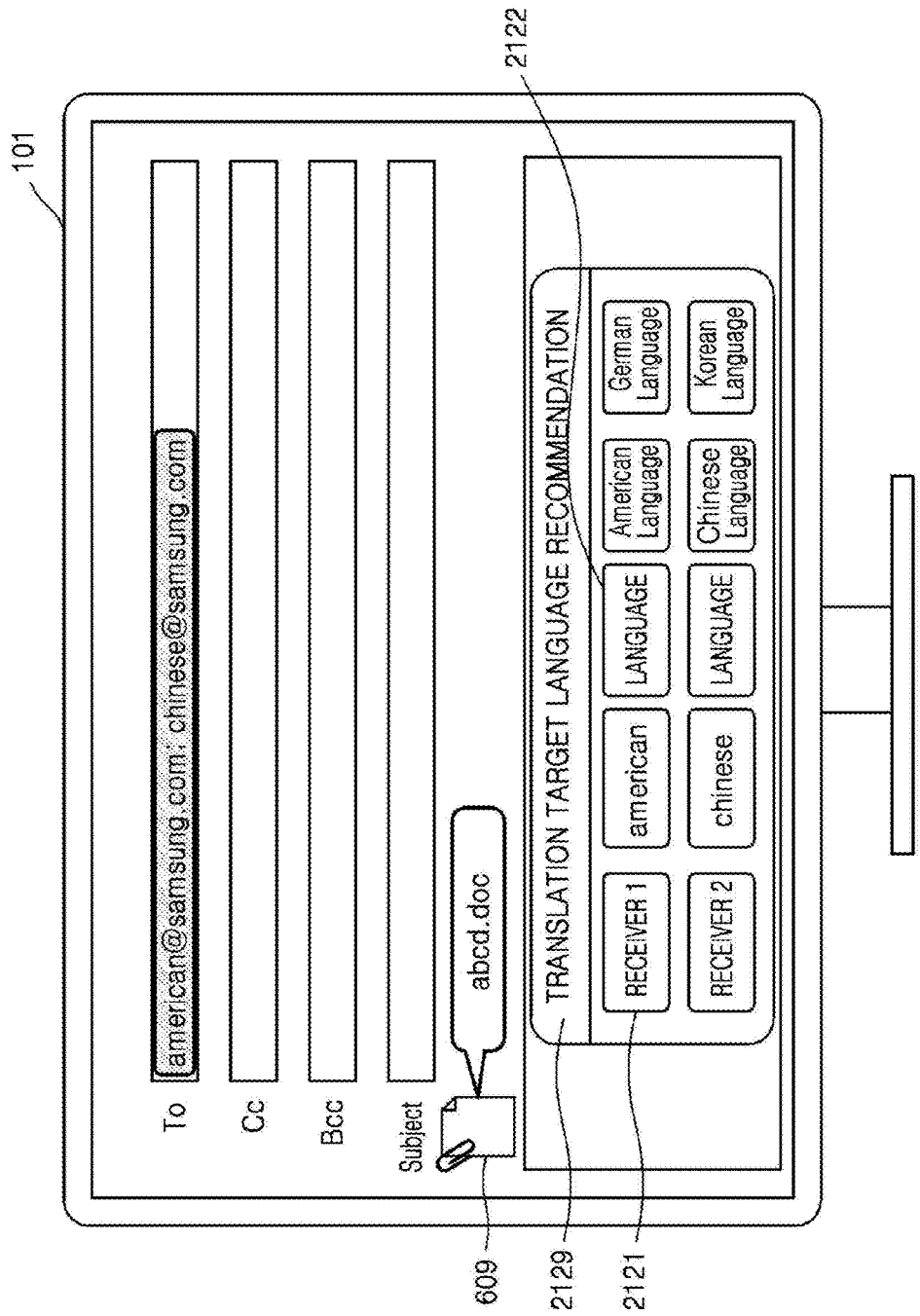

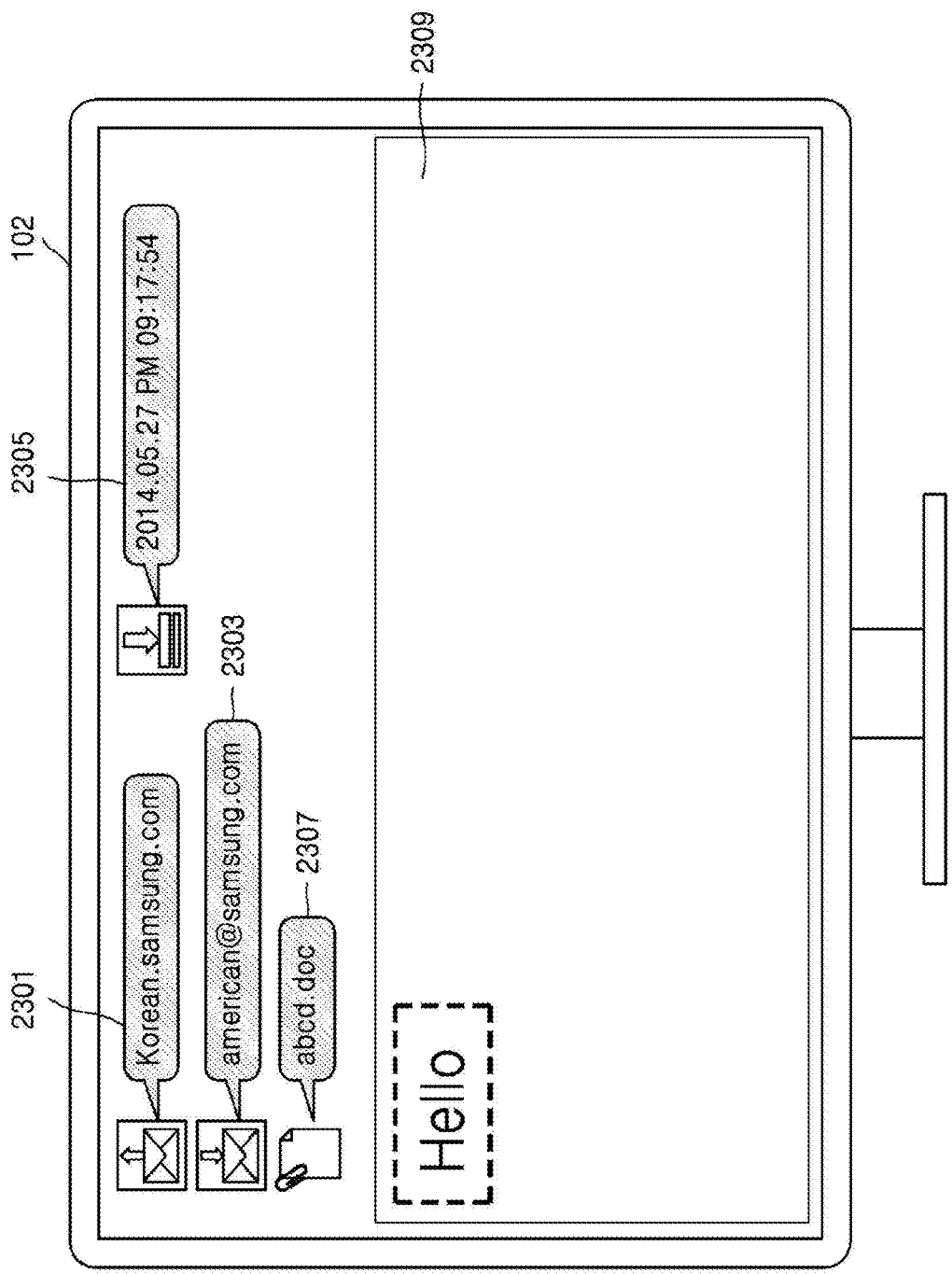

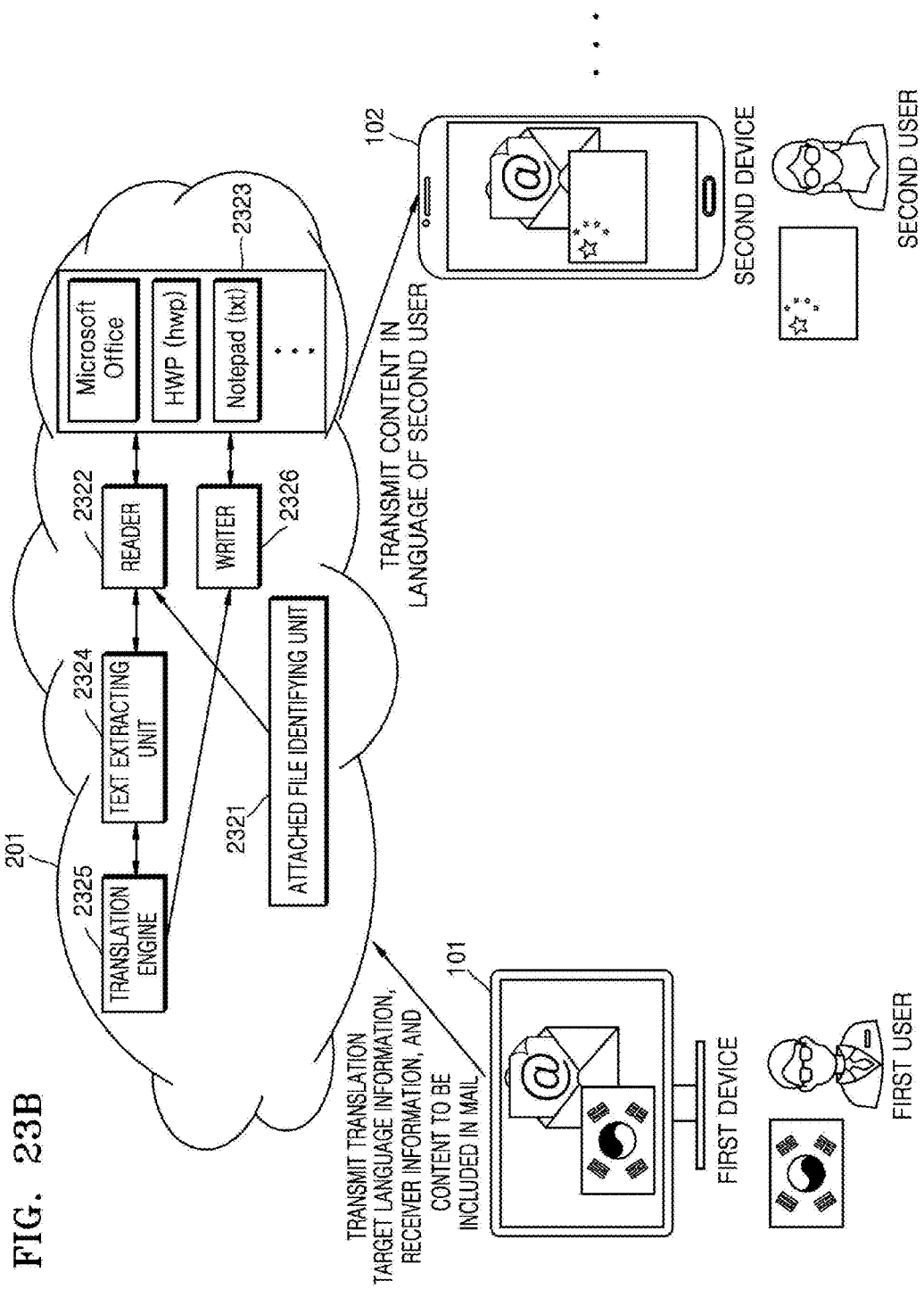

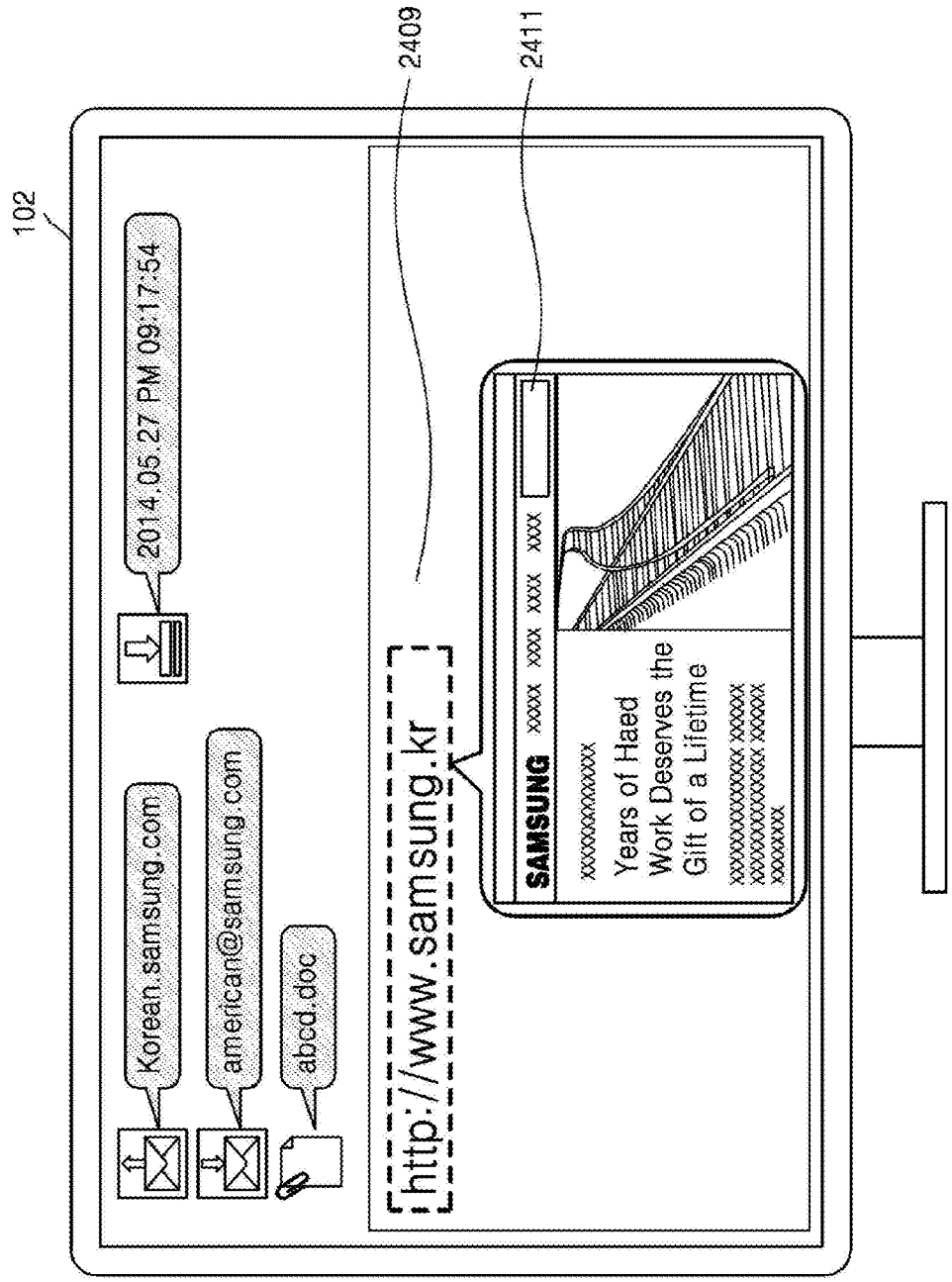

METHOD, APPARATUS, AND SYSTEM FOR PROVIDING TRANSLATED CONTENT

CROSS-REFERENCE TO RELATED APPLICATIONS

This application claims priority to Korean Patent Application No. 10-2014-0098584, filed on Jul. 31, 2014, and Korean Patent Application No. 10-2015-0025235, filed on Feb. 23, 2015, in the Korean Intellectual Property Office, the disclosures of which are incorporated herein in their entireties by reference.

BACKGROUND

1. Field

One or more exemplary embodiments relate to methods, apparatuses, and systems for providing translated content.

2. Description of the Related Art

Due to the development of communication technology, people may exchange various types of content through networks. In particular, recently, due to the globalization of business, people using various languages frequently exchange content with each other. Recently, translation technology has been rapidly developed for communication between users speaking different languages.

However, when a transmitter and a receiver use different languages, the receiver has difficulty in directly using received content and has to translate the received content in order to use the received content. Alternatively, the transmitter has to translate content in order to transmit translated content to the receiver.

SUMMARY

One or more exemplary embodiments include methods, apparatuses, and systems for providing translated content.

One or more exemplary embodiments include non-transitory computer-readable recording mediums that store programs that perform the above methods when executed by computers.

Additional aspects will be set forth in part in the description which follows and, in part, will be apparent from the description, or may be learned by practice of the presented exemplary embodiments.

According to an aspect of an exemplary embodiment, an apparatus configured to provide translated content to a receiver includes: a storage configured to store address book information including identification information identifying a user of the receiver; a user inputter configured to receive input comprising the identification information and content to be transmitted to the receiver; a controller configured to determine a language corresponding to the user of the receiver identified by the receiver identification information based on the address book information and the identification information; and a communicator configured to transmit a request to translate the content into the determined language.

The identification information may include at least one of mail account information of the user, receiver phone number information identifying the receiver, and name information identifying the user of the receiver.

The address book information may include at least one of receiver nation information identifying a nation of the user of the receiver and receiver language information identifying a language of the user of the receiver.

The user inputter may be further configured to receive input comprising an external signal for selecting a language, and the controller may be further configured to determine the language corresponding to the user of the receiver based on at least one of the identification information and the external signal.

The content may be related to electronic mail to be transmitted to the receiver.

The user inputter may be further configured to receive user input for selecting the content, and the communicator may be further configured to transmit the request to translate the selected content into the determined language to a server connected to the apparatus.

The apparatus may further include an outputter configured to display an object into which the identification information is to be input.

The content may include link information of a web page address identifying a web page, and the communicator may be further configured to transmit a request to translate the content included in the web page into the determined language to a server connected to the apparatus.

The communicator may be further configured to transmit the content to a server connected to the apparatus in response to receiving a content transmission request for the content.

The communicator may be further configured to receive content from a server connected to the apparatus, the controller may be further configured to translate the received content, and the apparatus may further include an outputter configured to output the translated content.

According to an aspect of another exemplary embodiment, a method for providing translated content to a receiver includes: acquiring receiver identification information identifying a user of the receiver and content to be transmitted to the receiver; determining a language corresponding to the user of the receiver identified by the receiver identification information based on address book information including the receiver identification information; and transmitting a request to translate the content into the determined language.

The identification information may include at least one of mail account information of the user, receiver phone number information identifying the receiver, and receiver name information identifying the user of the receiver.

The address book information may include at least one of receiver nation information identifying a nation of the user of the receiver and receiver language information identifying a language of the user of the receiver.

The determining of the language corresponding to the user of the receiver identified by the receiver identification information based on the address book information may include: acquiring an external signal for selecting a language, and determining the language corresponding to the user of the receiver based on at least one of the identification information and the external signal.

The content may be related to electronic mail to be transmitted to the receiver.

The method may further include acquiring user input for selecting the content, wherein the transmitting of the request to translate the content into the determined language may include requesting a server connected to the apparatus to translate the selected content into the determined language.

The method may further include displaying an object into which the identification information is to be input.

The content may include link information of a web page address identifying a web page, and the transmitting of the request to translate the content into the determined language may include requesting a server connected to the apparatus to translate the content included in the web page into the determined language.

The transmitting of the request to translate the content into the determined language may include: receiving a content transmission request for the content; and transmitting the content to a server connected to the apparatus.

The method may further include: receiving content from a server connected to the apparatus; translating the received content; and outputting the translated content.

BRIEF DESCRIPTION OF THE DRAWINGS

These and/or other aspects will become apparent and more readily appreciated from the following description of the exemplary embodiments, taken in conjunction with the accompanying drawings in which:

FIG. 21A is a diagram illustrating a method for setting a content transmission time according to an exemplary embodiment;

FIG. 21B is a diagram illustrating a method for recommending a content translation target language according to an exemplary embodiment;

FIGS. 23A, 23B, 24A, 24B, 25, 26, 27 and 28 are diagrams illustrating methods for outputting translated content according to exemplary embodiments;

DETAILED DESCRIPTION

Figure 1:
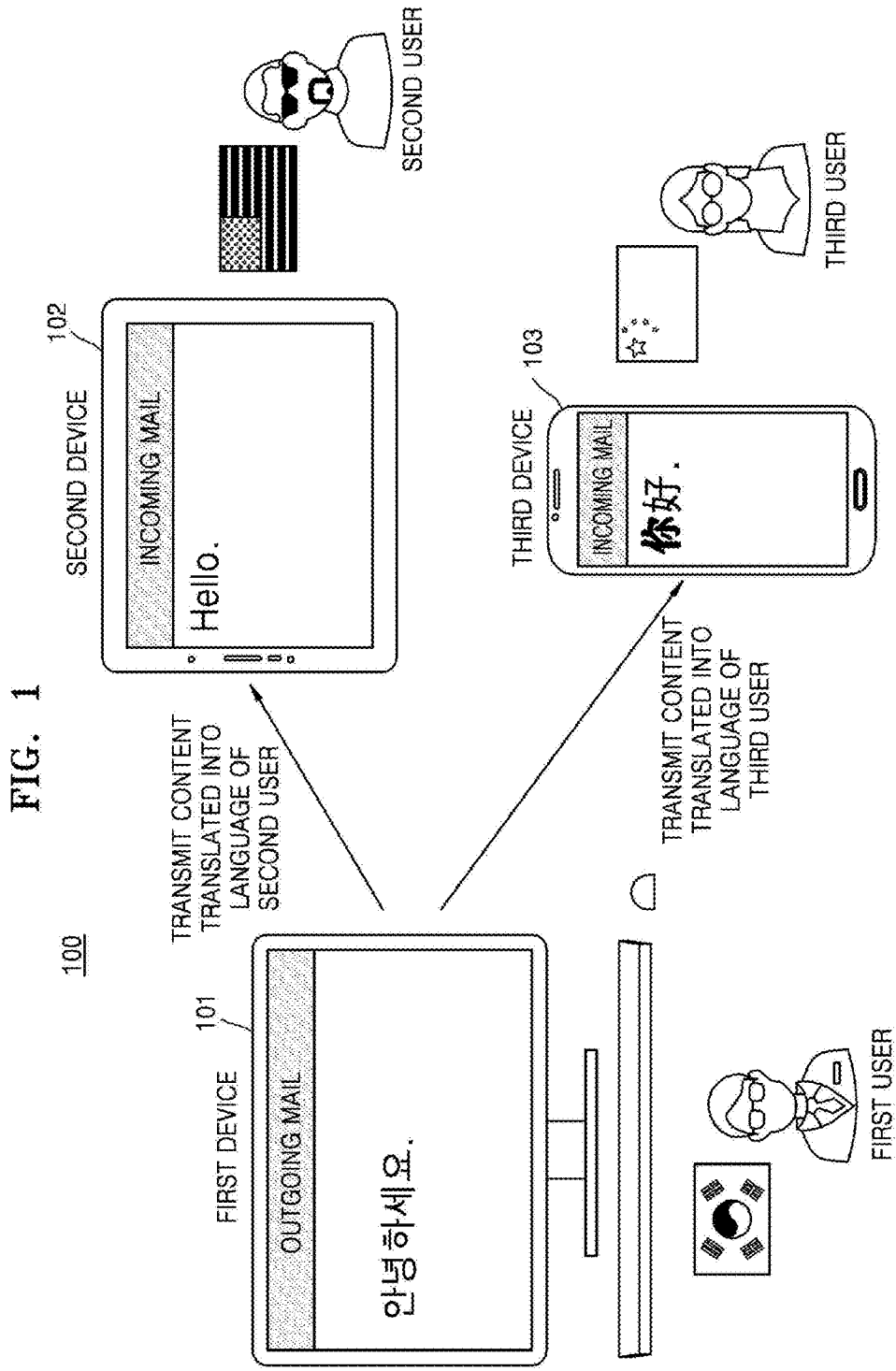
FIG. 1 is a diagram illustrating a system for translating content according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the exemplary embodiments. As used herein, the term "and/or" includes any and all combinations of one or more of the associated listed items. Expressions such as "at least one of," when preceding a list of elements, modify the entire list of elements and do not modify the individual elements of the list.

Exemplary embodiments will be described below in detail with reference to the accompanying drawings so that those of ordinary skill in the art may easily implement the exemplary embodiments. However, the exemplary embodiments may have different forms and should not be construed as being limited to the descriptions set forth herein. In addition, portions irrelevant to the description of the exemplary embodiments will be omitted in the drawings for a clear description of the exemplary embodiments, and like reference numerals will denote like elements throughout the specification.

Although terms such as "first" and "second" may be used herein to describe various elements or components, these elements or components should not be limited by these terms. These terms are only used to distinguish one element or component from another element or component.

It will be understood that when an element is referred to as being "connected" to another element, the element may be "directly connected" to the other element or may be "electrically connected" to the other element with other element(s) interposed therebetween. It will also be understood that the terms "comprises", "includes", and "has", when used herein, specify the presence of stated elements, but do not preclude the presence or addition of other elements, unless otherwise defined.

Also, throughout the specification, the term "gesture" may refer to any action that is taken by a user to control a terminal. Examples of the gesture described herein may include tap, touch, touch & hold, double tap, drag, panning, flick, drag & drop, and handshaking.

Also, throughout the specification, "outputting an image on a screen of a device" may refer to "displaying an image on a screen of a device". Thus, "outputting an image on a screen of a device" may include "displaying an image on a screen of a device".

Hereinafter, exemplary embodiments will be described in detail with reference to the accompanying drawings.

FIG. 1 is a diagram illustrating a system for translating content according to an exemplary embodiment.

Referring to FIG. 1, a system 100 according to an exemplary embodiment may include one or more devices 101, 102 and 103. The first device 101 may communicate with one or more other devices 102 to 103 or a server by wire or wirelessly and may include a device that performs an operation based on a signal input from a first user (hereinafter referred to as "user input"). For example, the first device 101 may execute at least one of a mail program, a chatting program, a schedule management program, a cloud connection program, an Internet connection program, a voice or video call program, and a computer game program based on user input. However, the operation of the first device 101 is not limited to the execution of the above programs and may be any operation that may be executed by an operation device included in the first device 101. In addition, the second device 102 and the third device 103 may have the same operations as the first device 101.

According to exemplary embodiments, the devices 101 to 103 illustrated in FIG. 1 may include, but are not limited to, personal computers (PCs), laptop computers, smart phones, smart televisions (TVs), and wearable devices. According to exemplary embodiments, the devices 101 to 103 may include a display screen and a user interface (UI) capable of receiving user input and may include any device that may receive user input to perform an operation.

According to exemplary embodiments, the wearable devices may include, but are not limited to, various devices such as glasses, watches, bands (e.g., waist bands and hair bands), various accessories (e.g., rings, armlets, anklets, hair pins, and necklaces), various body guards (e.g., knee guards and elbow guards), shoes, gloves, clothes, hats, patches, artificial legs, and artificial arms.

According to an exemplary embodiment, the first device 101 may transmit content to at least one of the second device 102 and the third device 103. According to an exemplary embodiment, the first device 101, the second device 102, and the third device 103 may be classified according to users of the respective devices or according to accounts input into the respective devices. For example, a device corresponding to an account of the first user may be classified as the first device 101, a device corresponding to an account of the second user may be classified as the second device 102, and a device corresponding to an account of the third user may be classified as the third device 103.

According to an exemplary embodiment, the device corresponding to the account may include, but is not limited to, a device into which user identification information such as login information is input or a device that has connected to a server that provides a service for each account.

According to an exemplary embodiment, the first device 101 may provide translated content to at least one of the second device 102 and the third device 103.

According to an exemplary embodiment, the first device 101 may translate content to be transmitted to the second device 102 or the third device 103 and transmit the translated content to the second device 102 or the third device 103. Also, the first device 101 may transmit content, which is to be transmitted to the second device 102 or the third device 103, to the server, and the server may translate the content received from the first device 101 and transmit the translated content to the second device 102 or the third device 103. Also, the second device 102 or the third device 103 may receive the original (untranslated) content from the first device 101 or the server and translate the received original content.

According to an exemplary embodiment, the first device 101 may provide translated content based on the language used by the user of the second device 102 or the third device 103. For example, when the user of the second device 102 uses the English language and the user of the third device 103 uses the Chinese language, the user of the second device 102 or the third device 103 has difficulty in receiving and using Korean-based content. Thus, the first device 101 may translate the Korean-based content into the English language and provide the translated content to the second device 102, and may translate the Korean-based content into the Chinese language and provide the translated content to the third device 103. According to an exemplary embodiment, the Korean-based content may include Korean-containing content or Korean content.

According to an exemplary embodiment, the first device 101 may request the server to translate the Korean-based content into at least one of the English language and the Chinese language.

According to an exemplary embodiment, the second device 102 or the third device 103 may translate the content received from the first device 101 based on the language corresponding to the user of the second device 102 or the third device 103 and output the translated content. For example, if the user of the second device 102 uses the English language and the user of the third device 103 uses the Chinese language, the second device 102 may receive Korean-based content, translate the received Korean-based content into the English language, and display the translated content or output the English sounds. Also, the third device 103 may translate the received Korean-based content and output the translated content. Also, as described above, when receiving the translated content from the first device 101 or the server, the second device 102 or the third device 103 may output the received translated content without an additional process including a translation operation.

According to an exemplary embodiment, the first device 101 may determine a language corresponding to a receiver based on receiver information that is information about the user of the second device 102 or the third device 103 and translate the content based on the determined language, or may transmit a content translation request to the server and provide the translated content to at least one of the second device 102 and the third device 103.

According to an exemplary embodiment, the receiver information may include receiver identification information (also referred to as identification information), receiver nation information (e.g., nationality information), and receiver language information. The receiver identification information may include, but is not limited to, receiver name information, receiver phone number information, cloud server account information, or receiver account information including receiver mail account information. The receiver nation information may include information about the nationality of the receiver or the nation in which the receiver is located. Also, the receiver language information may include information about the language used by the receiver.

According to an exemplary embodiment, the receiver information may include device information. According to an exemplary embodiment, the device information may include device position information, device address information, or device network and communication service provider information. According to an exemplary embodiment, the device address information may include device MAC information or device IP address information.

According to an exemplary embodiment, the content may include all types of data that are transmitted from the first device 101 to the second device 102 or the third device 103. Also, the types of the content are not limited. For example, the content may correspond to at least one of mail (e.g., e-mail), a text, a sound, a gesture, an image, and a moving image. In particular, for example, the content related to mail may include mail transmitted from the first device 101 to the second device 102 or the third device 103, attached files attached to the mail, images and texts included in a text body of the mail, and information included in each field of the mail, and may further include audio data included in voice call or video call and video data or texts included in video call or chatting.

Figure 2:
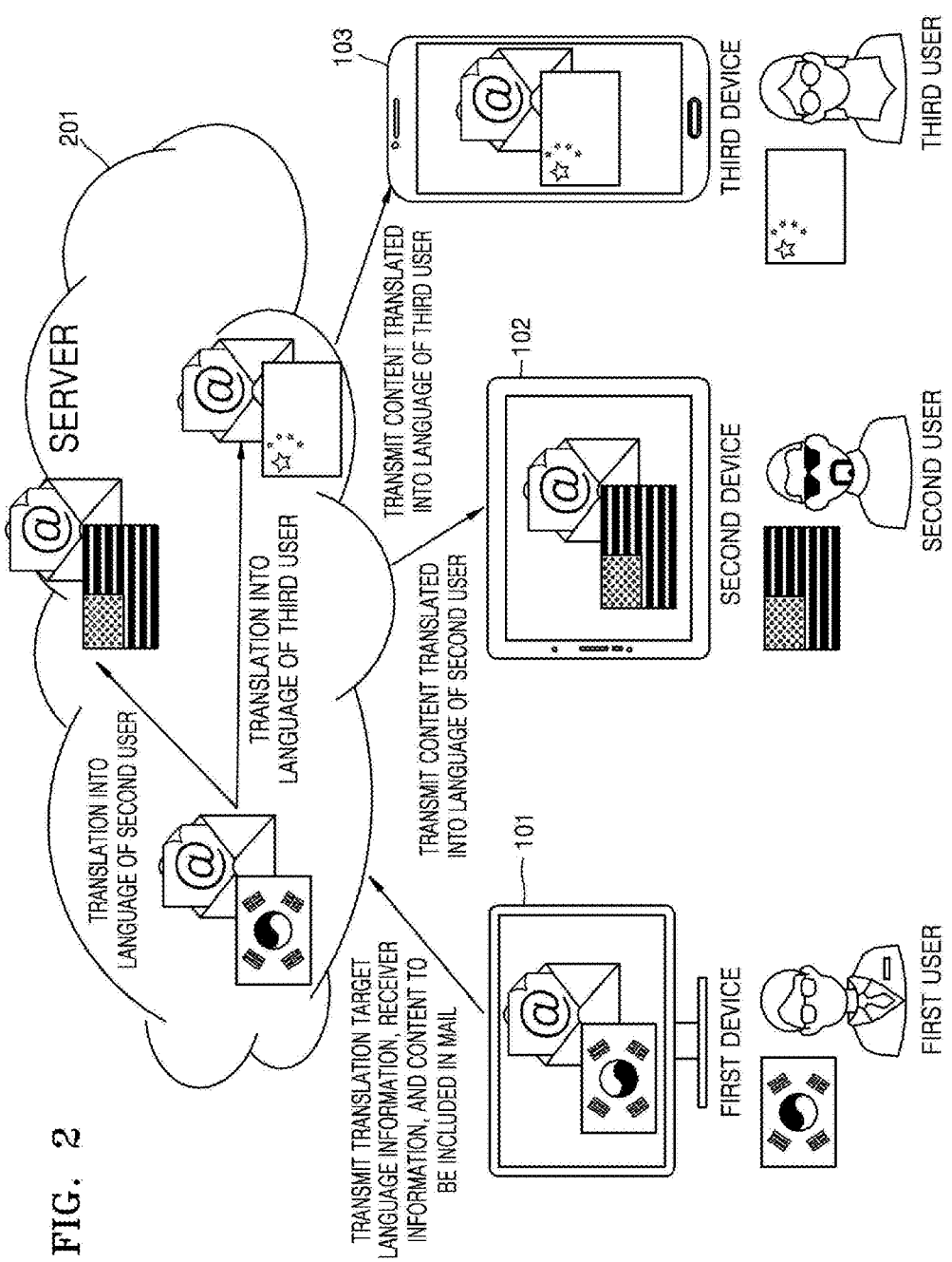
FIG. 2 is a diagram illustrating a system for translating content by using receiver information according to an exemplary embodiment.

FIG. 2 is a diagram illustrating a system for translating content by using receiver information according to an exemplary embodiment.

Referring to FIG. 2, the first device 101 may transmit content, receiver information, and translation target language information to a server 201. According to an exemplary embodiment, the translation target language information may include information about a language corresponding to a receiver.

According to an exemplary embodiment, the first device 101 may transmit mail to the second device 102 and the third device 103. Also, according to an exemplary embodiment, the first device 101 may transmit translated content to a mail account of the second user and a mail account of the third user.

According to an exemplary embodiment, in order to transmit mail to the second device 102 and the third device 103, the first device 101 may transmit the mail to the server 201 and request the server 201 to transmit the mail to the second device 102 and the third device 103.

Referring to FIG. 2, content may be included in the mail transmitted by the first device 101. For example, the mail may include texts, videos, audio content, images, and link information or attached files including texts, videos, audio content, images, and link information. Also, texts may be included in videos or images. According to an exemplary embodiment, the mail may be referred to as "content". That is, as illustrated in FIG. 1, the types of content are not limited.

According to an exemplary embodiment, the server 201 may receive content, receiver information, and translation target language information from the first device 101. The server 201 may translate the received content based on the translation target language information received from the first device 101. For example, the server 201 may receive a request for translation of the content into the language corresponding to the user of the second device 102 and the language corresponding to the user of the third device 103 from the first device 101. According to an exemplary embodiment, the server 201 may determine a translation target language, into which the content is to be translated, based on the received receiver information. The server 201 may translate the content and transmit the translated content to at least one of the second device 102 and the third device 103.

According to an exemplary embodiment, the server 201 may be a set of servers. Also, according to an exemplary embodiment, the server 201 may be a set including a mail server and a translation server. Also, the server 201 may include a cloud server. This will be described below in detail with reference to FIG. 3.

Figure 3:
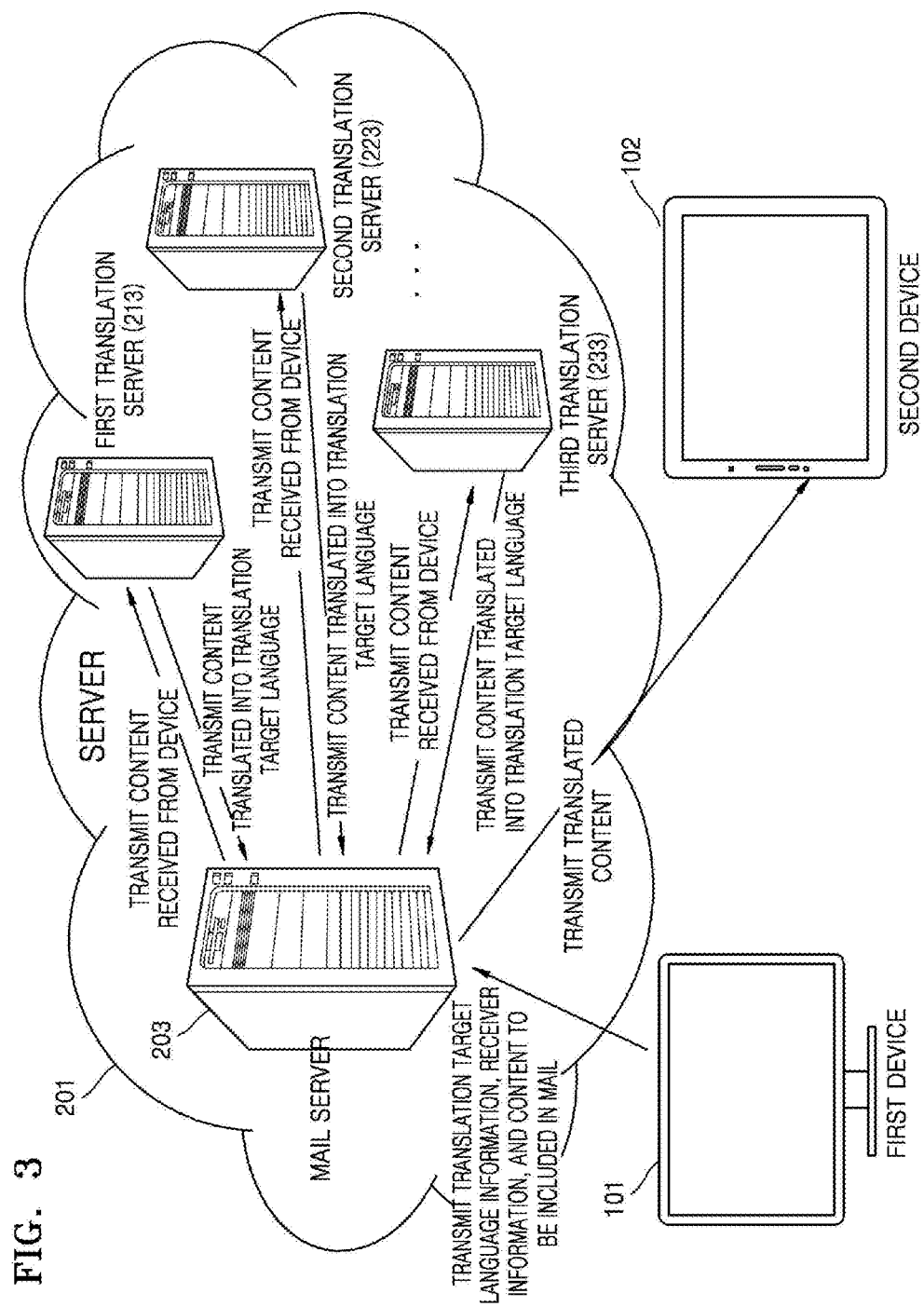
FIG. 3 is a diagram illustrating an example of a configuration of a server according to an exemplary embodiment.

FIG. 3 is a diagram illustrating an example of a configuration of a server according to an exemplary embodiment.

Referring to FIG. 3, a server 201 according to an exemplary embodiment may include a mail server 203 and translation servers 213, 223 and 233. According to an exemplary embodiment, the server 201 may be a set of servers, and the servers may include the translation servers 213 to 233 and the mail server 203.

According to an exemplary embodiment, the mail server 203 may receive mail, content included in the mail, receiver information, and translation target language information from the first device 101. The mail server 203 may transmit the received mail and the content included in the mail to the mail account of the receiver or the second device 102.

According to an exemplary embodiment, the translation servers 213 to 233 may receive the content, which the mail server 230 has received from the first device 101, from the mail server 230. Also, the translation servers 213 to 233 may receive the translation target language information from the mail server 203. According to an exemplary embodiment, the translation target language may be the language corresponding to the receiver. According to an exemplary embodiment, the translation servers 213 to 233 may directly receive content included in the mail, receiver information, and translation target language information from the first device 101.

According to an exemplary embodiment, the translation servers 213 to 233 may translate mail and content attached to the mail. According to an exemplary embodiment, the translation servers 213 to 233 may translate the mail and the content attached to the mail based on at least one of information about the language corresponding to the receiver and information about the language predicted by the receiver information.

According to an exemplary embodiment, the translation servers 213 to 233 may transmit the translated content to the mail server 203. According to an exemplary embodiment, the translation servers 213 to 233 may also transmit the translated content to the second device 102.

According to an exemplary embodiment, the server 201 may include a cloud server. The cloud server may store content and transmit the stored content to the mail server 203 or the translation servers 213 to 233 and to the second device 102.

Also, according to an exemplary embodiment, the cloud server may receive a content transmission request from the first device 101 and transmit the content to at least one of the mail server 203, the translation servers 213 to 233, and the second device 102 in response to the content transmission request.

According to an exemplary embodiment, for accuracy improvement, the translation servers 213 to 233 may translate the received content into the first language and translate the first-language content into the second language.

Figure 4:
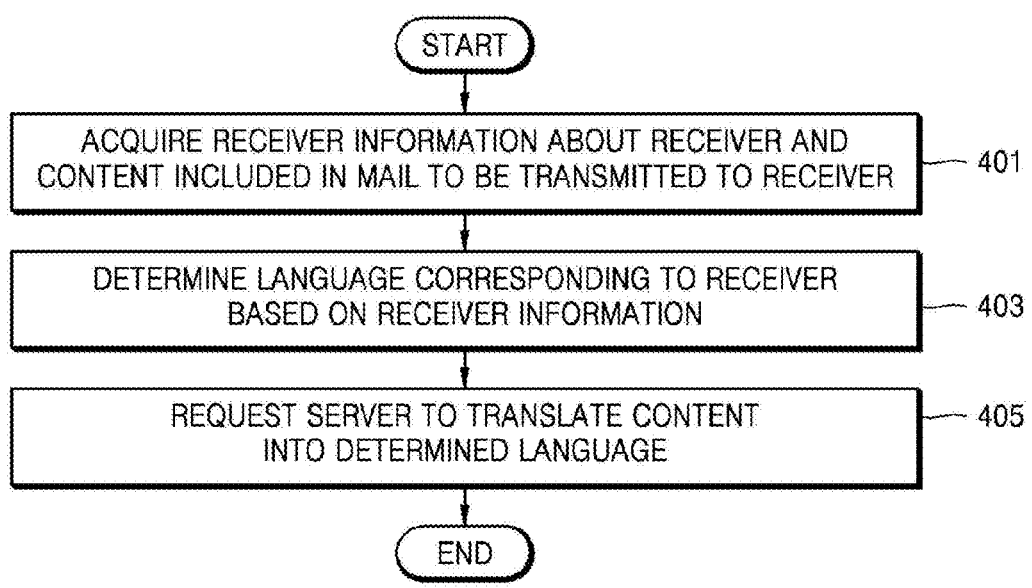
FIG. 4 is a flowchart illustrating a method for providing translated content by a device according to an exemplary embodiment.

FIG. 4 is a flowchart illustrating a method for providing translated content by a device according to an exemplary embodiment.

Referring to FIG. 4, in operation 401, the device may acquire receiver information about a receiver and content included in mail to be transmitted to the receiver.

According to an exemplary embodiment, the device may be the first device 101 illustrated in FIGS. 1 to 3, although is not limited thereto. Based on user input, the device may acquire content included in mail to be transmitted to receivers and acquire receiver information that is information about the receivers. Since one or more receivers may exist, the device may acquire receiver information about one receiver or may acquire receiver information about each of the receivers. Also, the device may acquire mail to be transmitted to the receiver. According to an exemplary embodiment, the mail may include content. According to an exemplary embodiment, the receiver may be a receiver account. According to an exemplary embodiment, the receiver account may refer to an account for receiver identification. Also, according to an exemplary embodiment, the receiver account may include a receiver mail account. That is, the receiver may include a device or an account and may include a subject that receives mail or content. For example, when a user of the device transmits mail to a mail account, the mail account may be the receiver, and when data or content are transmitted to a device, the device may be the receiver. Also, since the receiver information corresponds to that described above, detailed descriptions thereof will be omitted for conciseness.

According to an exemplary embodiment, the device may acquire receiver information based on at least one of receiver mail account information and receiver name information. Also, the device may acquire receiver information based on at least one of address book information, content transmission/reception history information, and receiver-related information included in the content. Also, the device may output an object into which the receiver information is input and acquire the receiver information from the user through the output object. According to an exemplary embodiment, the address book information may include receiver nation information and receiver language information.

Also, according to an exemplary embodiment, the device may acquire receiver identification information about the receiver and content to be transmitted to the receiver.

In operation 403, the device may determine a language corresponding to the receiver based on the receiver information.

According to an exemplary embodiment, the device may acquire an external signal for selecting a language and determine the language corresponding to the receiver based on at least one of the acquired external signal and the receiver information. According to an exemplary embodiment, when user input is received, the device may determine the language corresponding to the receiver based on the user input, and when user input is not received, the device may determine the language corresponding to the receiver based on the receiver information.

According to an exemplary embodiment, the device may determine the language corresponding to the receiver corresponding to the receiver identification information based on the address book information.

In operation 405, the device may request the server to translate the content into the determined language.

According to an exemplary embodiment, the device may transmit the content and the receiver information acquired in operation 401 to the server. Also, the device may transmit information about the language determined in operation 403 to the server and request the server to translate the content into the determined language.

According to an exemplary embodiment, the device may acquire user input for selecting the content and request the server to translate the selected content.

Also, according to an exemplary embodiment, the device may request the server to translate the content acquired in operation 401 into the language determined in operation 403.

According to an exemplary embodiment, the server may translate the content based on the translation target language information set for each receiver in response to the content translation request and transmit the translated content to another device or a receiver account. According to an exemplary embodiment, another device may be the second device 102 or the third device 103 illustrated in FIGS. 1 to 3, although is not limited thereto. Another device may receive and output the translated content.

Figure 5:
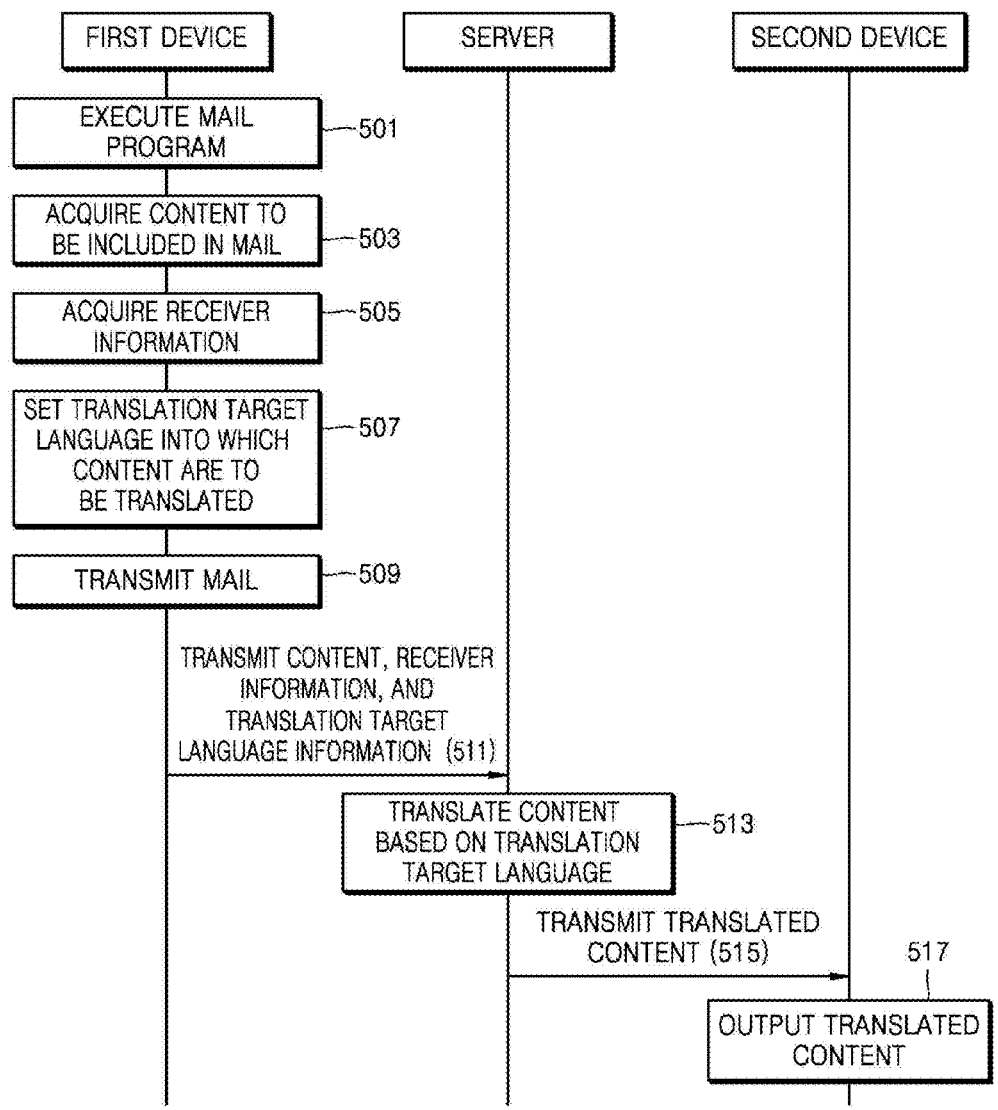
FIG. 5 is a flow diagram illustrating a method for providing translated content between devices according to an exemplary embodiment.

FIG. 5 is a flow diagram illustrating a method for providing translated content between devices according to an exemplary embodiment.

Referring to FIG. 5, in operation 501, the first device may execute a mail program. According to an exemplary embodiment, the mail program may be executed in the first device to transmit mail to a receiving device or a receiver account based on user input. For example, the mail program may include a web page provided through a Microsoft Outlook program or a web browser. Also, according to an exemplary embodiment, the first device may receive web page information for providing a mail service from a web server through a web browser and display the received web page information.

In operation 503, the first device may acquire content included in the mail. According to an exemplary embodiment, the first device may acquire the content included in the mail based on user input. The content included in the mail may include various types of content. Since the content included in the mail may correspond to those types of content described above, detailed descriptions thereof will be omitted for conciseness.

In operation 505, the first device may acquire receiver information. According to an exemplary embodiment, the first device may acquire the receiver information based on user input. As described above, the first device may acquire the receiver information including receiver identification information and the receiver device address information.

In operation 507, the first device may set a translation target language into which the content is to be translated. According to an exemplary embodiment, the translation target language may be the language corresponding to the receiver. According to an exemplary embodiment, the first device may acquire an external signal for setting a content translation target language, predict the language used by the receiver based on the external signal, and select the content translation target language based on the external signal. Also, the first device may determine whether the translation target language is set by user input and set the translation target language selectively according to the user input or the receiver information based on the determination result. Also, the first device may predict the language used by the receiver based on the receiver information and set the predicted language as the content translation target language.

In operation 509, the first device may transmit mail. According to an exemplary embodiment, the first device may transmit the mail to the server. Also, the first device may transmit the mail to the second device. According to an exemplary embodiment, the mail transmitted by the first device may include receiver mail account information.

In operation 511, the first device may transmit the translation target language information, the content, and the receiver information acquired in operations 503 and 505. According to an exemplary embodiment, in operation 511, the first device may transmit at least one of the content, the receiver information, and the content translation target language information together with or separately from the transmitted mail.

In operation 513, the server may translate the content based on the translation target language. According to an exemplary embodiment, the server may translate the mail and the content included in the mail based on the translation target language information received from the first device. Also, the server may predict the language corresponding to the receiver based on the receiver information received from the first device and translate at least one of the mail and the content attached to the mail into the predicted language.

In operation 515, the server may transmit the translated content to the second device. According to an exemplary embodiment, the server may transmit the translated content to the second device or the server corresponding to the receiver mail account based on the receiver information or the receiver mail account information included in the mail.

In operation 517, the second device may output the translated content. According to an exemplary embodiment, the second device may receive the untranslated mail or content. According to an exemplary embodiment, when receiving the untranslated content, the second device may determine mail or content translation target language based on the receiver information, the device user information, and the user input, and translate the mail or content based on the determination.

Figure 6:
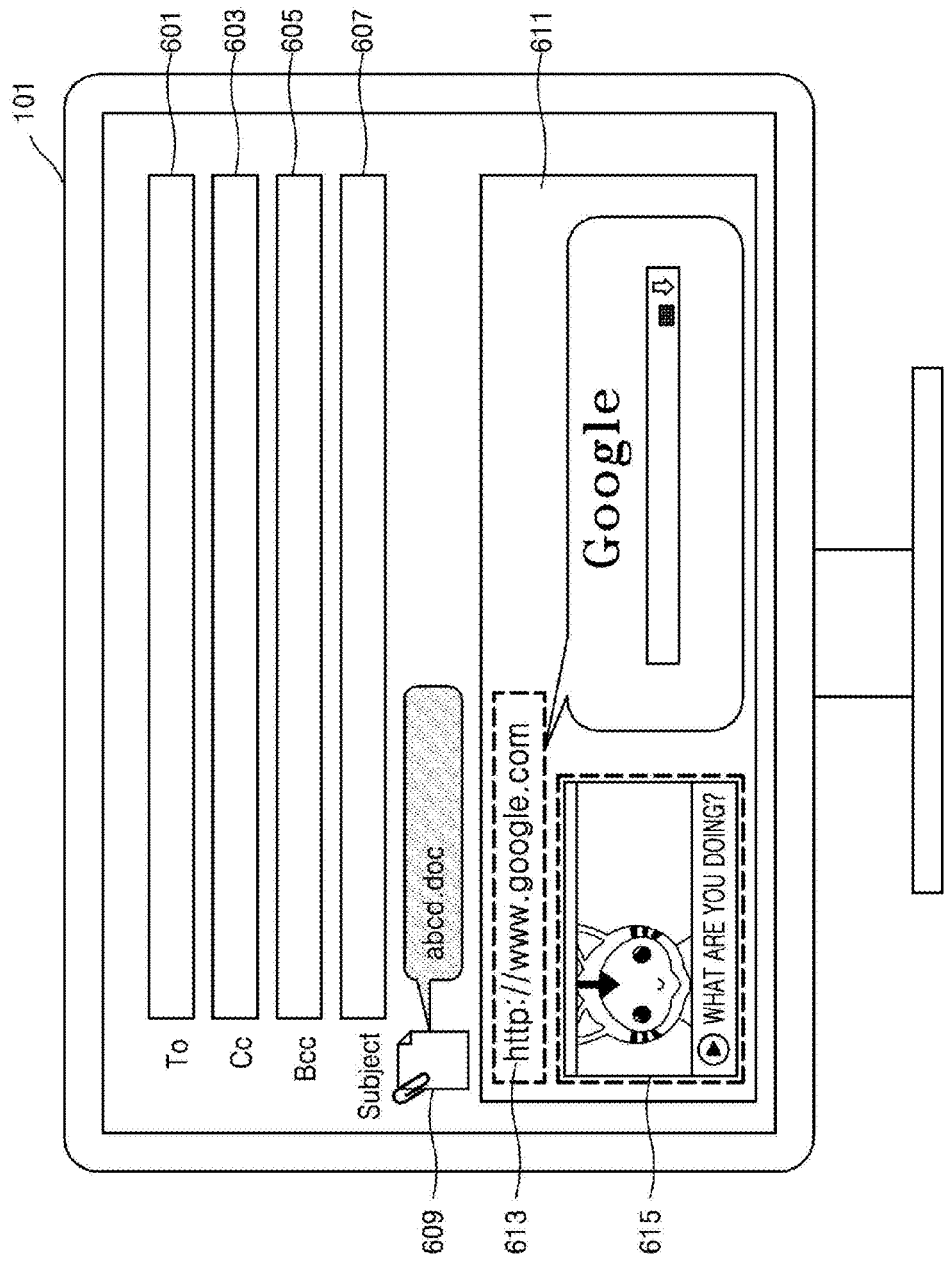
FIG. 6 is a diagram illustrating content included in mail according to an exemplary embodiment.

FIG. 6 is a diagram illustrating content included in mail according to an exemplary embodiment.

Referring to FIG. 6, the mail according to an exemplary embodiment may include a receiver field 601, a carbon copy (Cc) field 603, a blind carbon copy (Bcc) field 605, and a subject field 607. The receiver field 601 may be a field into which information about a subject communicating with a user of a transmitting device is input. For example, a receiver mail account may be input into the receiver field 601. According to an exemplary embodiment, the fields 601 to 605 may be fields that are included in an object into which receiver information is to be input.

According to an exemplary embodiment, the Cc field 603 may be a field into which information about a subject (other than the receiver), which should check outgoing mail, is input.

According to an exemplary embodiment, the Bcc field 605 may be a field into which information about a subject, which should check an outgoing mail without being detected by a subject input into the receiver field 601, is input.

Also, according to an exemplary embodiment, the mail of FIG. 6 may include an attached file 609. The attached file 609 is one of various types of content attached to the mail, and may be, but is not limited to, various types of files including text, audio, and video data.

Also, according to an exemplary embodiment, a text body of the mail may include content such as link information 613 and a moving image 615. That is, the link information 613 or the moving image 615 may also be the content attached to the mail. According to an exemplary embodiment, the link information 613 may include information for providing connection information to a web site or data. Also, as described above, the mail may be referred to as the content.

According to an exemplary embodiment, the server may translate information input into each field included in the mail, information or data included in the attached file 609, the moving image 615, and the link information 613, and transmit the translation results to the receiving device. In addition, the server may also translate a web site connected by the link information 613 included in the mail.

Figure 7:
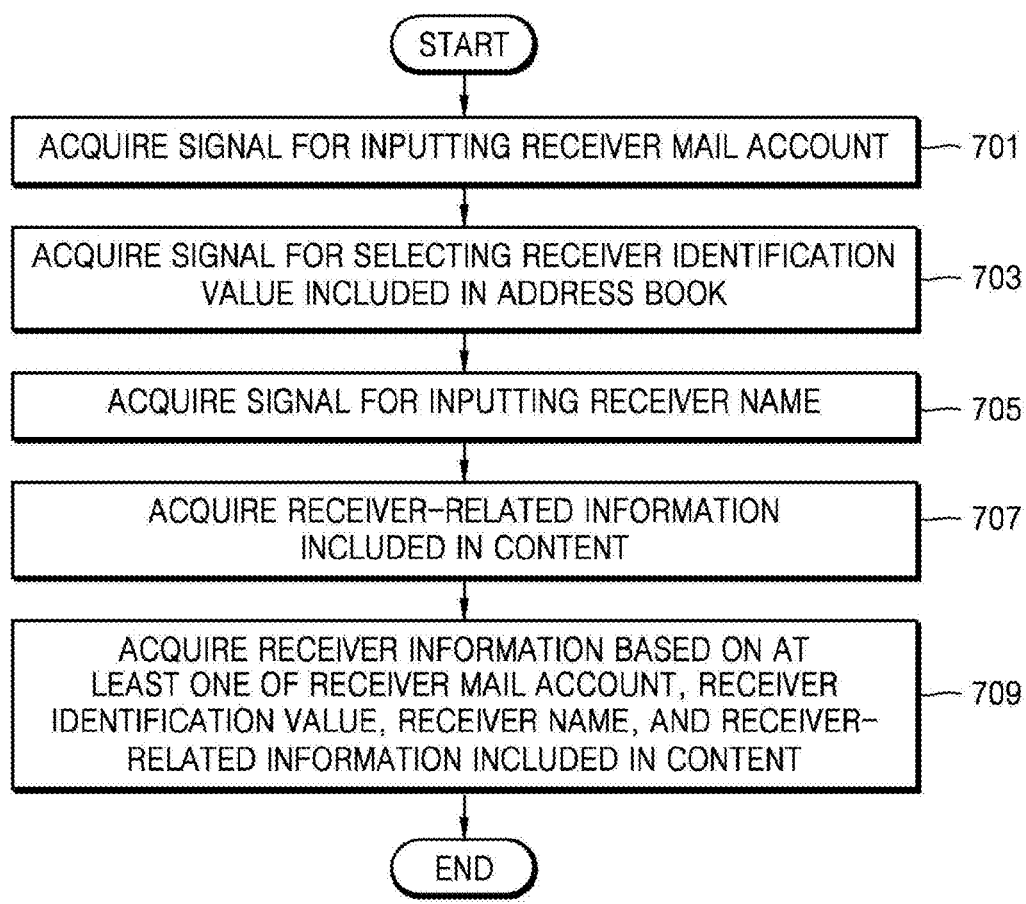
FIG. 7 is a flowchart illustrating a method for acquiring receiver information according to an exemplary embodiment.

FIG. 7 is a flowchart illustrating a method for acquiring receiver information according to an exemplary embodiment.

Referring to FIG. 7, in operation 701, the device may acquire a signal for inputting a receiver mail account. According to an exemplary embodiment, the device may acquire receiver information based on the receiver mail account.

In operation 703, the device may acquire a signal for selecting a receiver identification value included in an address book. For example, the device may acquire the signal for selecting the receiver identification value by acquiring information about some or all of receiver mail accounts. According to an exemplary embodiment, the device may acquire receiver information based on the signal for selecting the receiver identification value.

In operation 705, the device may acquire a signal for inputting a receiver name. The receiver name is one of the types of receiver identification information, and the device may acquire receiver information based on the receiver name.

In operation 707, the device may acquire receiver-related information included in the content. According to an exemplary embodiment, the device may acquire receiver information based on the receiver-related information among the content included in the mail, the attached file attached to the mail, or each field included in the mail. For example, the receiver information may be acquired based on the logo included in the attached file.

According to an exemplary embodiment, the device may generate an inquiry for acquiring the receiver information based on the receiver-related information included in the content and acquire the receiver information by searching based on the generated inquiry. The search based on the generated inquiry may include an Internet search or an intranet search.

According to an exemplary embodiment, the device may perform only one of operations 701 to 707. That is, the device may acquire at least one of the receiver mail account, the receiver identification value, the receiver name, and the receiver-related information included in the content.

In operation 709, the device may acquire receiver information based on at least one of the receiver mail account, the receiver identification value, the receiver name, and the receiver-related information included in the content.

FIGS. 8, 9, 10 and 11 are diagrams illustrating methods for inputting receiver account information according to exemplary embodiments.

Figure 8:
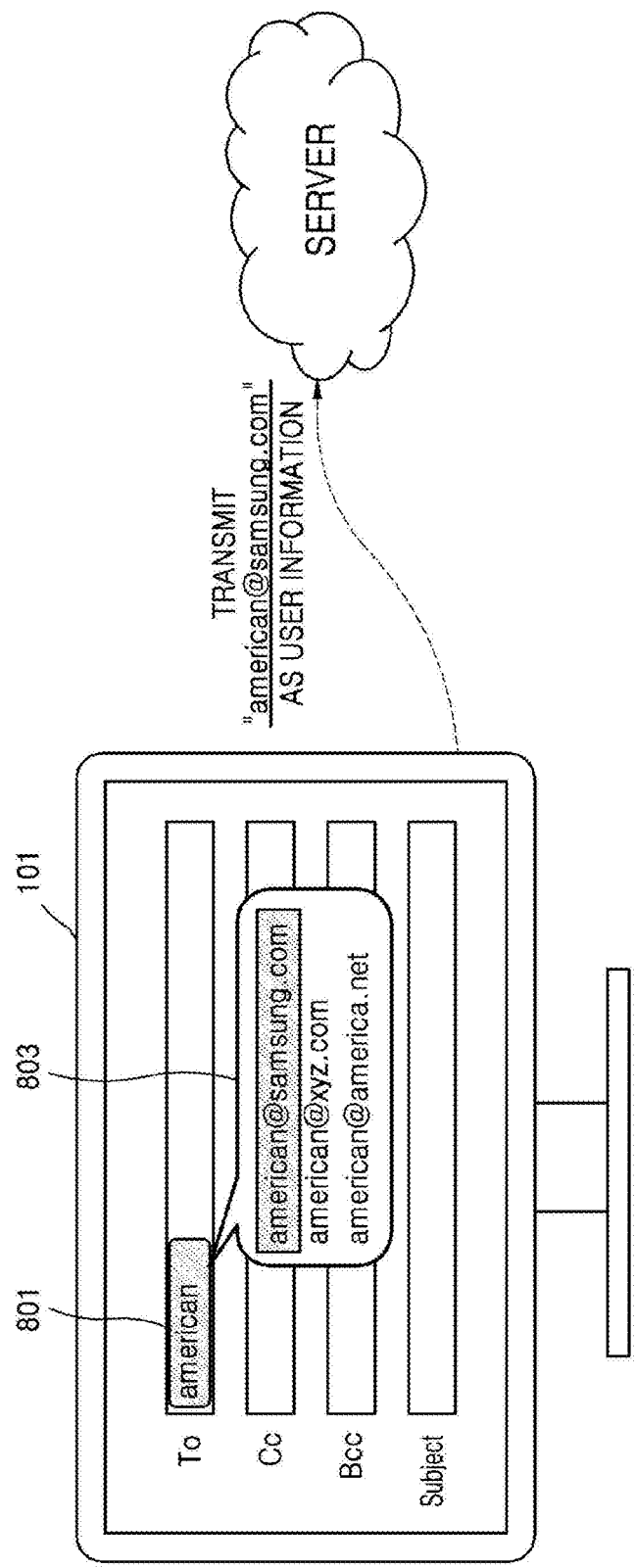
FIGS. 8, 9, 10 and 11 are diagrams illustrating methods for inputting receiver account information according to exemplary embodiments.
Figure 9:
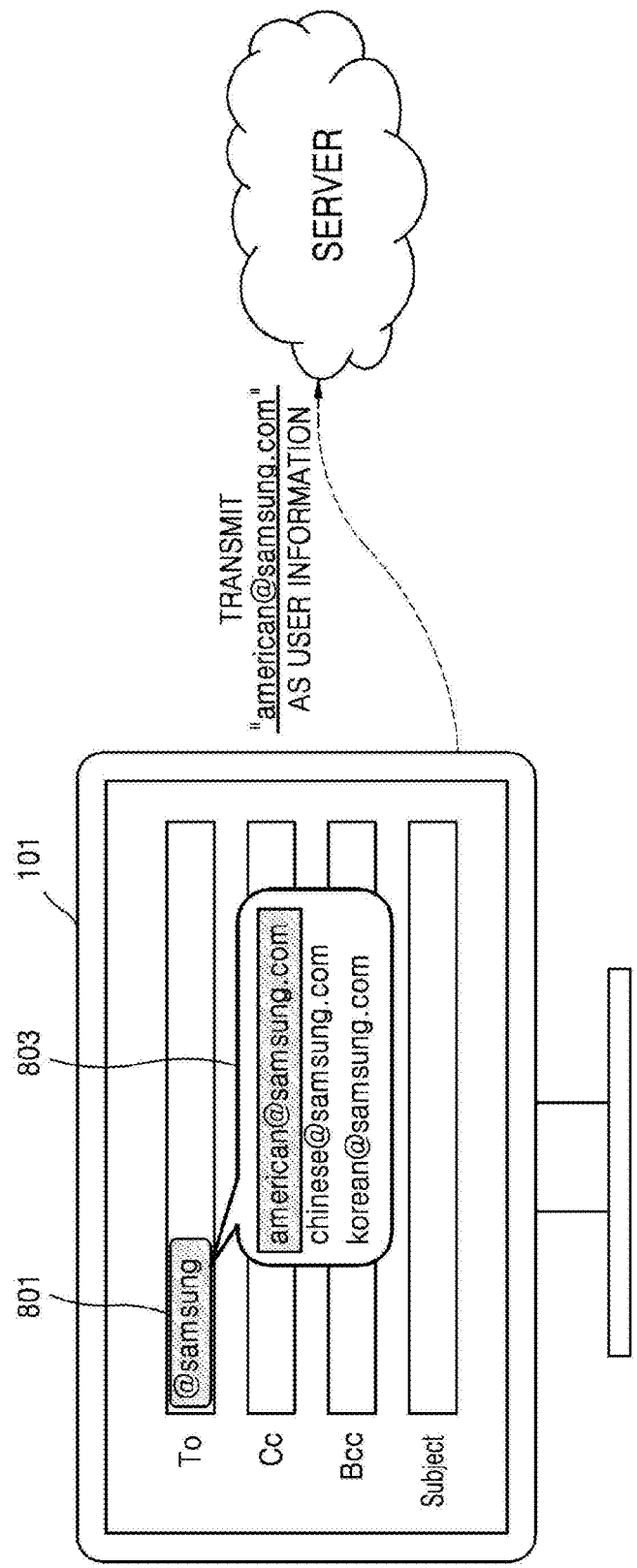

Referring to FIGS. 8 and 9, the first device 101 may acquire receiver account information based on user input. The receiver account information may be written in a receiver field 801. According to an exemplary embodiment, the receiver account information may be receiver mail account information. The receiver mail account information may correspond to a server such as the mail server, and a transmitting device such as the first device 101 may transmit data including content and mail through a server corresponding to the receiver account information. The receiver may input the receiver account information into a device, so that a device such as the second device 102 may receive mail and data from the server.

According to an exemplary embodiment, the first device 101 may provide an auto-complete function. For example, the auto-complete function may refer to a function of acquiring some of the receiver account information and displaying a predetermined number of candidate account information entries having a predetermined similarity based on the acquired information. The information acquired by the device may be, but is not limited to, domain information or some of the ID information included in the receiver account information.

According to an exemplary embodiment, the device may display the candidate account information through an auto-complete function window 803. The auto-complete function window 803 may be output in the form of a pop-up window, a new window, or a picture-in-picture (PIP) window; however, exemplary embodiments are not limited thereto. According to an exemplary embodiment, the similarity may be determined based on the text arrangement, the equality or inequality of domain information included in the receiver account information (see, e.g., FIG. 9), or the equality or inequality of identifiers included in the receiver account information.

Figure 10:
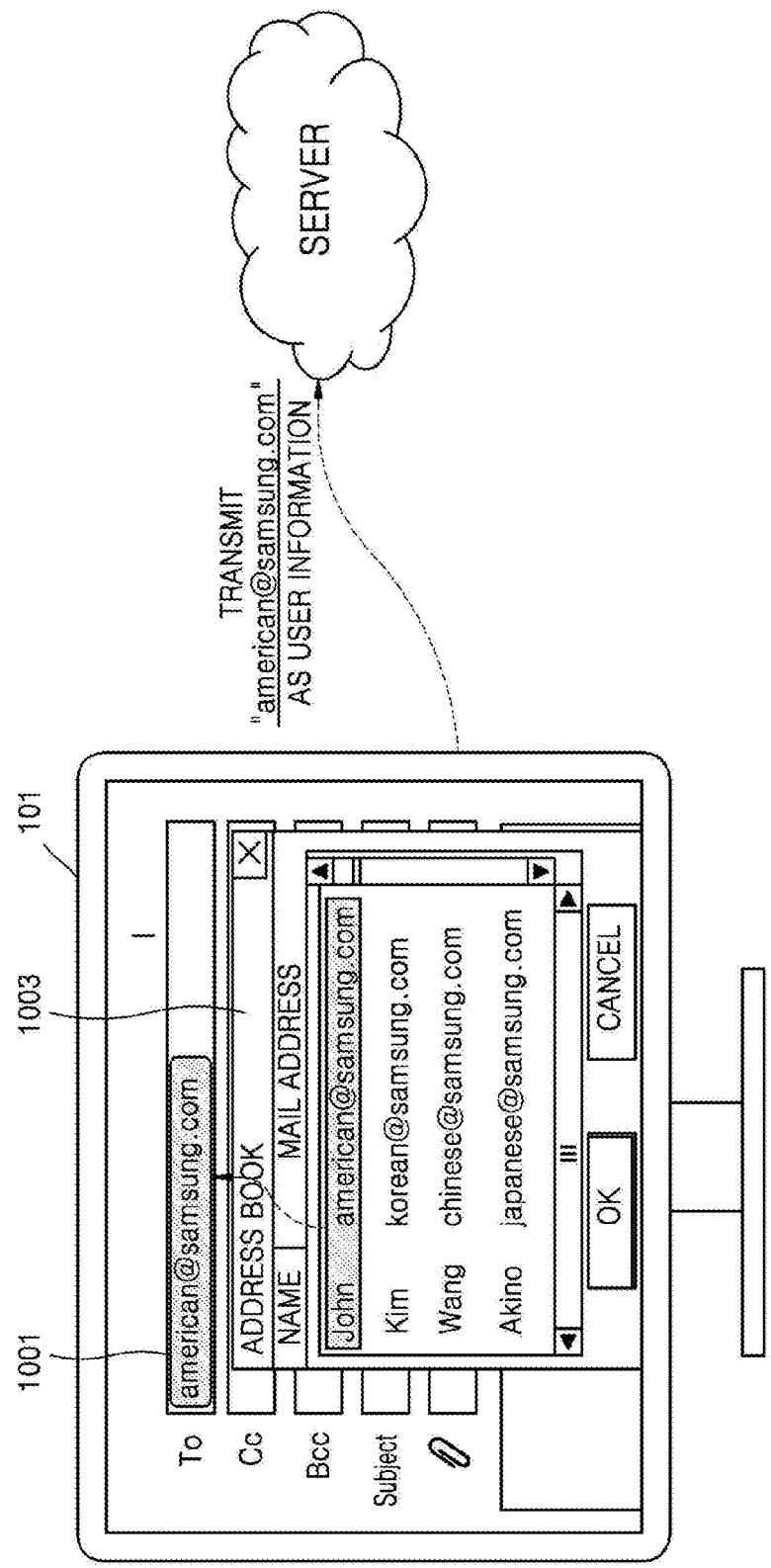

Referring to FIG. 10, the first device 101 may acquire receiver account information based on user input. According to an exemplary embodiment, the receiver account information may be written in a receiver field 1001 by a user input.

According to an exemplary embodiment, the first device 101 may acquire receiver account information based on user input and display address book information corresponding to the acquired receiver account information through an address book window 1003. The address book information may include all or some of the receiver information, such as receiver name information and receiver account information. The address book window 1003 may be output in the form of a pop-up window, a new window, or a PIP window; however, exemplary embodiments are not limited thereto.

According to an exemplary embodiment, through an auto-complete function, the first device 101 may display a predetermined number of candidate address book information entries having a predetermined similarity with the receiver account information acquired by the first device 101.

Figure 11:
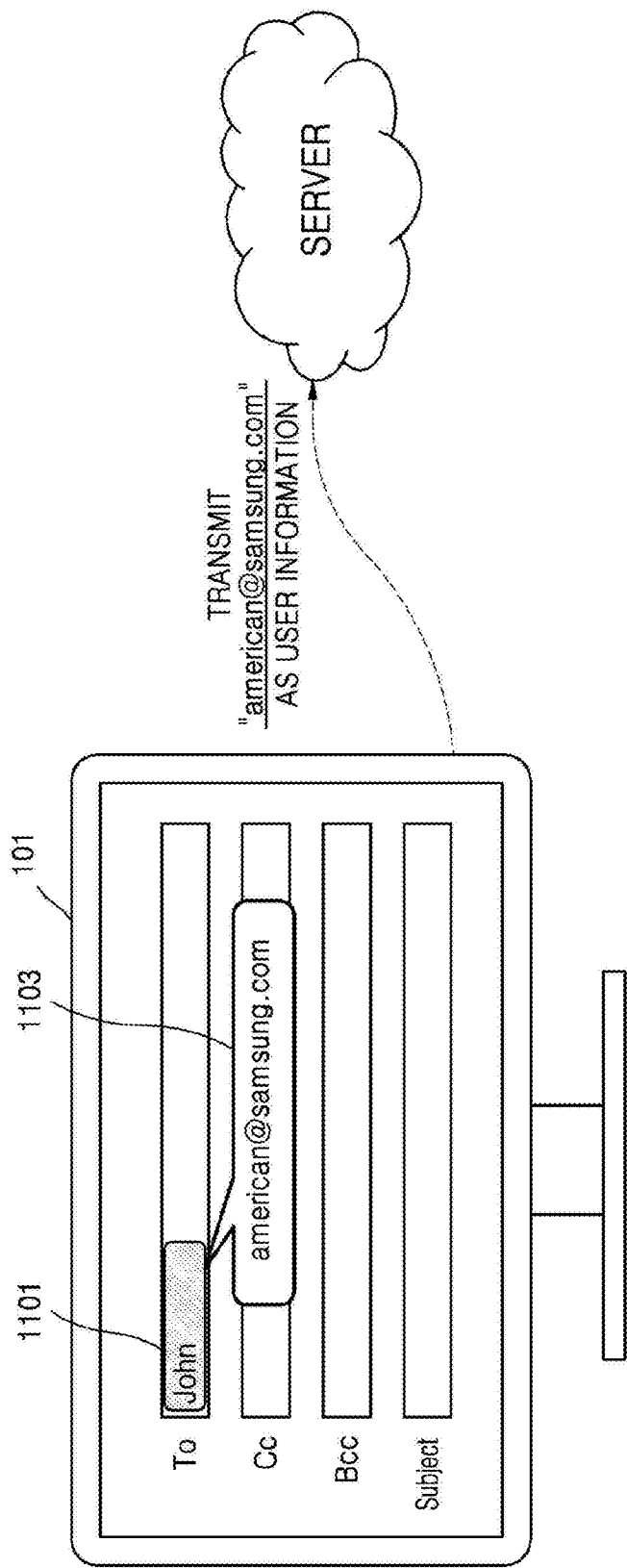

Referring to FIG. 11, the first device 101 may acquire receiver name information based on user input. According to an exemplary embodiment, the receiver name information may be written in a receiver field 1101 by a user input.

According to an exemplary embodiment, the first device 101 may acquire receiver name information based on user input and display receiver account information corresponding to the acquired receiver name information through an account information window 1103. According to an exemplary embodiment, when there are a plurality of entries of account information corresponding to the acquired receiver name, the first device 101 may display a plurality of entries of account information corresponding to the acquired receiver name information.

According to an exemplary embodiment, by using an auto-complete function, the first device 101 may display a predetermined number of candidate account information entries having a predetermined similarity with the receiver name information acquired by the first device 101.

The account information window 1103 may be output in the form of a pop-up window, a new window, or a PIP window; however, exemplary embodiments are not limited thereto.

According to an exemplary embodiment, the first device 101 may acquire the receiver information by the method illustrated in FIGS. 9 to 11 and transmit mail to the second device or the server based on the acquired receiver information.

Figure 12:
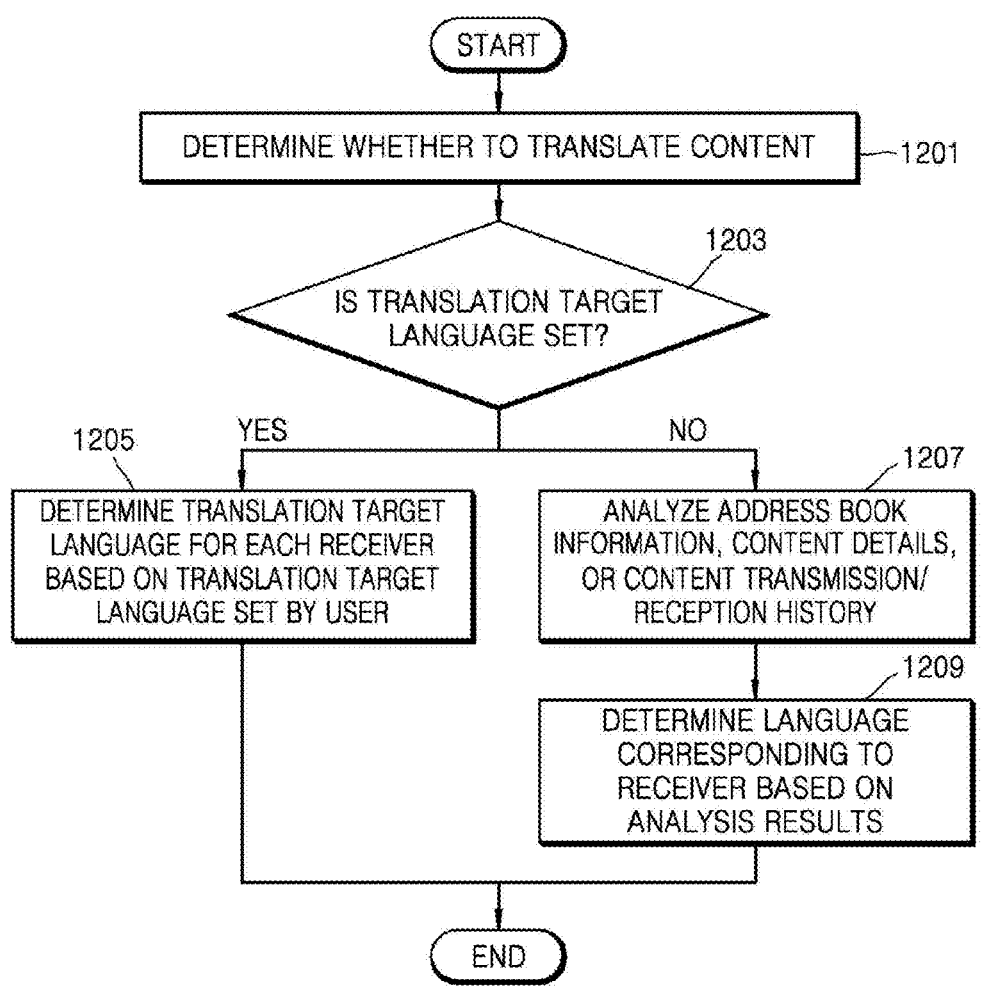
FIG. 12 is a flowchart illustrating a method for determining a content translation target language according to an exemplary embodiment.

FIG. 12 is a flowchart illustrating a method for determining a content translation target language according to an exemplary embodiment. The method of FIG. 12 may, for example, be performed by the first device 101, although is not limited thereto.

Referring to FIG. 12, in operation 1201, the first device may determine whether to translate content. According to an exemplary embodiment, when the first device determines that it is not necessary to translate content to be transmitted by the first device, the first device may not translate the content.

In operation 1203, the first device may determine whether a translation target language is set. According to an exemplary embodiment, the first device may determine whether a translation target language is set by user input.

When the translation target language is set in operation 1203, the first device may determine, in operation 1205, the translation target language for each receiver based on the set translation target language. According to an exemplary embodiment, when the content is to be transmitted to a plurality of receivers, the content is to be translated based on the translation target language used by each receiver. Thus, the first device may determine the translation target language for each receiver based on the set translation target language.

When the translation target language is not set in operation 1203, the first device may analyze address book information, content details, or a content transmission/reception history in operation 1207. According to an exemplary embodiment, the first device may analyze the receiver information acquired as described above.

In operation 1209, the first device may determine a language corresponding to the receiver based on the analysis results. That is, the first device may determine the translation target language for each receiver based on the analysis results of operation 1207.

FIGS. 13, 14, 15, 16, 17, 18 and 19 are diagrams illustrating content translation setting methods according to exemplary embodiments.

According to an exemplary embodiment, the first device 101 may set whether to translate each of the pieces of content.

Figure 13:
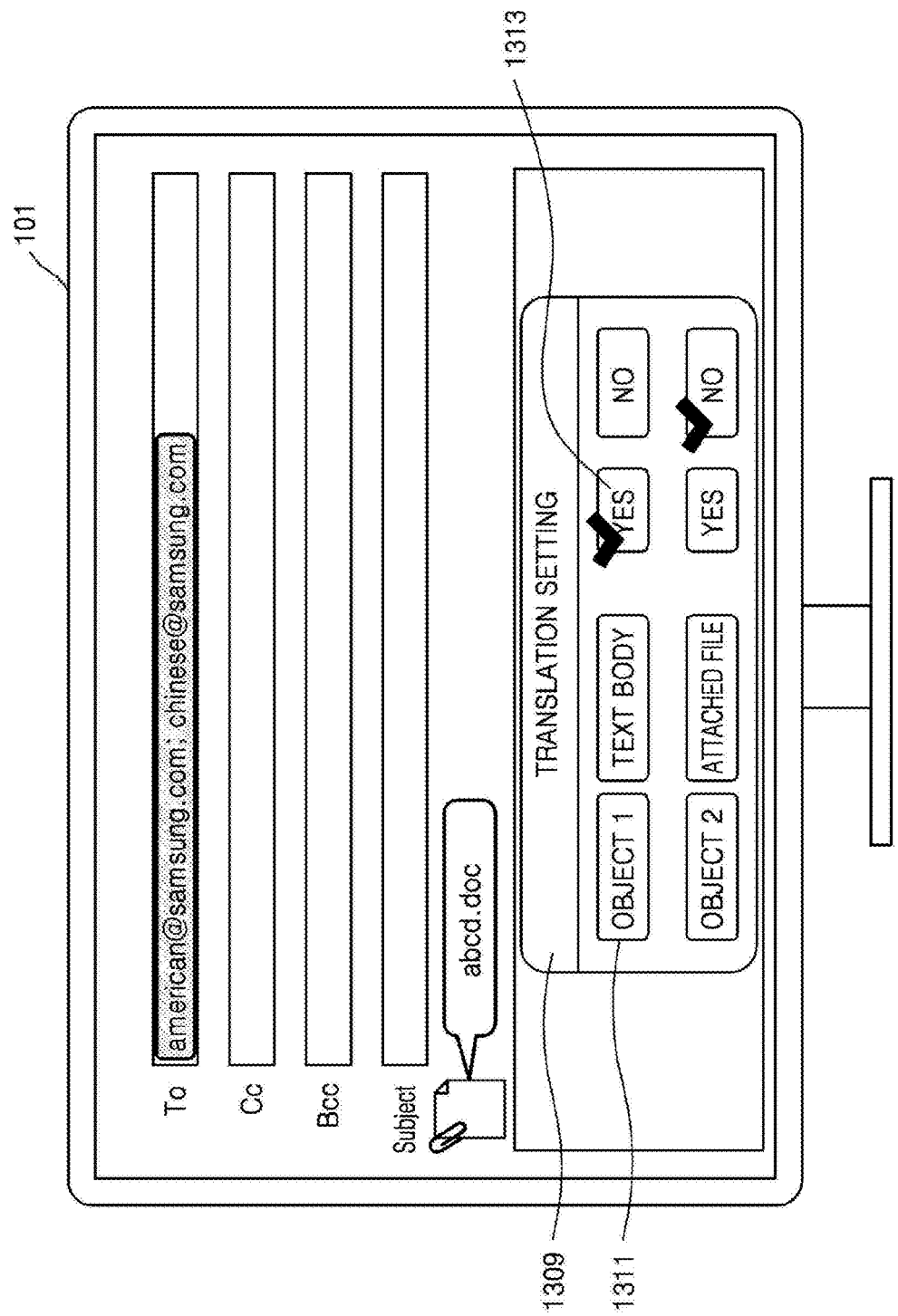
FIGS. 13, 14, 15, 16, 17, 18 and 19 are diagrams illustrating content translation setting methods according to exemplary embodiments.

Referring to FIG. 13, the first device 101 may display a translation setting window 1309. The translation setting window 1309 may include a translation object setting field 1311 and a translation determining field 1313. The first device 101 may change information displayed in each field of the translation setting window 1309 based on user input.

According to an exemplary embodiment, the translation object setting field 1311 may be used to display a list of content to be translated. According to an exemplary embodiment, the content to be translated may include, but is not limited to including, a text body of mail and an attached file of the mail. Also, according to an exemplary embodiment, the translation object setting field 1311 may be divided into a plurality of fields according to the content included in the mail.

According to an exemplary embodiment, the first device 101 may set whether to translate the content based on user input and display information about whether to translate the content. For example, the first device 101 may use a toggle mode to display the information about whether to translate the content.

According to an exemplary embodiment, the translation determining field 1313 may be displayed plurally according to the number of translation objects. Also, according to an exemplary embodiment, the first device 101 may set whether to perform translation for each receiver.

Figure 14:
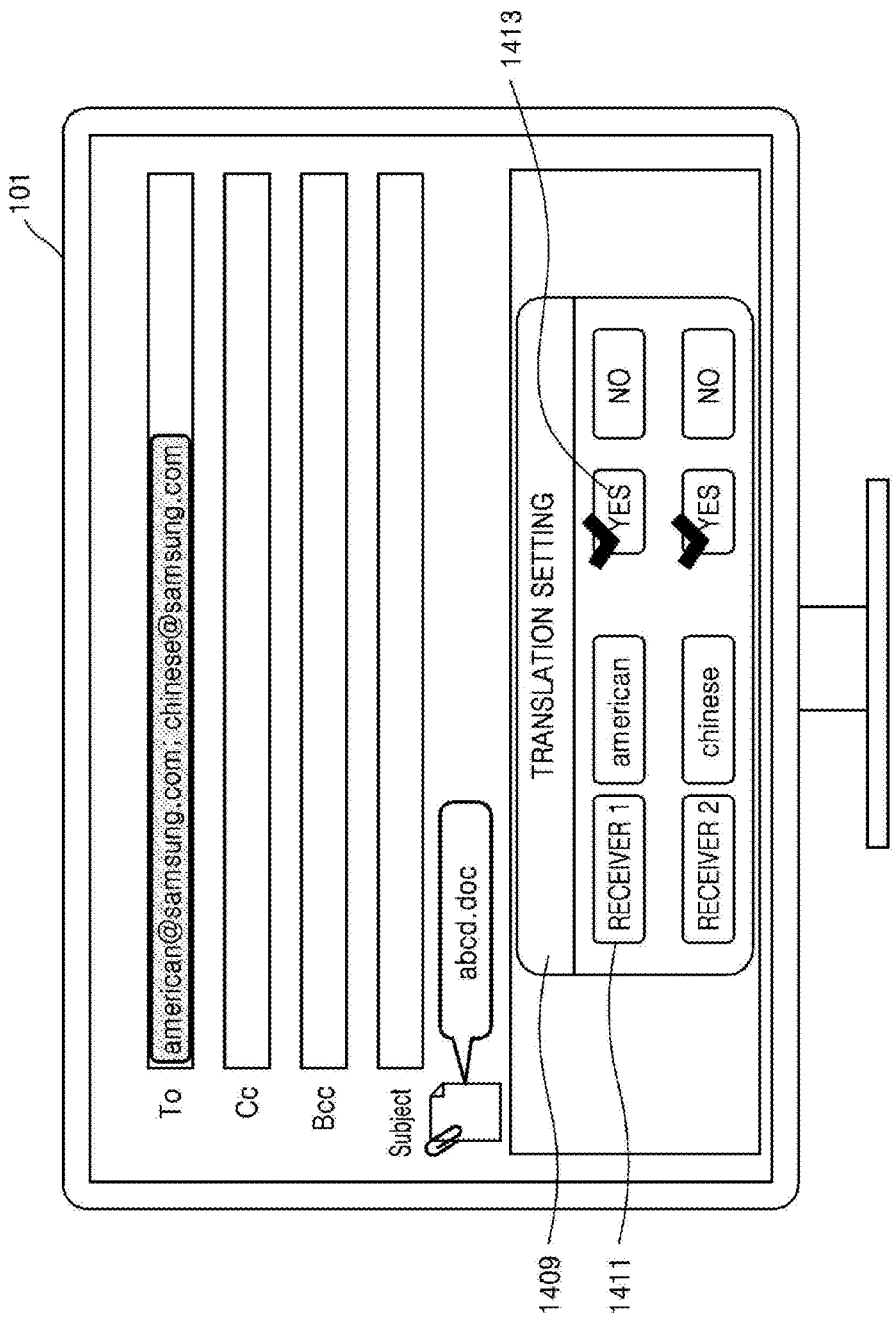

Referring to FIG. 14, the first device 101 may display a translation setting window 1409. The translation setting window 1409 may include a translation object setting field 1411 and a translation determining field 1413.

Unlike in FIG. 13, in FIG. 14, the first device 101 may set whether to perform a translation for each receiver. The translation object setting field 1411 may be used to display a list of receivers that receive the content. Also, according to an exemplary embodiment, the translation object setting field 1411 may be displayed plurally according to the number of receivers.

According to an exemplary embodiment, the translation determining field 1413 may be used to set whether to perform a translation for each receiver. According to an exemplary embodiment, the first device 101 may determine whether to translate a translation object based on user input entered into the translation determining field 1413. Since this feature corresponds to the feature illustrated in FIG. 13, a detailed description thereof will be omitted for conciseness.

When the translation option is set for each receiver, the first device 101 may be set to automatically translate the content or automatically omit content translation until receiving additional user input for resetting the translation option.

According to an exemplary embodiment, the first device 101 may set a translation target language for each receiver.

Figure 15:
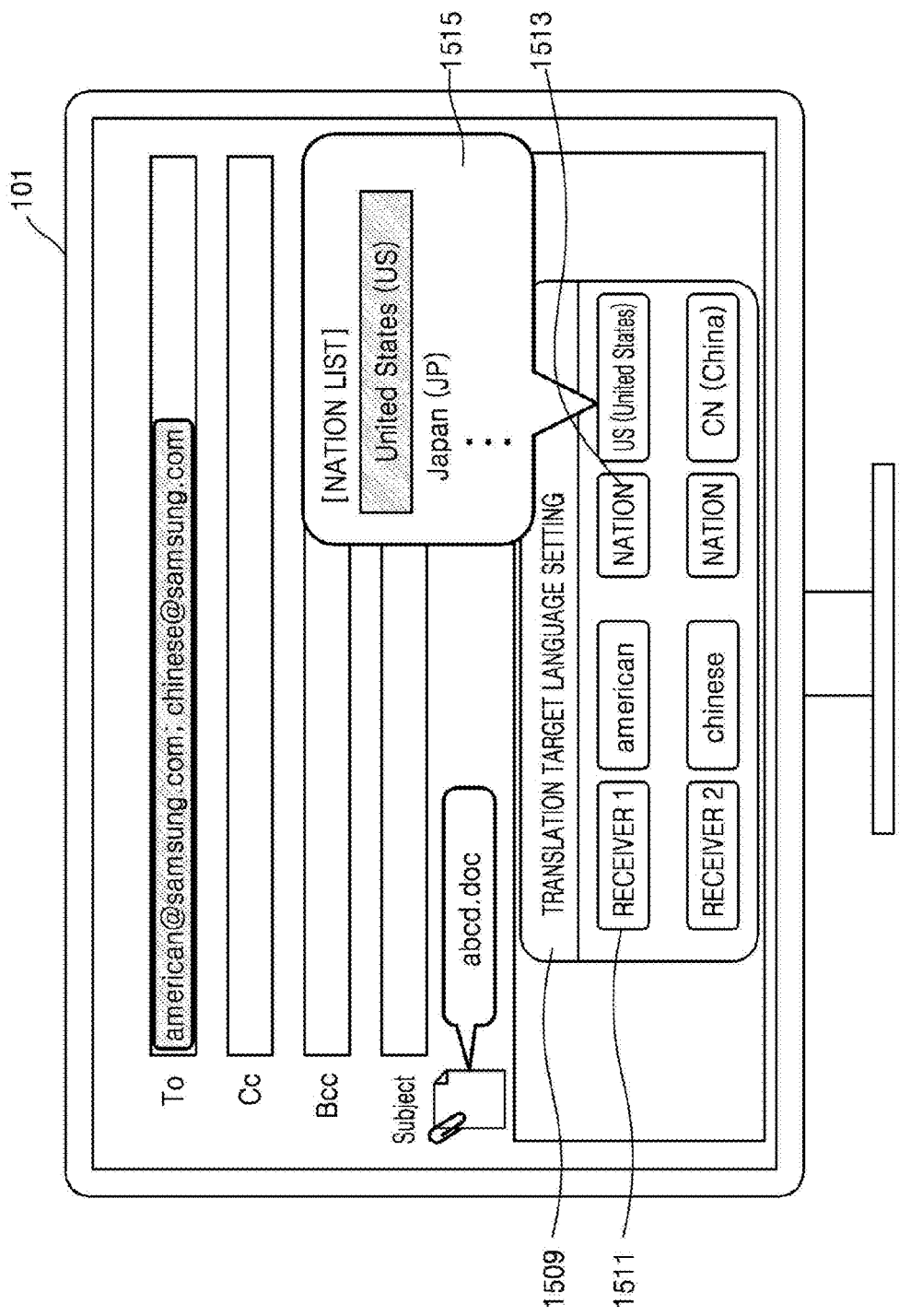

Referring to FIG. 15, the first device 101 may display a translation setting window 1509. The translation setting window 1509 may include a translation object setting field 1511 and a translation target language setting field 1513.

According to an exemplary embodiment, the first device 101 may set whether to perform a translation for each receiver. Since this feature corresponds to the feature illustrated in FIG. 14, a detailed description thereof will be omitted for conciseness.

According to an exemplary embodiment, the first device 101 may set a translation target language for each receiver based on user input for selecting the translation target language setting field 1513. According to an exemplary embodiment, the translation target language setting field 1513 may be used to display information about at least one nation and information about at least one language.

In addition, based on user input for selecting a translation target language selecting field, the first device 101 may display a list window 1515 for displaying a nation list or a language list. The first device may receive user input for selecting a nation for determining a translation target language of the receiver through the list window 1515.

When the translation target language is set for each receiver based on the user input, the history about the translation target language set for each receiver may be stored. After the history about the translation target language for each receiver is stored, when the first device 101 re-displays the translation setting window 1509, the translation target language set for each receiver or the nation information corresponding to the translation target language may be displayed by default in the translation target language setting field 1513 based on the stored history. For example, the translation target language or the nation information corresponding to the translation target language may be displayed based on the history information without separate input or a separate setting operation.

Also, when the first device 101 re-displays the translation setting window 1509, the preset translation target language or the nation information corresponding to the translation target language may be highlighted and displayed in the translation setting window 1509 or the translation target language setting field 1513. Alternatively, the preset translation target language or the nation information corresponding to the translation target language may be located at the top of the language list or the nation list for selecting the translation target language.

Also, when the translation option is set for each receiver based on the user input, the first device 101 may be set to automatically translate the content or automatically omit content translation until receiving additional user input for resetting the translation option.

Figure 16:
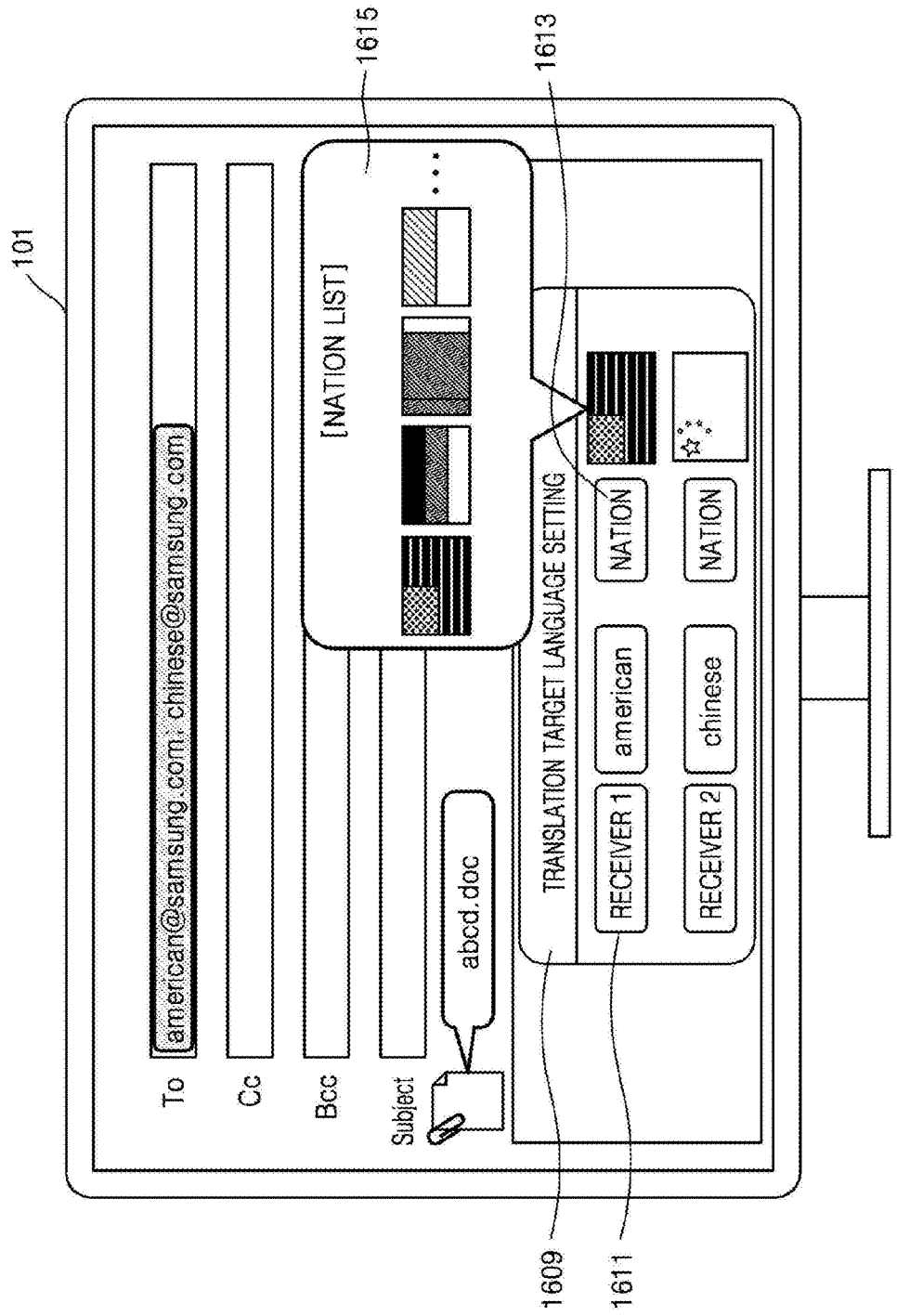

Referring to FIG. 16, the first device 101 may include a translation target language setting field 1513, which corresponds to the translation target language setting field 1513 illustrated in FIG. 15. However, unlike in FIG. 15, the first device 101 may also display a representative image (such as a national flag) of the nation through a list window 1615.

According to an exemplary embodiment, the first device 101 may set a content translation target language based on the address book information.

When the representative image of the nation corresponding to translation target language is set for each receiver based on user input, the history about the representative image of the nation set for each receiver may be stored. After the history about the representative image of the nation for each receiver is stored, when the first device 101 re-displays the translation setting window 1609, the representative image of the nation set for each receiver may be displayed by default in the translation target language setting field 1613 based on the stored history. For example, the translation target language or the representative image of the nation corresponding to the translation target language may be displayed based on the history information without separate input or performing a separate setting operation.

Also, when the first device 101 re-displays the translation setting window 1609, the preset representative image of the nation may be highlighted and displayed in the translation setting window 1609 or the translation target language setting field 1613. Alternatively, the preset representative image of the nation corresponding to the translation target language may be located at the top of a national representative image list for selecting the translation target language.

Also, when the translation option is set for each receiver based on user input, the first device 101 may be set to automatically translate the content or automatically omit content translation until receiving additional user input for resetting the translation option.

Figure 17:
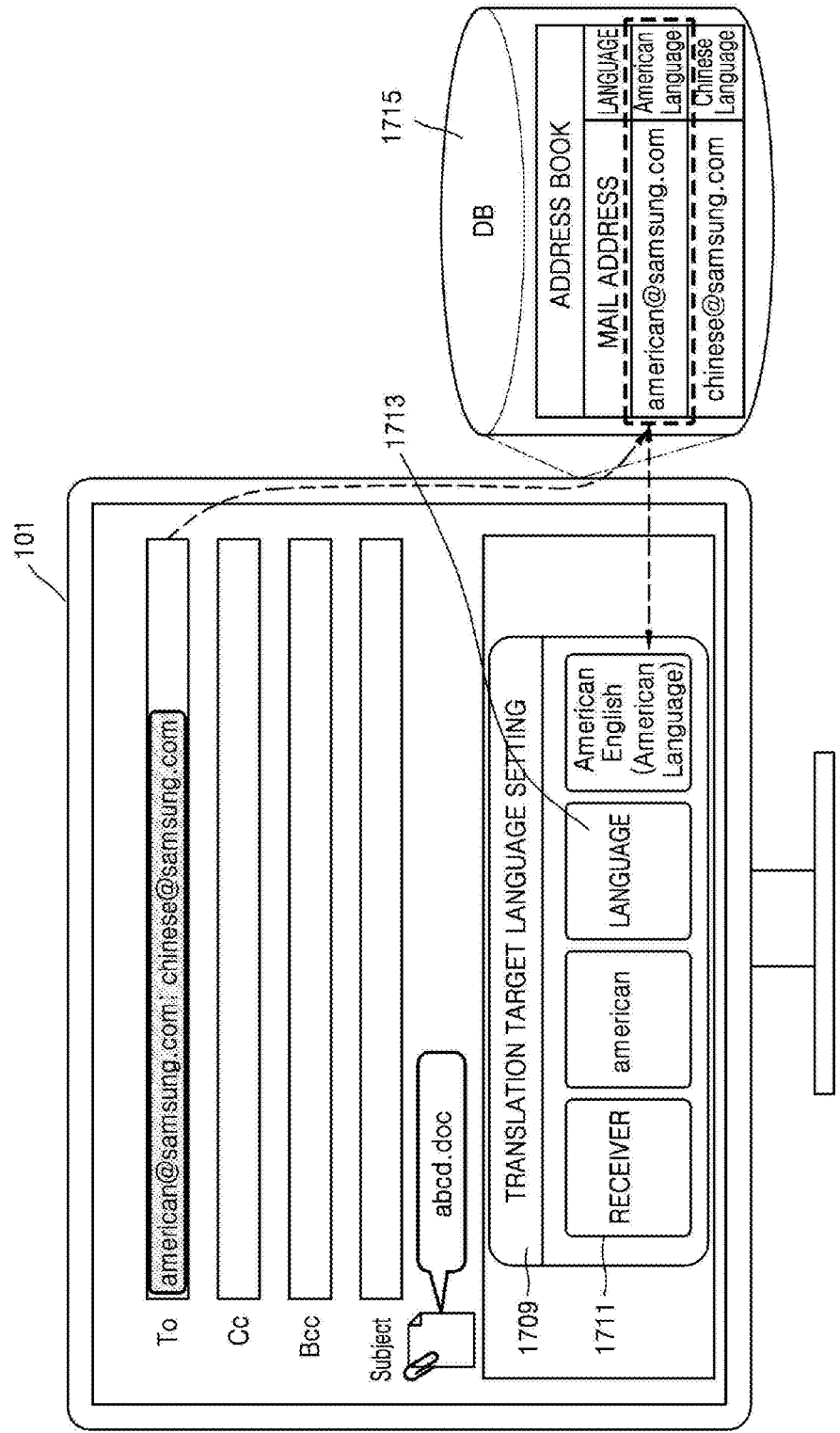

Referring to FIG. 17, the first device 101 may display a translation setting window 1709. The translation setting window 1709 may include a translation object setting field 1711 and a translation target language setting field 1713.

According to an exemplary embodiment, the translation object setting field 1711 may be used to set whether to perform translation for each receiver. Since this feature corresponds to the same feature illustrated in FIG. 14, a detailed description thereof will be omitted for conciseness.

According to an exemplary embodiment, the first device 101 may select a content translation target language based on address book information and display information about the selected translation target language based on the translation target language setting field 1713. According to an exemplary embodiment, the address book information may include receiver information. For example, the address book information may include at least one of receiver identification information, receiver nation information, and receiver language information. The address book information may be stored in a storage unit such as a database (DB) 1715 included in the first device 101.

According to an exemplary embodiment, the first device 101 may receive user input for inputting the receiver identification information (e.g., receiver mail account information, receiver phone number information, or receiver name information), acquire the receiver nation information or the receiver language information corresponding to the receiver identification information from the address book information stored in the DB 1715, and determine the translation target language based on the acquired receiver language information.

According to an exemplary embodiment, the address book may refer to a data set in which information for determining the language corresponding to the receiver is mapped or connected with respect to each piece of receiver identification information. The data set may be implemented in an array mode or a linked list mode before being stored. The address book may be stored in the DB 1715 of the first device 101, or may be stored in a DB of a server outside the first device 101.

According to an exemplary embodiment, the first device 101 may set a content translation target language based on the transmission/reception history information.

Figure 18:
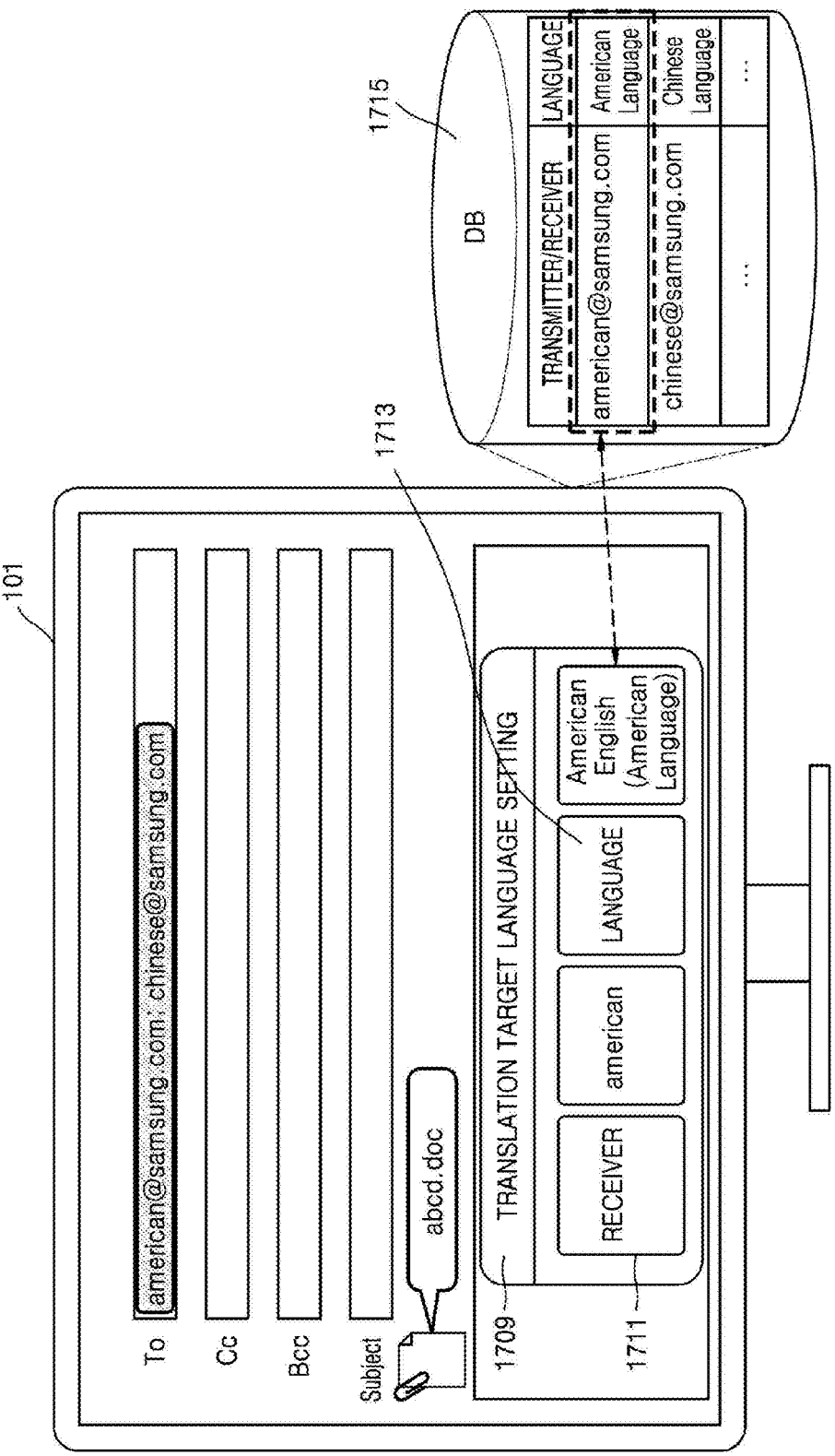

Referring to FIG. 18, the first device 101 may display a translation setting window 1709. The translation setting window 1709 may include a translation object setting field 1711 and a translation target language setting field 1713.

According to an exemplary embodiment, the first device 101 may select a content translation target language based on the transmission/reception history information and display information about the selected translation target language through the translation target language setting field 1713. According to an exemplary embodiment, the transmission/reception history information may include information identifying which language the content has been translated into and information identifying which receiver the translated content has been transmitted to. The transmission/reception history information may be stored in a storage unit such as the DB 1715 included in the first device 101.

According to an exemplary embodiment, the first device 101 may receive user input for inputting a receiver mail account, determine whether there is transmission/reception history information stored in the DB 1715 corresponding to the receiver mail account, and determine a translation target language based on the transmission/reception history information when there is the transmission/reception history information stored in the DB 1715 corresponding to the receiver mail account.

According to an exemplary embodiment, the first device 101 may set a content translation target language based on the information included in the content.

Figure 19:
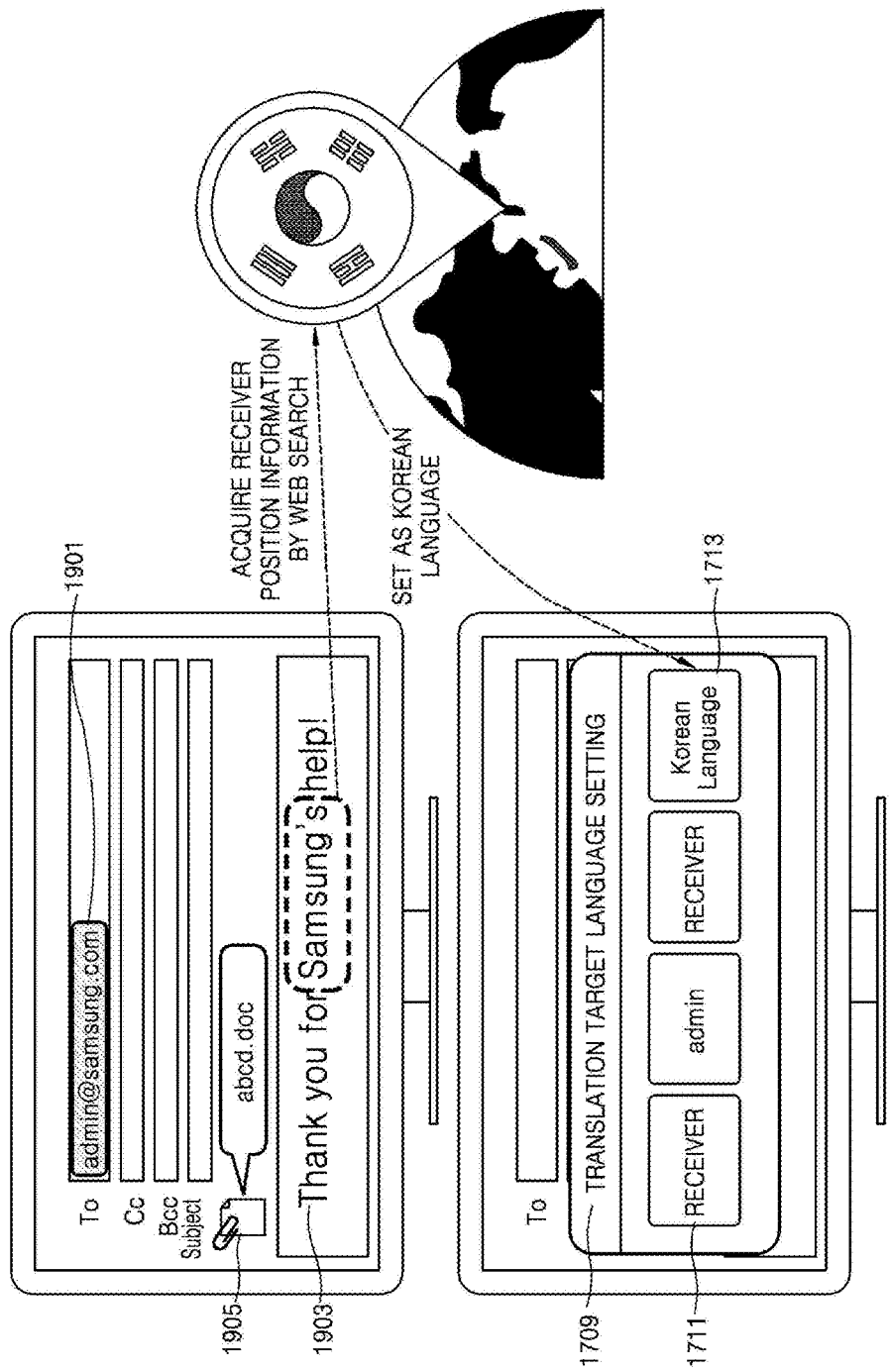

Referring to FIG. 19, mail of the first device 101 may include an attached file 1905, and a text body 1903 of the mail may include a text. The first device 101 may set a translation target language based on information included in the attached file 1905 of the mail or information included in the text of the text body 1903 of the mail.

According to an exemplary embodiment, the first device 101 may generate an inquiry based on information estimated as receiver-related information included in the attached file 1905 of the mail or information estimated as receiver-related information included in the text of the text body 1903 of the mail, and select the language of the receiver based on the inquiry. According to an exemplary embodiment, the inquiry-based method may include a web search method.

Also, according to an exemplary embodiment, the first device 101 may acquire receiver account information from the user and set a translation target language by analyzing the acquired receiver account information. For example, the first device 101 may acquire at least one of receiver nationality information, receiver language information, and receiver position information by retrieving a user ID or a domain name in the receiver account information through the Internet, and set a translation target language based on at least one of the types of information retrieved through the Internet.

According to an exemplary embodiment, like the second device, the device that has received the content from the first device 101 may acquire receiver position information at the time when the receiver receives and reads mail, and translate the content in real time based on the acquired receiver position information.

Also, according to an exemplary embodiment, the first device 101 may determine at least one candidate translation target language, into which the content is to be translated, based on the information included in the content and select a translation target language according to the user's selection.

Figure 20:
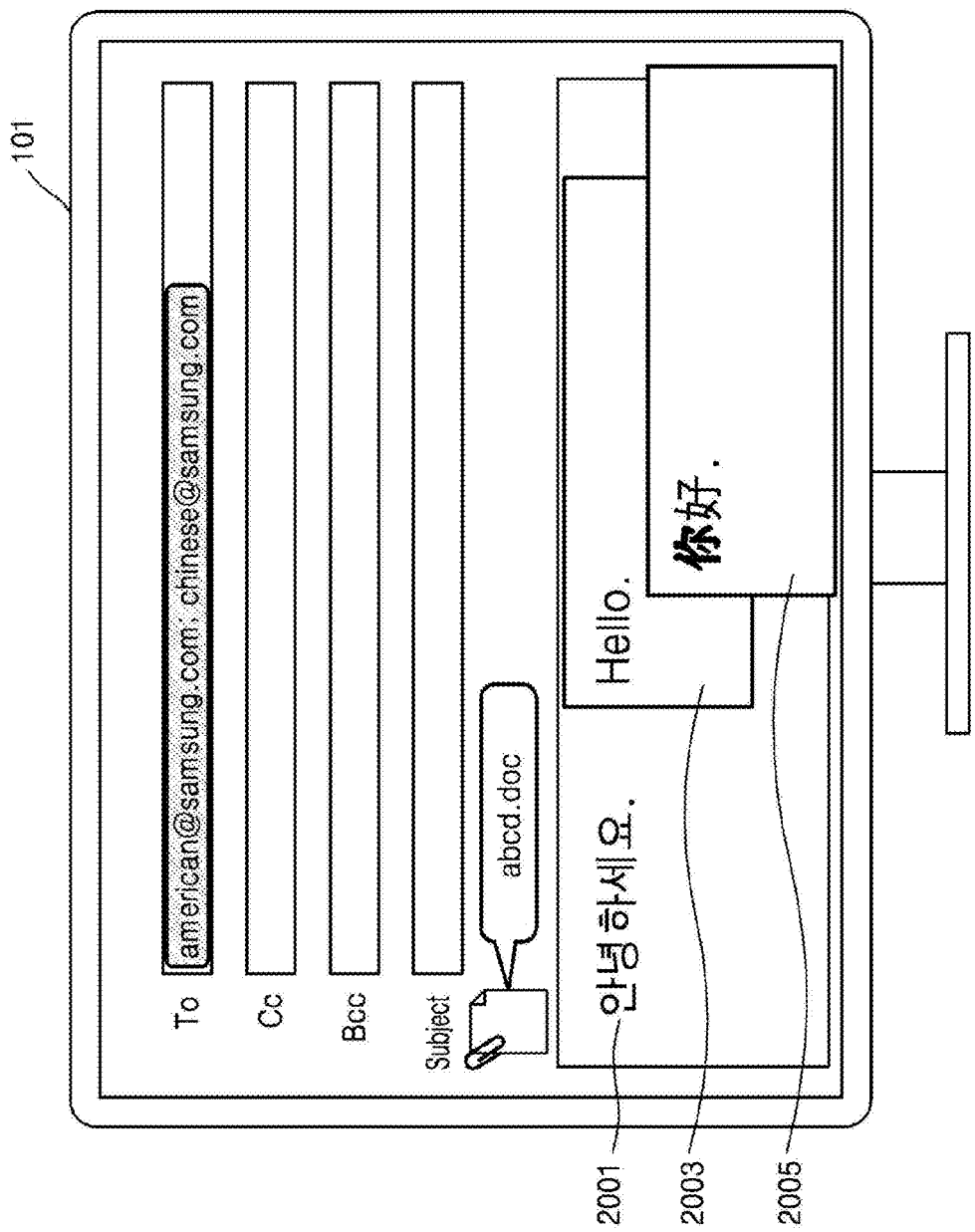
FIG. 20 is a diagram illustrating a preview screen of translated content according to an exemplary embodiment.

FIG. 20 is a diagram illustrating a preview screen of translated content according to an exemplary embodiment.

According to an exemplary embodiment, the first device 101 may pre-display translated content on a screen. That is, the first device 101 may translate the content and output the translated content so that the user may preview how the translated content is to be output by the second device 102 that will receive the content.

According to an exemplary embodiment, the first device 101 may transmit the content to the server and display the translated content by outputting the translated content translated by the server. Alternatively, the first device 101 may directly translate the content and display the translated content.

According to an exemplary embodiment, the translated content may be displayed on preview windows 2003 and 2005. When the first device 101 is set to translate the content into a plurality of languages, the first device 101 may display the content translated into a plurality of languages through a plurality of preview windows 2003 and 2005.

According to an exemplary embodiment, the translated content displayed on the preview windows 2003 and 2005 may be edited by correction, deletion, addition, or the like, and the first device 101 may edit the translated content based on the user input and transmit the edited content to the second device.

FIG. 21A is a diagram illustrating a method for setting a content transmission time according to an exemplary embodiment.

Referring to FIG. 21A, the first device 101 may display a transmission time setting window 2109. The transmission time setting window 2109 may include a receiver setting field 2111 and a transmission time setting field 2113.

According to an exemplary embodiment, the first device 101 may determine a mail transmission time as a predetermined time. For example, the first device 101 may transmit mail immediately or at a predetermined time. Also, according to an exemplary embodiment, the first device 101 may set a mail transmission time for each receiver. The first device 101 may display the mail transmission time set by the user input through the transmission time setting window 2109.

According to an exemplary embodiment, by transmitting information about the set mail transmission time to the server, the first device 101 may control the time of mail transmission from the server to the second device 102, and may transmit the mail to the server at the set mail transmission time.

According to an exemplary embodiment, when setting the transmission time, the first device 101 may display the transmission time in terms of the receiver reception time based on the receiver information or may display the receiver reception time separately from the transmission time.

FIG. 21B is a diagram illustrating a method for recommending a content translation target language according to an exemplary embodiment.

Referring to FIG. 21B, the first device 101 may display a translation target language recommendation window 2129. The translation target language recommendation window 2129 may include a translation object setting field 2121 and a translation target language recommendation field 2122.

According to an exemplary embodiment, the translation target language recommendation field 2122 may be used to provide a recommended translation target language for each receiver.

According to an exemplary embodiment, the first device 101 may determine a recommended translation target language for each receiver based on the translation target language setting history. Alternatively, the first device 101 may determine a recommended translation target language based on the address book information. Alternatively, according to various exemplary embodiments, the first device 101 may determine a recommended translation target language based on the receiver position, the receiver mail reception time, the content details, the receiver IP address, the receiver identification information, the position of the mail server receiving the mail, the mail server name, the receiver transmission/reception history, or the receiver name format.

According to an exemplary embodiment, when not receiving separate user input through the translation target language recommendation window 2129, the first device 101 may set the recommended translation target language as the content translation target language.

On the other hand, when receiving user input for selecting another translation target language through the translation target language recommendation window 2129, the first device 101 may set the selected translation target language as the content translation target language based on the user input for selecting another translation target language. Also, in order to select another translation target language, the user may select a translation target language from the nation list, the language list, or the national representative image list as illustrated in FIGS. 15 and 16.

According to an exemplary embodiment, the first device 101 may recommend a plurality of translation target languages. For example, according to the above exemplary embodiments, the first device 101 may determine and recommend a plurality of translation target languages. Then, at least one of the recommended translation target languages may be selected by the user.

Also, the first device 101 may receive user input for selecting a plurality of translation target languages together. In this case, the first device 101 may set the content translation target language as a plurality of translation target languages. Then, the first device 101 may perform control such that the content may be translated into a plurality of translation target languages before being displayed to the receiver. For example, the first device 101 may transmit information about the plurality of translation target languages and the content to the server. The server may translate the received content into the plurality of translation target languages and transmit the translated content translated into the plurality of translation target languages to the second device 102.

Figure 21C:
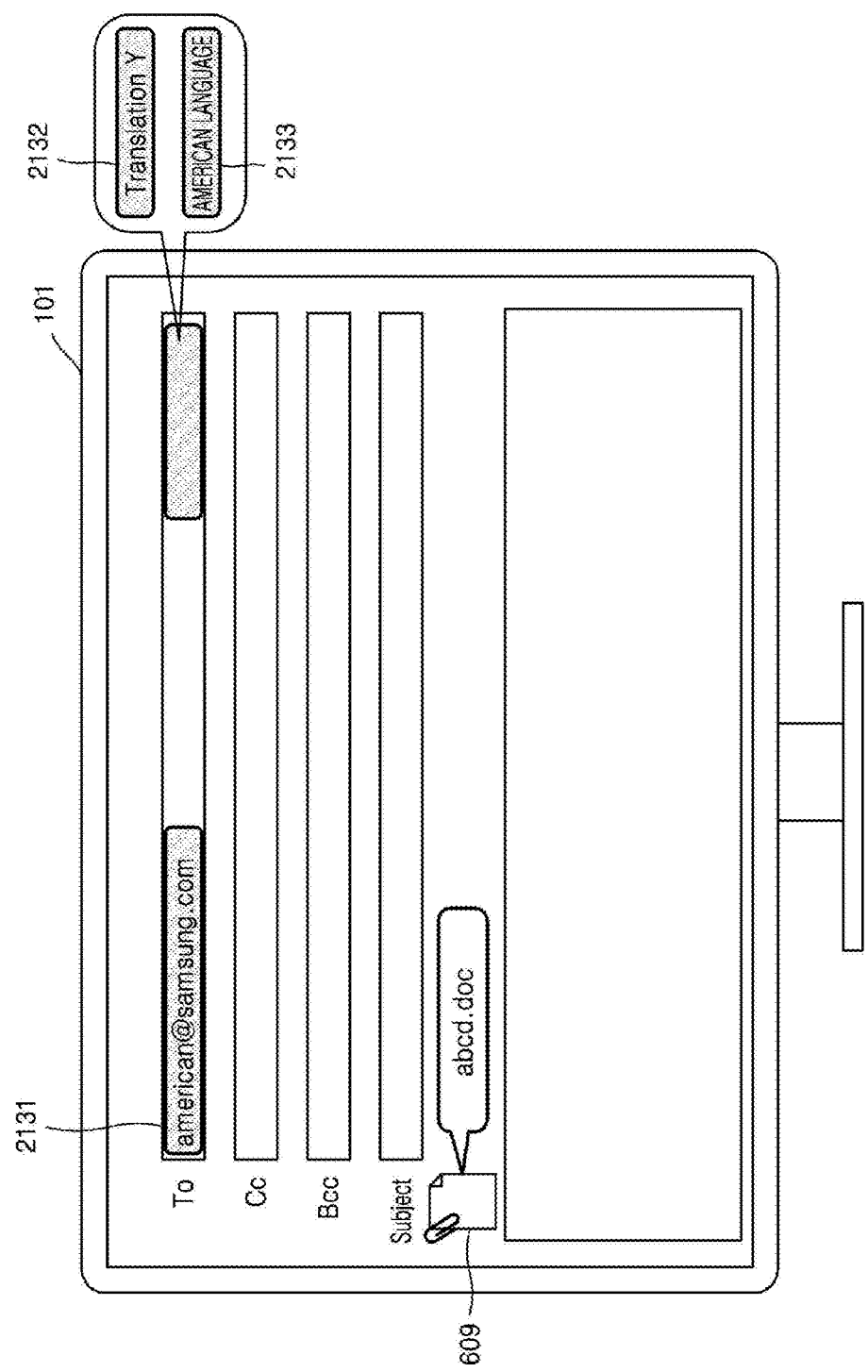
FIG. 21C is a diagram illustrating a content translation setting method according to an exemplary embodiment.

FIG. 21C is a diagram illustrating a content translation setting method according to an exemplary embodiment.

Referring to FIG. 21C, inside or around a receiver field 2131, the first device 101 may provide a translation option field 2132 related to an input receiver or a translation target language field 2133 corresponding to the input receiver.

According to an exemplary embodiment, when a receiver having a history of providing translated content is input, the first device 101 may automatically display "Translation Y" in the translation option field 2132. Alternatively, the first device 101 may display translation target language information about the content transmitted recently to the input receiver in the translation target language field 2133.

According to an exemplary embodiment, the first device 101 may reset the content translation option or the content translation target language based on the user input through the translation option field 2132 or the translation target language field 2133.

For example, the first device 101 may omit the translation of the content to be transmitted to the receiver based on the user input through the translation option field 2132.

Alternatively, based on the user input through the translation target language field 2133, when the nation list, the language list, or the national representative image list is provided as illustrated in FIGS. 15 and 16, the first device 101 may set a content translation target language based on user input for selecting at least one translation target language from the lists.

Figure 22:
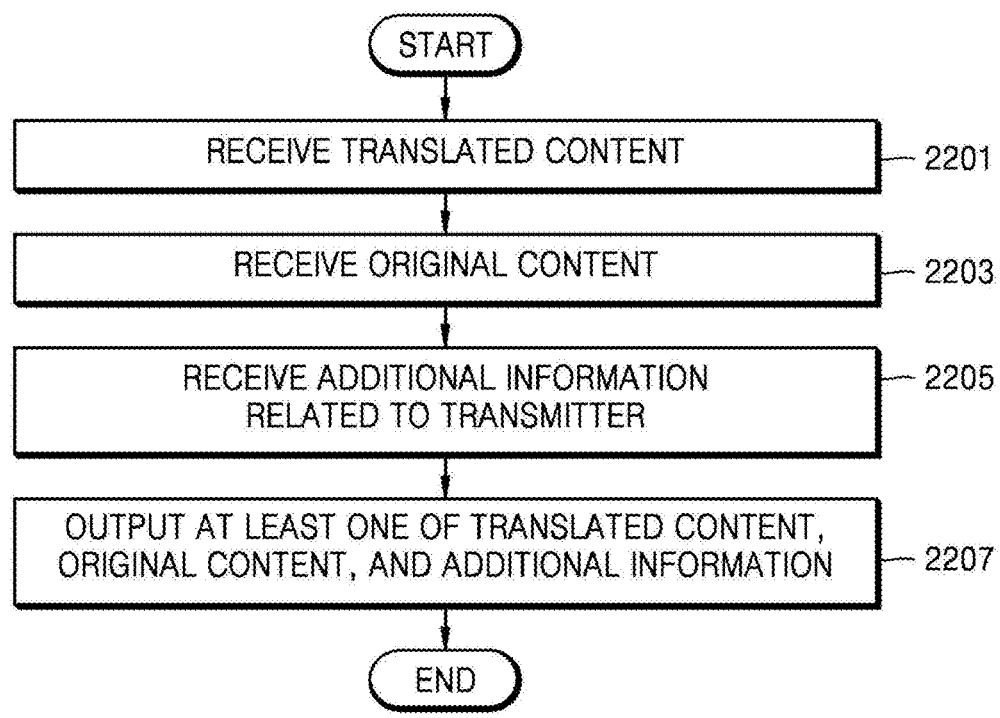
FIG. 22 is a flowchart illustrating a method for outputting translated content according to an exemplary embodiment.

FIG. 22 is a flowchart illustrating a method for outputting translated content according to an exemplary embodiment.

Referring to FIG. 22, in operation 2201, the device may receive translated content. According to an exemplary embodiment, the device may receive the translated content from the server or may receive the translated content from another device.

In operation 2203, the device may receive original content. As described above, the original content may include untranslated content. According to an exemplary embodiment, the device may receive only the untranslated content or may receive both the translated content and the original content. When receiving only the untranslated content, the device may translate the untranslated content and output the translated content.

In operation 2205, the device may receive transmitter information. According to an exemplary embodiment, the device may receive the transmitter information from the server or another device.

According to an exemplary embodiment, the transmitter information may include, but is not limited to, at least one of transmitter account information, Cc receiver account information, transmitter transmission time information, transmitter language information, and transmitter nation information.

In operation 2207, the device may output at least one of the translated content, the original content, and the transmitter information. According to an exemplary embodiment, the device may output the translated content and the original content in different windows, respectively. Alternatively, the device may output the translated content and the transmitter information in one window. However, the method of outputting the translated content, the original content, and the transmitter information is not limited thereto.

According to various aspects of an exemplary embodiment, only one of the operations 2201, 2203, and 2205 may be performed, or operations 2201 to 2207 may not be sequentially performed. Also, according to an exemplary embodiment, the device performing the method shown in FIG. 22 may be the second device 102 or the third device 103.

FIGS. 23A, 23B, 24A, 24B, 25, 26, 27 and 28 are diagrams illustrating methods for outputting translated content according to exemplary embodiments.

Referring to FIG. 23A, the second device 102 may output translated mail. According to an exemplary embodiment, the translated mail may be received from the first device 101 or the server. Also, the second device 102 may display information through each of a transmitter account information field 2301, a receiver account information field 2303, and a reception time field 2305.

According to an exemplary embodiment, information representing a transmitter mail account may be displayed in the transmitter account information field 2301. According to an exemplary embodiment, a receiver mail account may be displayed in the receiver account information field 2303.

According to an exemplary embodiment, a receiver's mail reception time may be displayed in the reception time field 2305. The reception time field 2305 may be displayed based on the receiver position or the receiver nation. Of course, the second device 102 may also display a transmitter's transmission time. According to an exemplary embodiment, the second device 102 may acquire the receiver information from the server, acquire the receiver information based on the user input or the information stored in the device, and display the reception time based on the receiver information.

According to an exemplary embodiment, the translated mail output on the screen illustrated in FIG. 23A may include mail in which at least one of the content included therein is translated. Referring to FIG. 23A, an attached file (abcd.doc) 2307 included in the mail is an attached file translated into the language used by the receiver, and a text of a text body 2309 of the mail is a text translated into the language used by the receiver.

According to an exemplary embodiment, the server may execute the attached file 2307 included in the mail, translate the content included in the attached file 2307, store the translated content, and transmit mail, to which the translated content is reattached, to the receiver.

In detail, referring to FIG. 23B, when mail is received from the first device 101, an attached file identifying unit 2321 of the server 201 may identify whether the received mail includes an attached file. When the mail includes an attached file, the attached file identifying unit 2321 may determine the type of the attached file. For example, the attached file identifying unit 2321 may identify whether the attached file is a text file or an image file.

According to an exemplary embodiment, when the attached file is a text file, the attached file identifying unit 2321 may determine the type of the text file. For example, the attached file identifying unit 2321 may determine the type of the text file (e.g., "ppt" file, "hwp" file, or "docx" file) based on an extension of the text file. Then, the attached file identifying unit 2321 may transmit the text file and information about the type of the text file to a reader 2322. The reader 2322 may read the text file based on the type of the text file in connection with at least one program 2323 capable of opening the text file. When the text file is read, a text extracting unit 2324 (e.g., text extractor) may extract a text from the read text file. A translation engine 2325 may translate the extracted text into the language of the receiver. When the extracted text is translated into the language of the receiver, a writer 2326 may read the text file, convert the initial text into the translated text, and store the text file.

According to an exemplary embodiment, when the attached file is an image file, the attached file identifying unit 2321 may transmit the image file to a text recognizing unit. The text recognizing unit may extract a text from the image file based on the pattern and the aspect ratio of text in the image file. When the text is extracted, the translation engine 2325 may translate the extracted text into the language of the receiver. When the extracted text is translated into the language of the receiver, the writer 2326 may read the image file, convert a text-related image into an image of the translated text, and store the image file.

When the translation of the text file or the image file is completed, the server 201 may transmit the translated text file or the translated image file to the second device 102.

According to an exemplary embodiment, the content included in the mail may include link information. Referring to FIG. 24A, link information of a web page is included in a text body 2409 of the mail.

According to an exemplary embodiment, the second device 102 may translate and output a web page connected based on the link information. Of course, the second device 102 may receive information about the translated web page from the server and display the translated web page based on the received information. For example, when link information of a Korean-based web page, e.g., "http://www.samsung.co.kr", is included in the mail, the server may translate "http://www.samsung.co.kr" connected through the link information and transmit information about the translated web page to the second device 102.

In the method of providing the information about the translated web page to the second device 102, the link information for storing the information about the translated web page may be separately attached, the translated content may be provided by the attached file, and the translation target language information may be provided so that the translated web page may be displayed in real time when the receiver receives and identifies the mail.

According to an exemplary embodiment, when a web page connected based on the link information is a web page displayed in at least one language, the second device 102 may connect to the web page displayed in the language corresponding to the receiver based on the receiver information. For example, when an English-based web page corresponding to "http://www.samsung.co.kr" is "http://www.samsung.com", the second device 102 may forward to an appropriate web page based on the language information corresponding to the receiver.

Figure 24B:
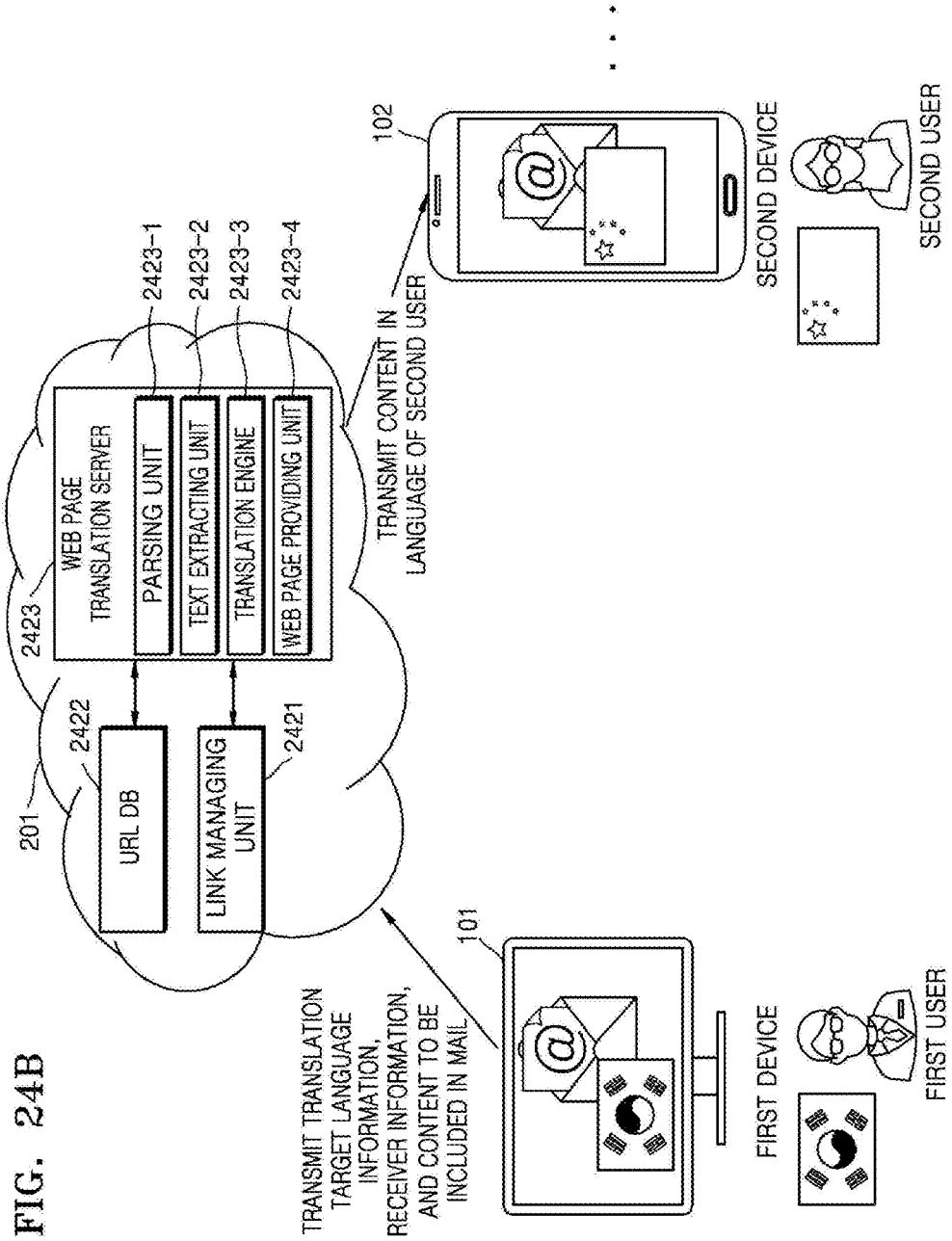

In detail, referring to FIG. 24B, a link managing unit 2421 (e.g., link manager) of the server 201 may identify whether the received mail includes link information. When the mail includes link information, the link managing unit 2421 may search a URL DB 2422 for link information represented in the language corresponding to the receiver related to the link information included in the mail. When the link information represented in the language corresponding to the receiver is identified as a result of the search, the server 201 may convert the link information included in the mail into the newly-identified link information. Then, the server 201 may transmit mail including the converted link information to the second device 102. Alternatively, the server 201 may connect to a web page of the converted link information and transmit mail including the web page to the second device 102. Alternatively, the server 201 may change the web page of the converted link information into a text file or an image file. Then, the server 201 may transmit mail including the text file or the image file to the second device 102. For example, the server 201 may transmit the text file or the image file by inserting the text file or the image file into a text body of the mail or by adding the text file or the image file as the attached file of the mail.

According to an exemplary embodiment, the link managing unit 2421 may fail to search the URL DB 2422 for link information represented in the language corresponding to the receiver related to the link information included in the mail. In this case, the link managing unit 2421 may transmit the link information to a web page translation server 2423. The web page translation server 2423 may translate a web page connected to the link information. For example, a parsing unit 2423-1 (e.g., parser) of the web page translation server 2423 may parse the web page connected to the link information. When the web page is parsed, a text extracting unit 2423-2 (e.g., text extractor) of the web page translation server 2423 may extract a text from the web page. When the text is extracted, a translation engine 2423-3 of the web page translation server 2423 may translate the extracted text into the language corresponding to the receiver. When the text of the web page is translated, a web page providing unit 2423-4 (e.g., web page provider) of the web page translation server 2423 may generate an image file or a text file including the translated text and transmit the generated file to the link managing unit 2421.

The server 201 including the link managing unit 2421 may transmit the generated text file or image file to the second device 102. For example, the server 201 may transmit the text file or the image file by inserting the text file or the image file into the text body of the mail or by adding the text file or the image file as the attached file of the mail.

According to an exemplary embodiment, the second device 102 may output the translated content and the original content together.

Figure 25:
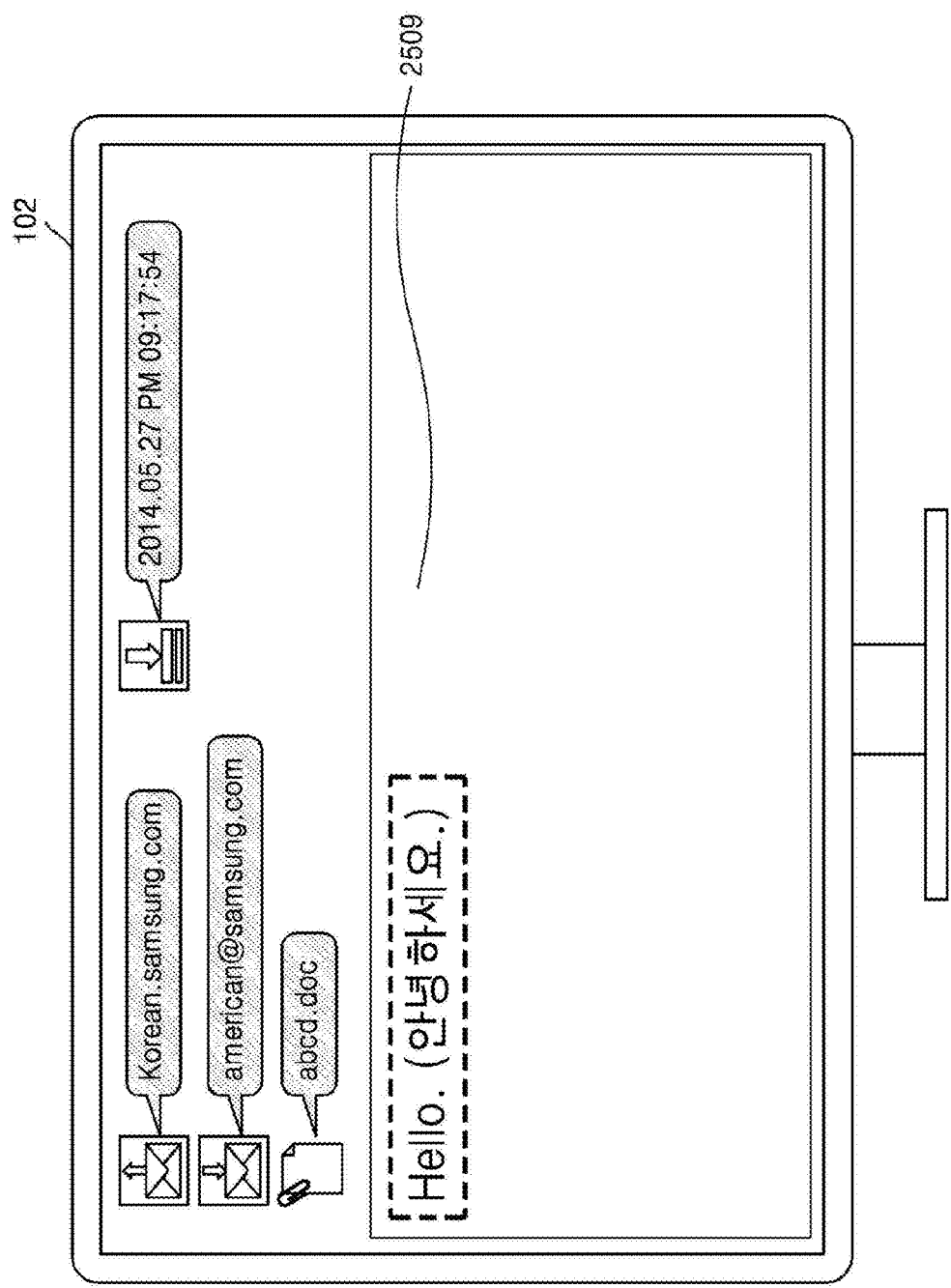

Referring to FIG. 25, the second device 102 may display the translated content and the original content in a text body 2509 of the mail.

According to an exemplary embodiment, the second device 102 may determine whether to display the translated content and the original content based on user input. For example, based on the user input, the second device 102 may display only the translated content, display the translated content and the original content, or display only the original content. Also, based on the user input, the second device 102 may display the translated content and the original content in different windows or in the same window.

According to an exemplary embodiment, the second device 102 may display a transmitter's reception time.

Figure 26:
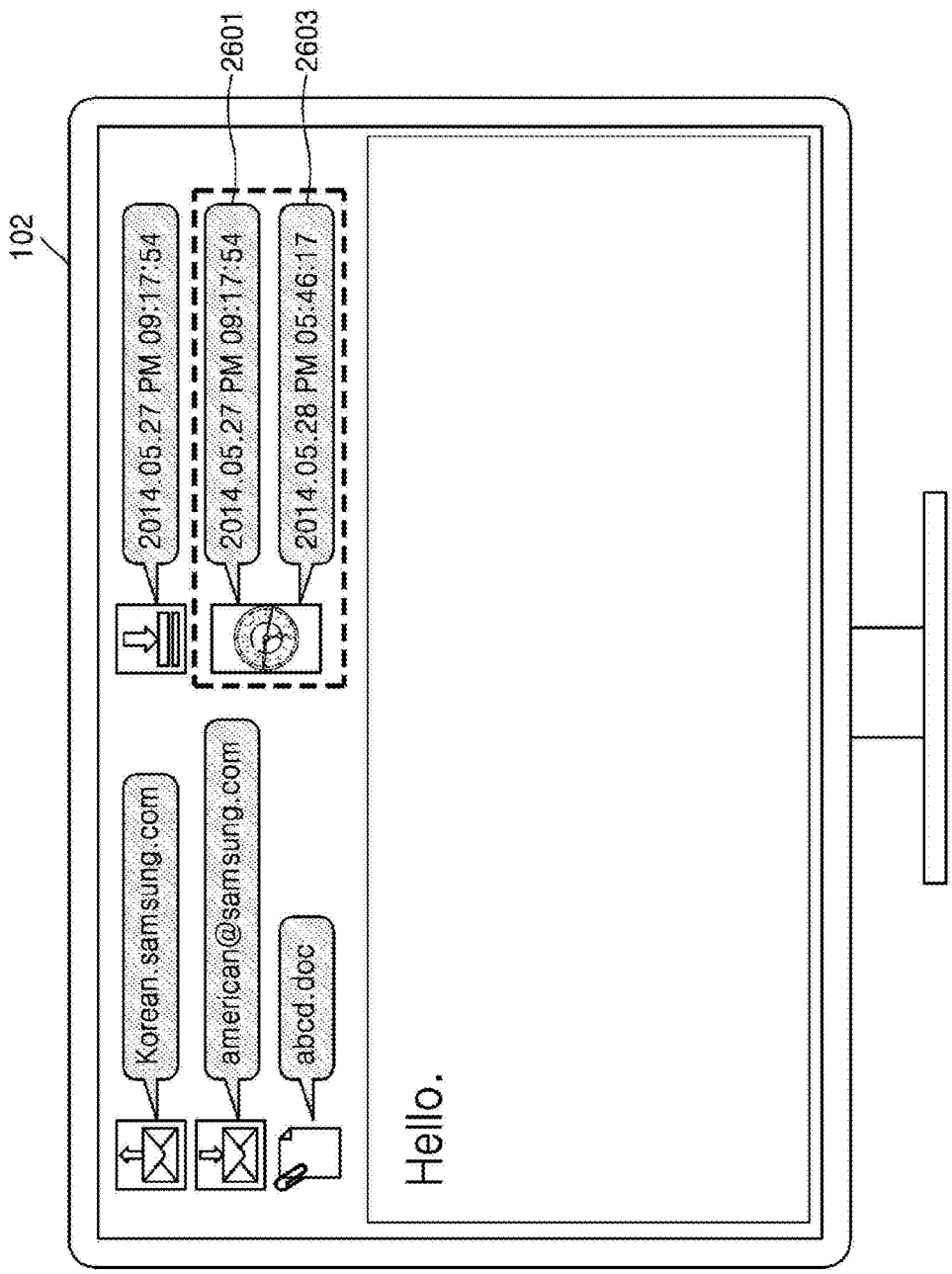

Referring to FIG. 26, the second device 102 may display a mail reception time. According to an exemplary embodiment, the mail reception time may include the time of the mail being opened by the receiver or the time of the mail being received in the device.

According to an exemplary embodiment, the second device 102 may display a receiver's mail reception time in a receiver's mail reception time field 2601 based on at least one of receiver position information, receiver nation information, and information received from the server.

Also, according to an exemplary embodiment, the second device 102 may display a transmitter's mail reception time in a transmitter's mail reception time field 2603 based on at least one of the receiver's mail reception time, the receiver position information, the receiver nation information, and the information received from the server. According to an exemplary embodiment, the second device 102 may display a transmitter's mail transmission time.

According to an exemplary embodiment, the second device 102 may estimate the transmitter's or receiver's reception time based on the transmitter and receiver information and display the estimated transmitter's or receiver's reception time.

According to an exemplary embodiment, the second device 102 may display a transmitter's nationality.

Figure 27:
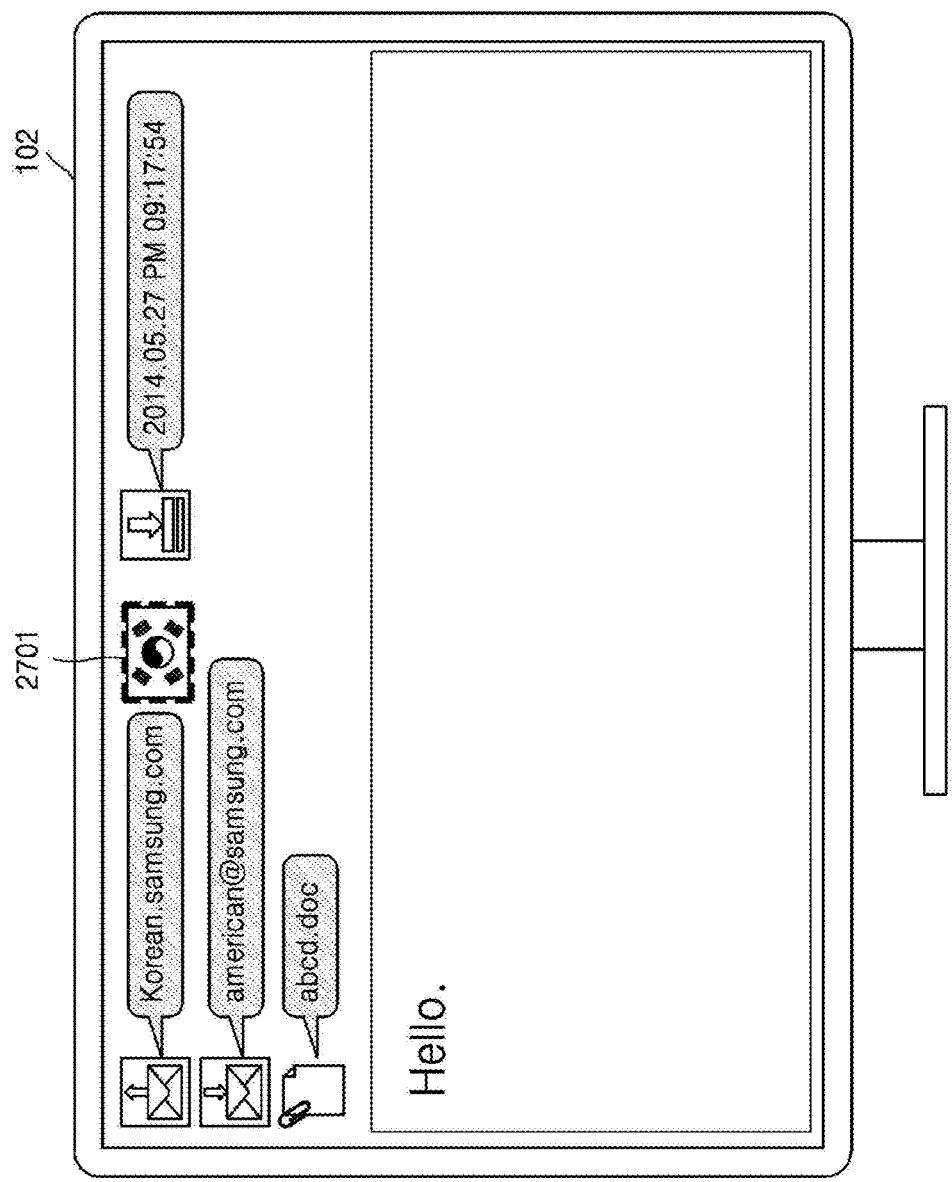

Referring to FIG. 27, the second device 102 may display transmitter nationality information in a transmitter nationality field 2701. According to an exemplary embodiment, the second device 102 may display the transmitter nationality information in text or an image such as a national flag. However, exemplary embodiments are not limited thereto, and the second device 102 may communicate the transmitter nationality information by audio date or a moving image. According to an exemplary embodiment, the transmitter nationality information may also include transmitter position information.

Also, according to an exemplary embodiment, receiver nationality information may be included therein.

According to an exemplary embodiment, the second device 102 may receive the transmitter information from the server and display the transmitter's nation based on the received transmitter information.

Also, as described above, the second device 102 may acquire the transmitter nation information based on information estimated as the transmitter-related information among the information included in the received content and display the acquired transmitter nation information.

According to an exemplary embodiment, the second device 102 may display translation accuracy information in a translation accuracy field 2801. According to an exemplary embodiment, the transmission accuracy information may include information about how accurately the content is translated.

According to an exemplary embodiment, the second device 102 may receive the translation accuracy information from the server or may directly measure the translation accuracy. According to an exemplary embodiment, the translation accuracy may be measured in various ways. For example, the second device 102 may measure the translation accuracy based on the translation accuracy of a word or measure the translation accuracy by inversely translating the translated content and measuring the similarity between the inversely-translated content and the original content.

Figure 28:
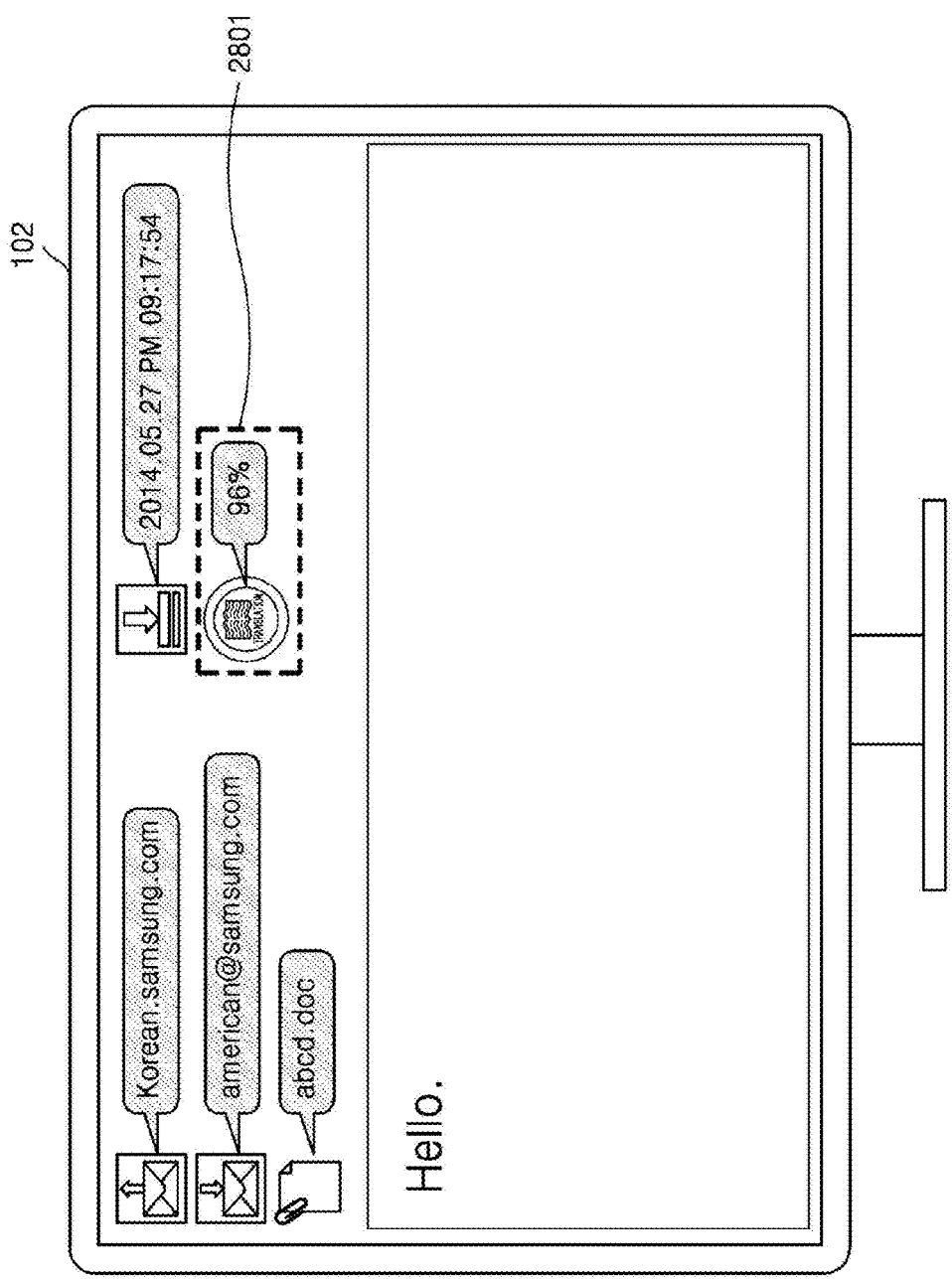

Referring to FIG. 28, the second device 102 may display the translation accuracy of the translated content in the translation accuracy field 2801.

Figure 29:
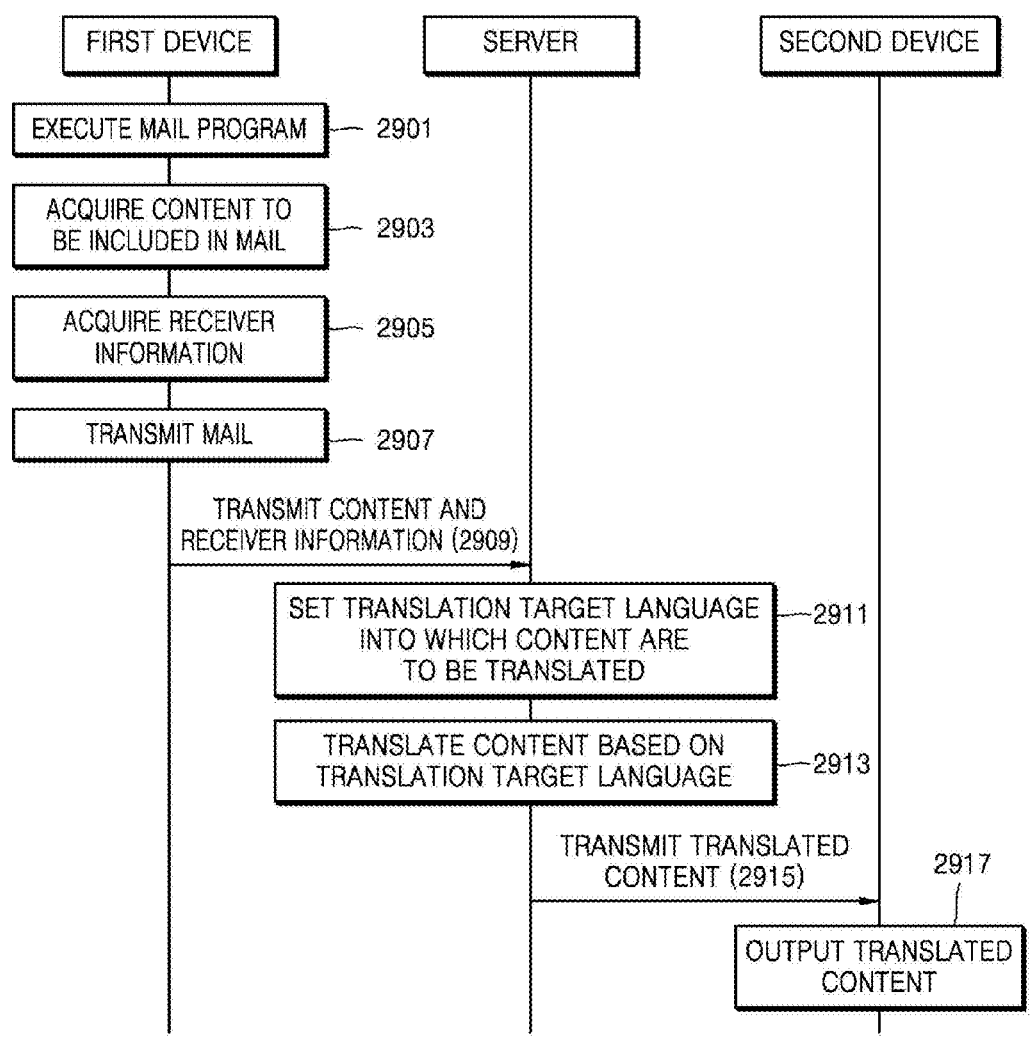
FIG. 29 is a flow diagram illustrating a method for providing translated content according to an exemplary embodiment.

FIG. 29 is a flow diagram illustrating a method for providing translated content according to an exemplary embodiment.

Referring to FIG. 29, in operation 2901, the first device may execute a mail program. According to an exemplary embodiment, the mail program may include a program that is executed by the first device to transmit mail to a receiving device or a receiver account based on user input. Also, according to an exemplary embodiment, the first device may receive web page information for providing a mail service from a web server through a web browser and display the received web page information. This feature corresponds to a similar feature described above with reference to FIG. 5.

In operation 2903, the first device may acquire content to be included in the mail. According to an exemplary embodiment, the first device may acquire the content to be included in the mail based on user input. The content to be included in the mail may include various types of content. Since the content to be included in the mail may correspond to the various types of content described above, a detailed description thereof will be omitted for conciseness.

In operation 2905, the first device may acquire receiver information. According to an exemplary embodiment, the first device may acquire the receiver information based on user input. Since this feature corresponds to a similar feature described above, a detailed description thereof will be omitted for conciseness.

In operation 2907, the first device may transmit mail. According to an exemplary embodiment, the first device may transmit the mail to the second device or to the server. According to an exemplary embodiment, the mail transmitted by the first device may include receiver mail account information.

In operation 2909, the first device may transmit the content and the receiver information to the server. According to an exemplary embodiment, the first device may transmit the content and the receiver information to the second device.

In operation 2911, the server may determine a content translation target language. According to an exemplary embodiment, the server may determine the language corresponding to the receiver based on the receiver information received from the first device. For example, the server may determine the language corresponding to the receiver based on the Internet search or the transmission/reception history information stored in the server or may determine the language corresponding to the receiver based on the account information included in the receiver information. Also, the server may receive information about the content translation target language from the first device and determine the translation target language based on the received information. Also, the server may determine whether to perform a translation for each receiver.

In operation 2913, the server may translate the content based on the translation target language. According to an exemplary embodiment, the server may translate some or all of the content based on the translation option information received from the first device.

In operation 2915, the server may transmit the translated content to the second device. Also, the server may transmit mail to the second device together with the translated content. According to an exemplary embodiment, the server may transmit the transmitter information to the second device.

In operation 2917, the second device may output the translated content. Also, according to an exemplary embodiment, the second device may output the original content together with the translated content. According to an exemplary embodiment, the second device may output the transmitter information.

Figure 30:
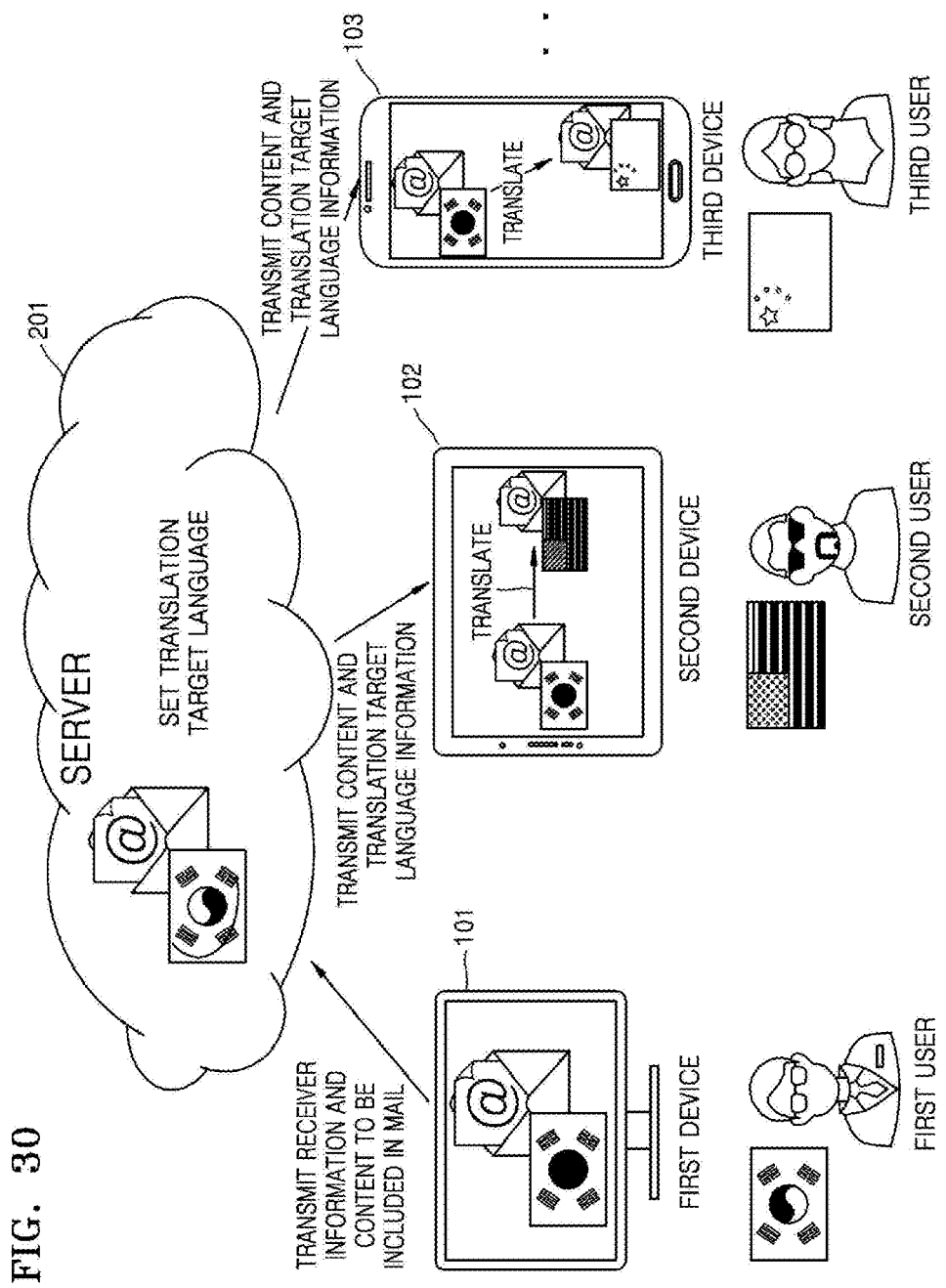
FIG. 30 is a diagram illustrating a method for translating content by a second device according to an exemplary embodiment.

FIG. 30 is a diagram illustrating a method for translating content by a second device according to an exemplary embodiment.

Referring to FIG. 30, the second device 102 may receive content and translation target language information from the server and translate the content based on the translation target language information.

According to an exemplary embodiment, the first device 101 may transmit receiver information and content included in mail to the server 201. According to an exemplary embodiment, the first device 101 may determine the language corresponding to the receiver and request the server to translate the content based on the determined language.

According to an exemplary embodiment, the server 201 may receive the receiver information and the content included in the mail from the first device 101. The server 201 may set a translation target language based on the received receiver information. The server 201 may set the translation target language in the same way as the method of determining the language corresponding to the receiver by the first device 101. Since this features corresponds to the feature described above, a detailed description thereof will be omitted for conciseness.

According to an exemplary embodiment, the server 201 may directly translate the content based on the set translation target language.

Figure 31:
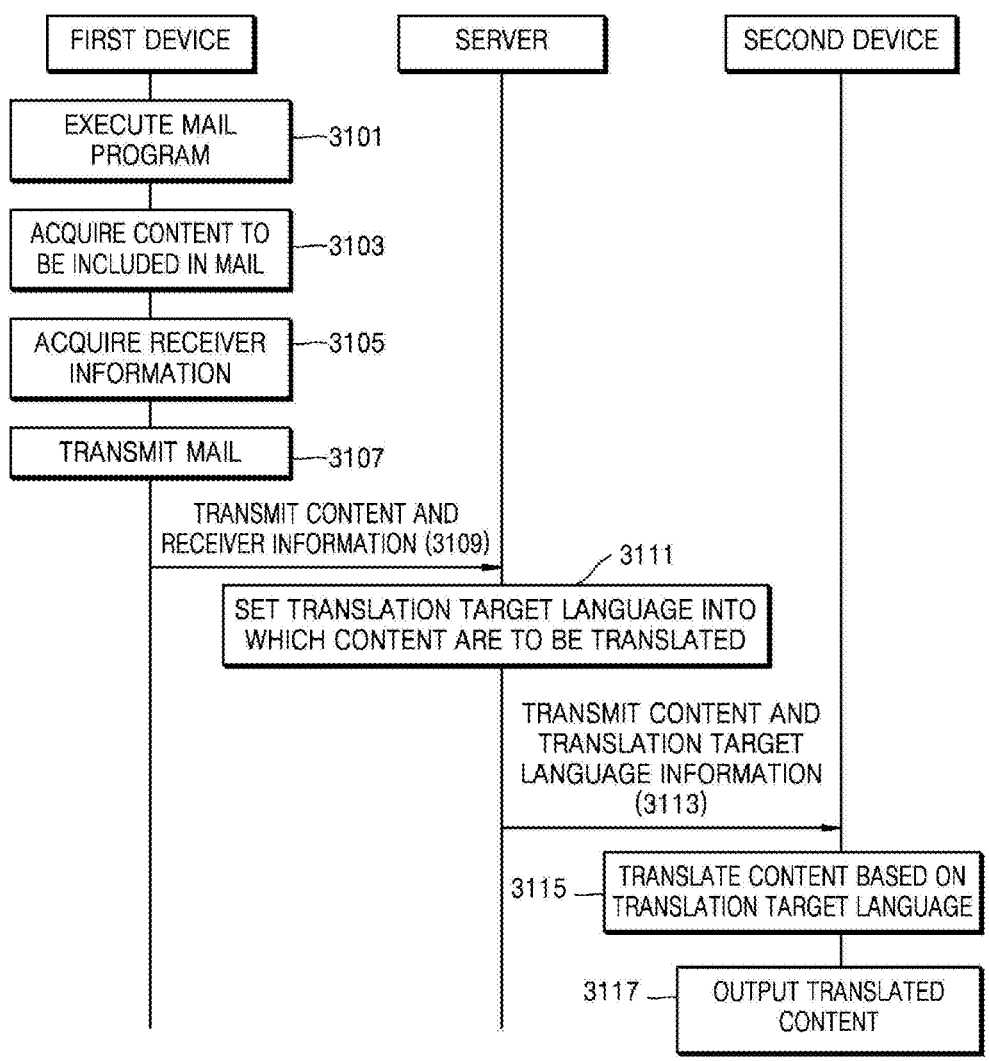
FIG. 31 is a flow diagram illustrating a method for translating content by a second device according to an exemplary embodiment.

FIG. 31 is a flow diagram illustrating a method for translating content by a second device according to an exemplary embodiment.

Since operations 3101, 3103, 3105, 3107, 3109 and 3111 correspond to operations 2901, 2903, 2905, 2907, 2909 and 2911 illustrated in FIG. 29, detailed descriptions thereof will be omitted for conciseness.

In operation 3113, the server may transmit content and translation target language information to the second device. Without translating the content, the server may transmit the original content received from the first device to the second device.

In operation 3115, the second device may translate the received content based on the received translation target language information. According to an exemplary embodiment, the second device may determine the translation target language based on the user input of the second device, the user information of the second device, or the information of the second device instead of the received translation target language information and translate the content based on the determined translation target language.

According to an exemplary embodiment, the user information of the second device may include identification information, nationality information, and language information of the user of the second device. The information of the second device may include information corresponding to the device information described above.

In operation 3117, the second device may output the translated content. According to an exemplary embodiment, the second device may output the original content together with the translated content. Also, the second device may receive the transmitter information from the server or the first device, output the received transmitter information, and receive at least one of the translation accuracy and the content reception time.

Figure 32:
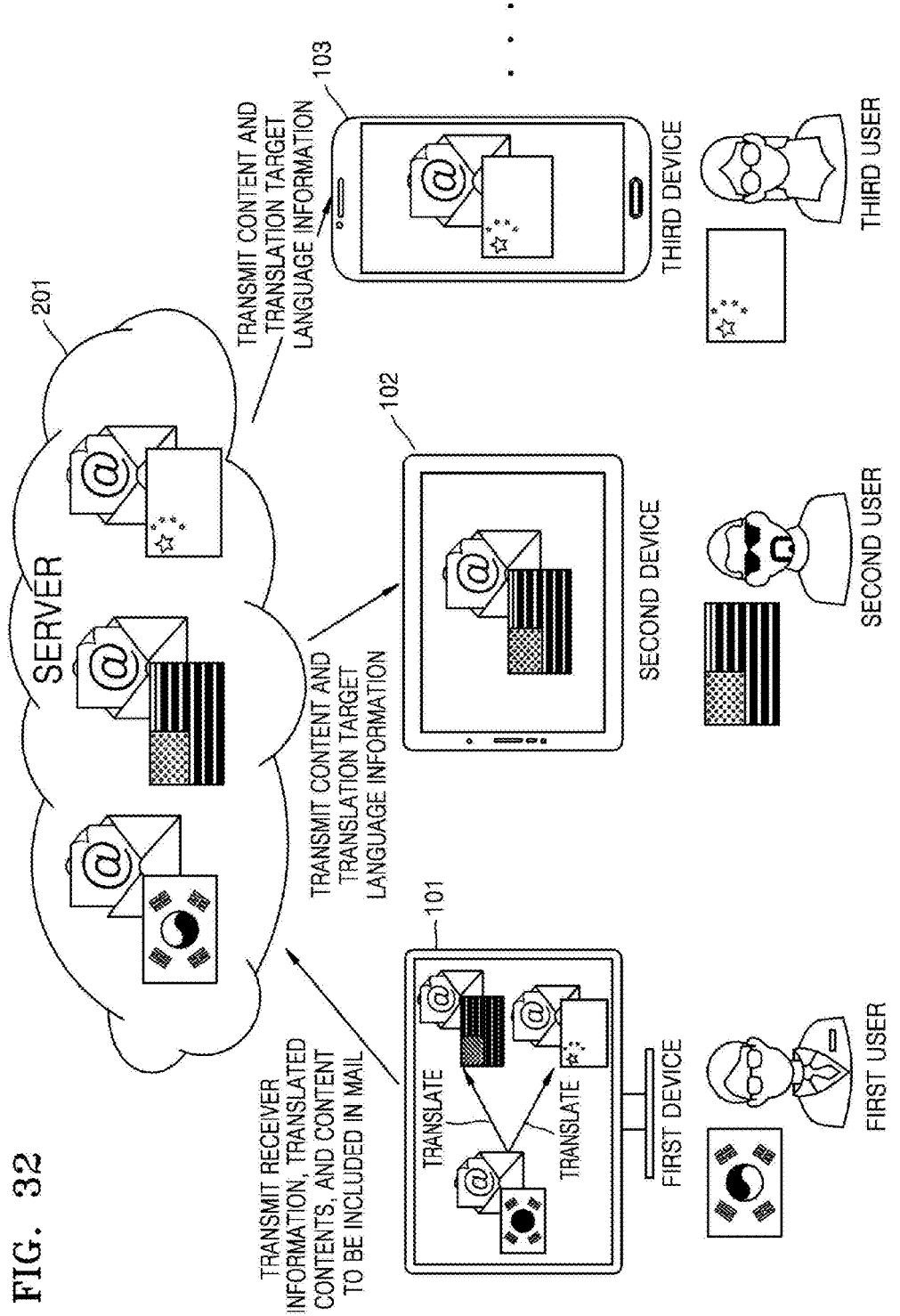
FIG. 32 is a diagram illustrating a method for translating content by a first device according to an exemplary embodiment.

FIG. 32 is a diagram illustrating a method for translating content by a first device according to an exemplary embodiment.

Referring to FIG. 32, the first device 101 may translate the content to be included in mail and transmit the translated content to the server 201 together with or separately from the mail. Also, the first device 101 may transmit the receiver information to the server 201.

According to an exemplary embodiment, the server 201 may transmit the translated content received from the first device 101 to at least one of the second device 102 and the third device 103. According to an exemplary embodiment, the server 201 may transmit the transmitter information to at least one of the second device 102 and the third device 103.

Also, according to an exemplary embodiment, when receiving the original content from the first device 101, the server 201 may transmit the received original content to at least one of the second device 102 and the third device 103.

According to an exemplary embodiment, the second device 102 may receive the translated content from the server 201 and output the received translated content. When receiving the original content from the server 201, the second device 102 may output the translated content and the original content together. Also, when receiving the transmitter information from the server 201, the second device 102 may display the received transmitter information. Also, according to an exemplary embodiment, the second device 102 may display the transmitter's or receiver's reception time. The third device 103 may also display the same information as the second device 102.

Figure 33:
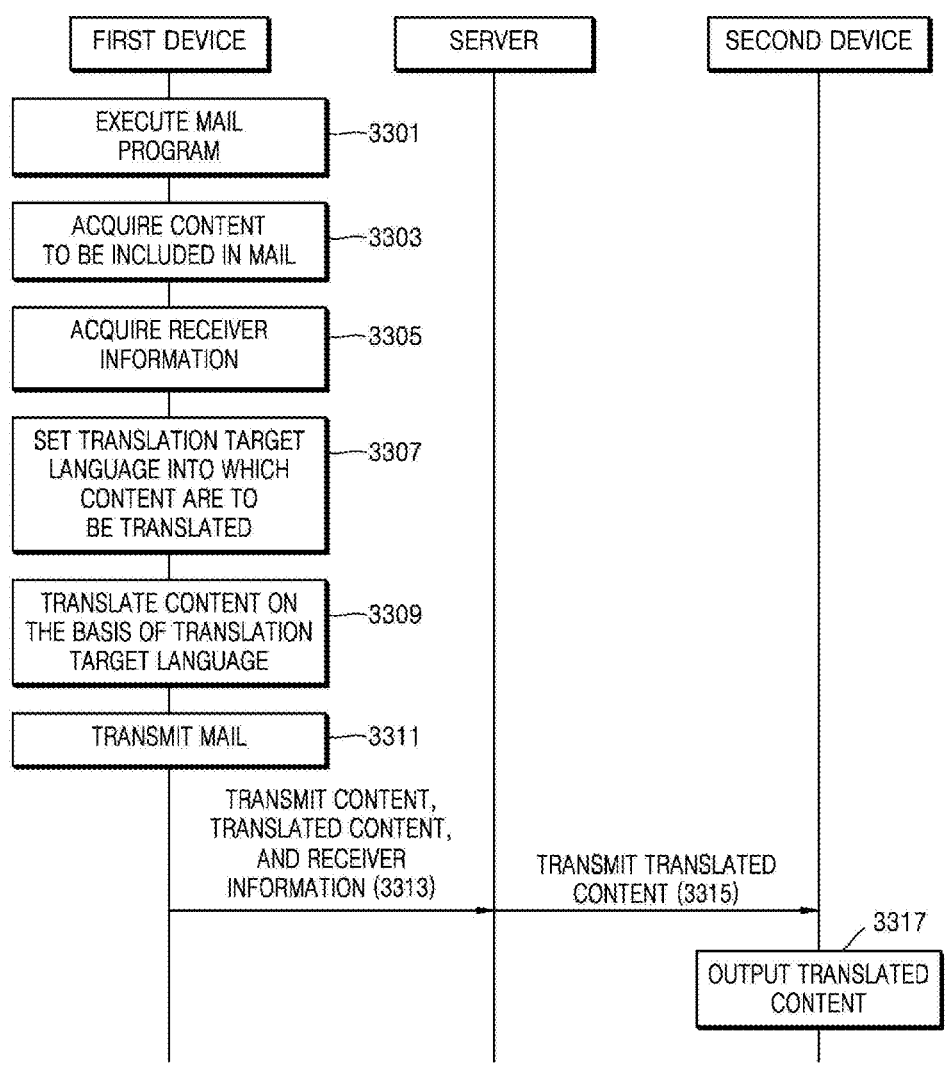
FIG. 33 is a flow diagram illustrating a method for translating content by a first device according to an exemplary embodiment.

FIG. 33 is a flow diagram illustrating a method for translating content by a first device according to an exemplary embodiment.

Since operations 3301, 3303 and 3305 correspond to operations 2901, 2903 and 2905 illustrated in FIG. 29, detailed descriptions thereof will be omitted for conciseness.

In operation 3307, the first device may determine a content translation target language. The content translation target language may refer to the language corresponding to the receiver. According to an exemplary embodiment, the first device may set the content translation target language based on the receiver information or may set the content translation target language based on the user input of the first device; however, exemplary embodiments are not limited thereto. Since this feature corresponds to a similar feature described above, a detailed description thereof will be omitted for conciseness.

Also, according to an exemplary embodiment, the first device 101 may set the content translation target language and the content translation option for each of the content and each receiver.

In operation 3309, the first device may translate the content based on the determined translation target language.

In operation 3311, the first device may transmit the mail to the server. According to an exemplary embodiment, the first device may transmit the original content and the transmitter information to the server. Also, according to an exemplary embodiment, receiver account information may be included in the mail.

In operation 3313, the first device may transmit the translated content and the receiver information to the server.

In operation 3315, the server may transmit the translated content and the receiver information received from the first device to the second device. Also, according to an exemplary embodiment, when further receiving at least one of the original content and the transmitter information from the first device, the server may transmit at least one of the received original content and the received transmitter information to the second device.

In operation 3317, the second device may output the translated content. Also, according to an exemplary embodiment, the second device may output various types of information together with the translated content as described above.

Figure 34:
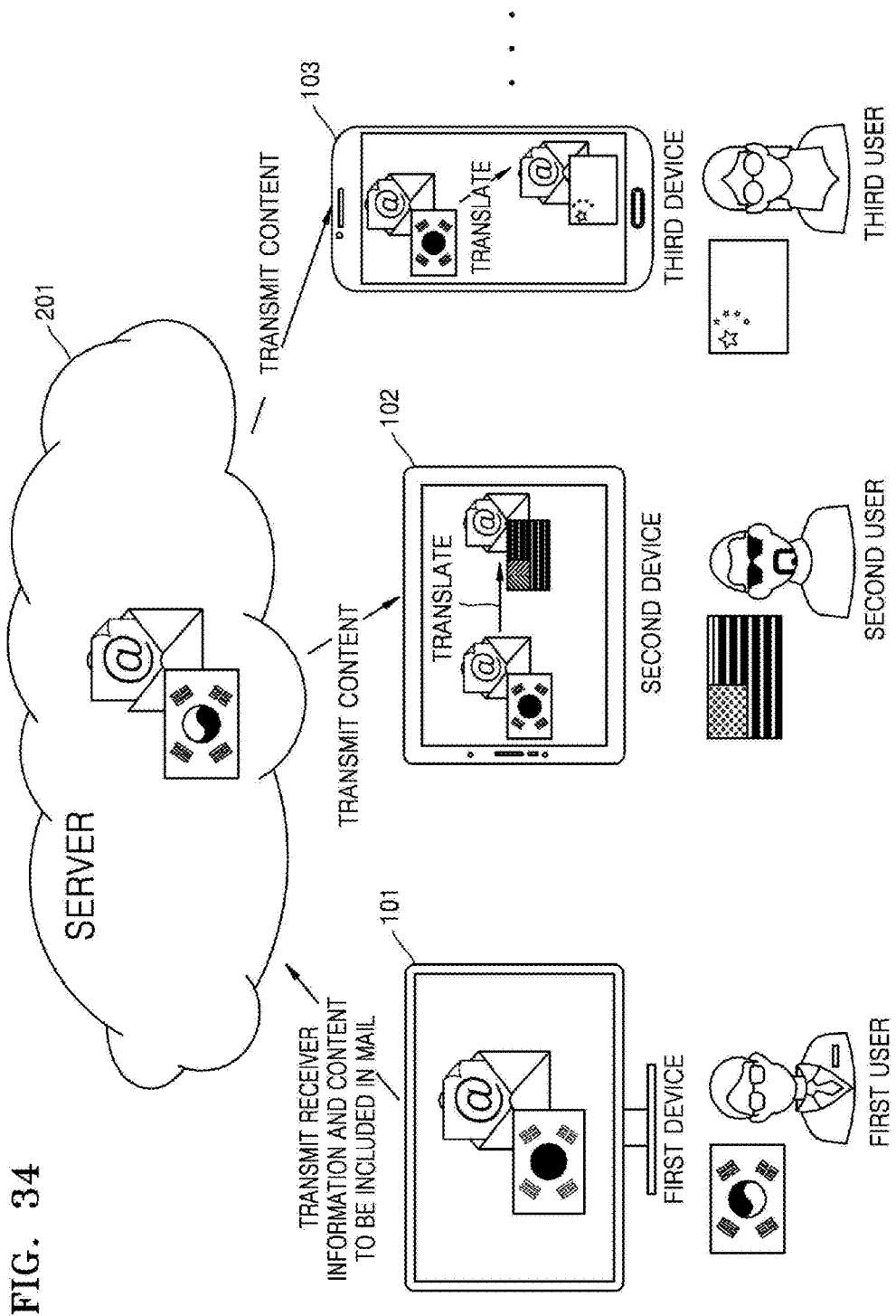
FIG. 34 is a diagram illustrating a method for translating content by a second device or a third device according to an exemplary embodiment.

FIG. 34 is a diagram illustrating a method for translating content by a second device or a third device according to an exemplary embodiment.

Referring to FIG. 34, the first device 101 may transmit receiver information and content included in mail to the server 201. According to an exemplary embodiment, when a translation target language is determined, the first device 101 may transmit the determined translation target language to the server 201. Also, according to an exemplary embodiment, the first device 101 may transmit the transmitter information to the server 201.

According to an exemplary embodiment, the server 201 may transmit the content received from the first device 101 to at least one of the second device 102 and the third device 103. According to an exemplary embodiment, when receiving the transmitter information or the translation target language information from the first device 101, the server 201 may transmit the transmitter information or the translation target language information to the second device 102 or the third device 103.

According to an exemplary embodiment, the second device 102 may receive the content from the server 201 and translate the received content. According to an exemplary embodiment, the second device 102 may receive user input from the user of the second device 102 and determine the content translation target language based on the received user input or the second device information. Also, according to an exemplary embodiment, when receiving the translation target language information from the server, the second device 102 may determine the content translation target language based on the received translation target language information.

According to an exemplary embodiment, the second device 102 may output the translated content. Since this feature corresponds to a feature described above, a detailed description thereof will be omitted for conciseness.

Figure 35:
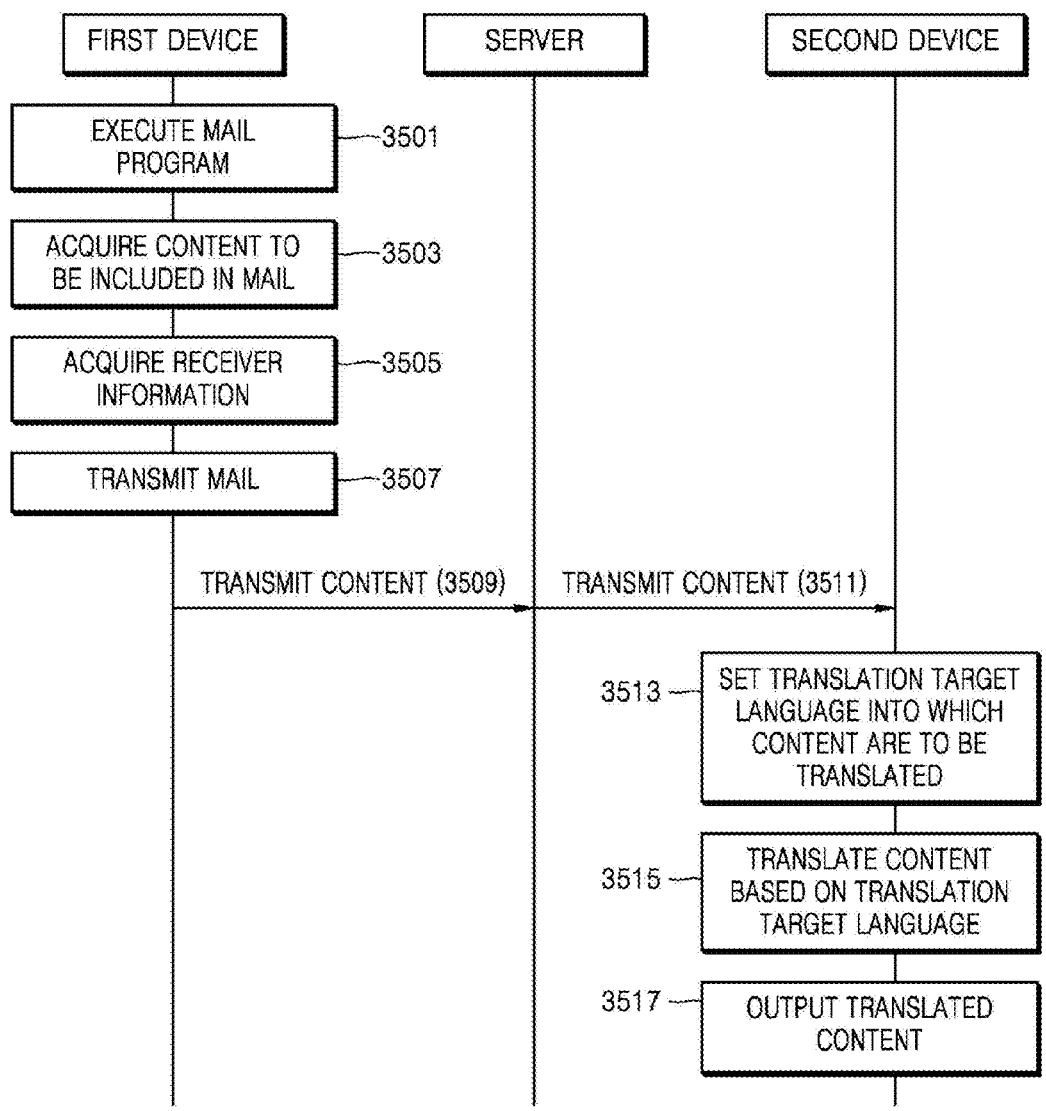
FIG. 35 is a flow diagram illustrating a method for translating content by a second device or a third device according to an exemplary embodiment.

FIG. 35 is a flow diagram illustrating a method for translating content by a second device or a third device according to an exemplary embodiment.

Since operations 3501, 3503, 3505 and 3507 correspond to operations 3101, 3103, 3105 and 3107 illustrated in FIG. 31, detailed descriptions thereof will be omitted for conciseness.

In operation 3509, the first device may transmit the content to the server. According to an exemplary embodiment, the first device may transmit the receiver information to the server.

In operation 3511, the server may transmit the content received from the first device to the second device. According to an exemplary embodiment, the server may transmit the transmitter information to the second device.

In operation 3513, the second device may determine the content translation target language. Since this feature corresponds to a feature described above, a detailed description thereof will be omitted for conciseness.

In operation 3515, the second device may translate the content based on the translation target language determined in operation 3513.

In operation 3517, the second device may output the translated content. According to an exemplary embodiment, the second device may output the original content together with the translated content. Also, the second device may display the transmitter information and the content or the mail reception time.

Figure 36:
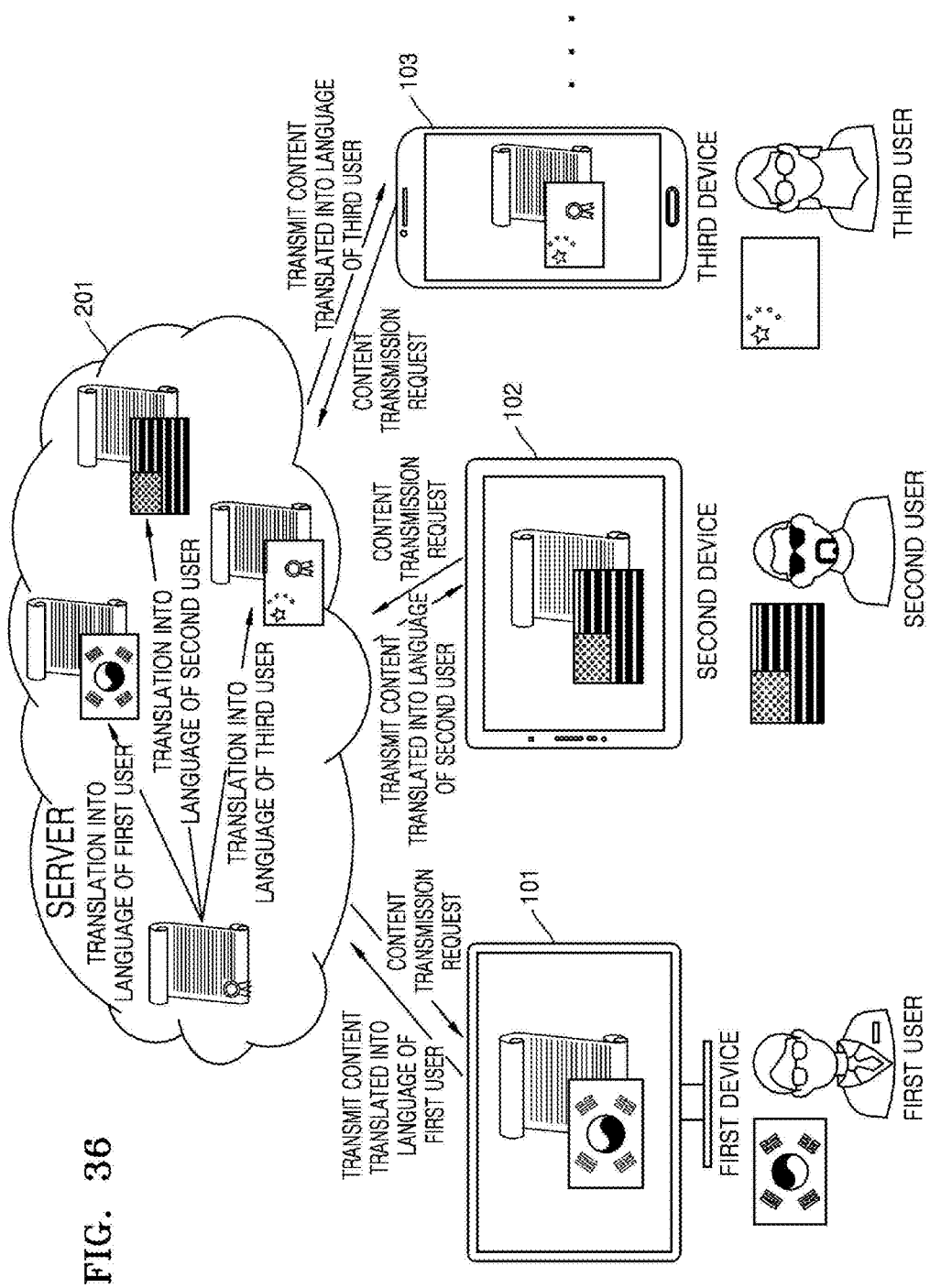
FIG. 36 is a diagram illustrating a method for translating content stored in a server and providing the translated content according to an exemplary embodiment.

FIG. 36 is a diagram illustrating a method for translating content stored in a server and providing the translated content according to an exemplary embodiment.

Referring to FIG. 36, the server 201 may receive a content transmission request from one or more devices 101 to 103. Based on the received content transmission request, the server 201 may translate the content stored in the server into the language corresponding to the user of each device and transmit the translated content to the one or more devices 101 to 103.

According to an exemplary embodiment, the server 201 may receive the content transmission request from the one or more devices 101 to 103 and acquire the receiver information based on the received content transmission request.

According to an exemplary embodiment, the one or more devices 101 to 103 may transmit the content to the server 201 and request the server 201 to translate the content.

Figure 37:
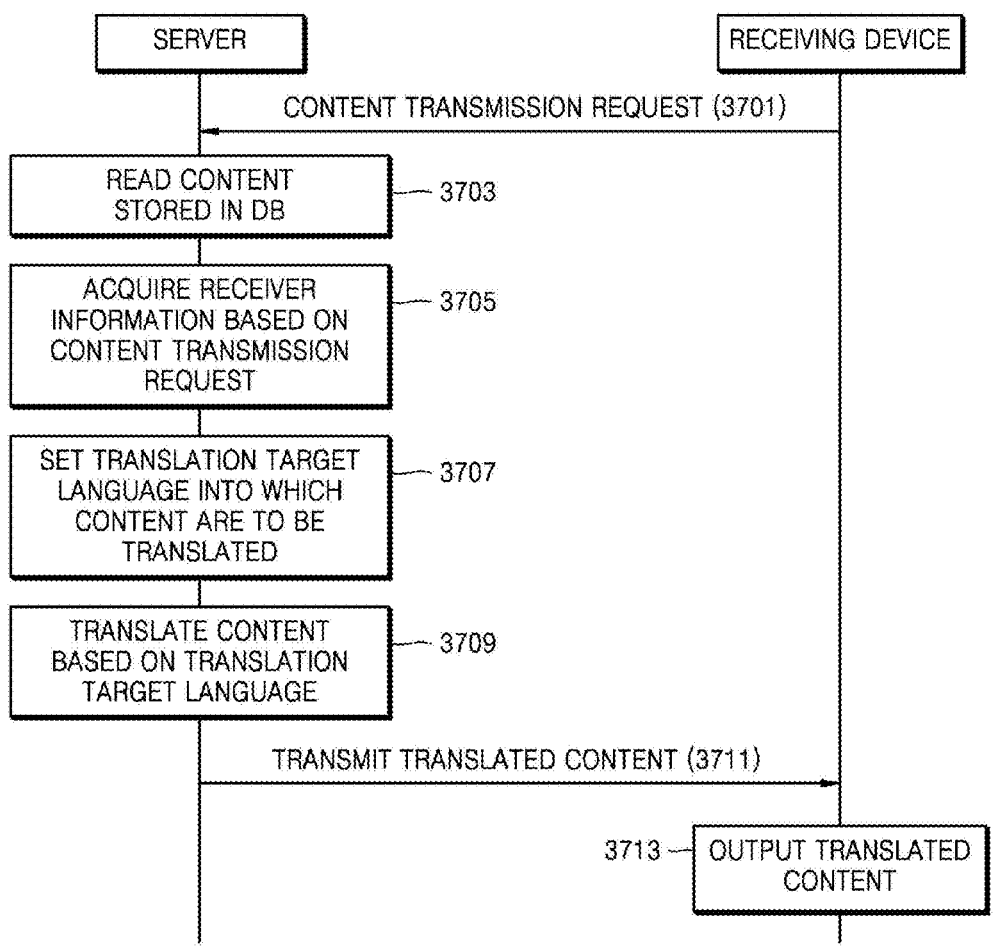
FIGS. 37 and 38 are flow diagrams illustrating methods for translating content stored in a server and providing the translated content according to exemplary embodiments.
Figure 38:
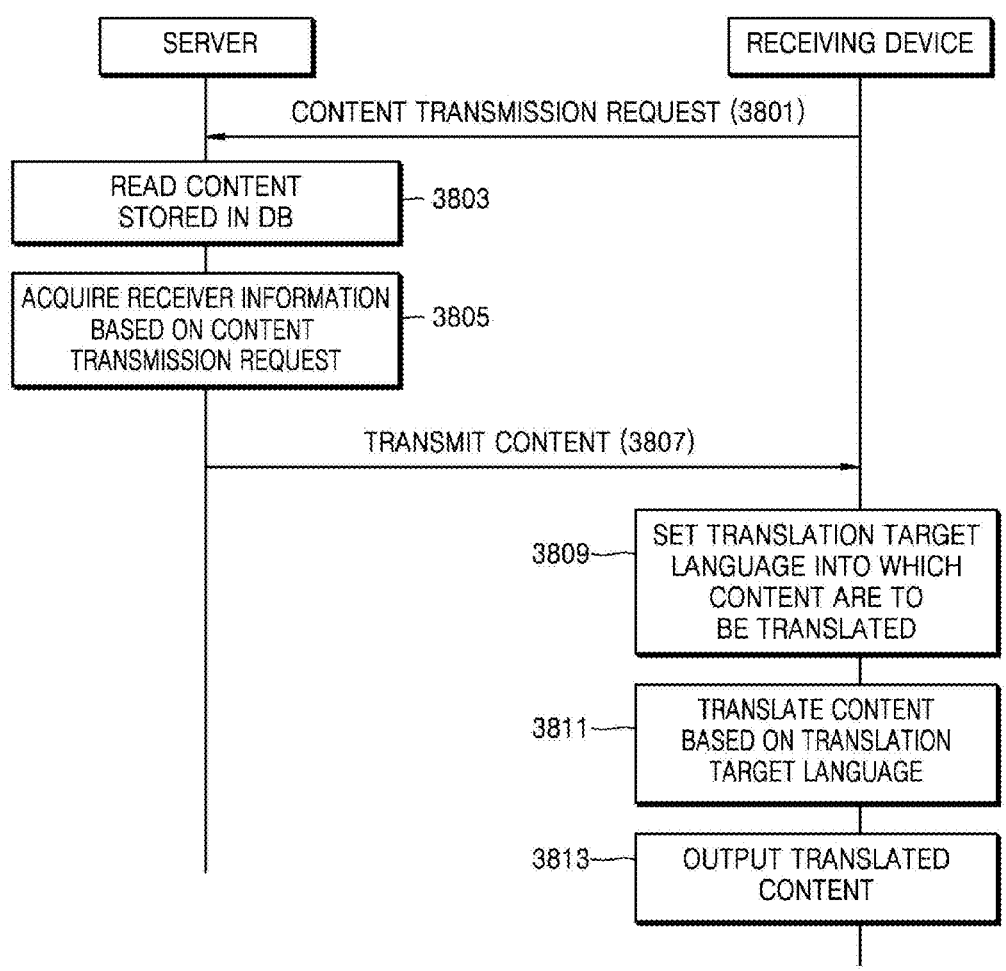

FIGS. 37 and 38 are flow diagrams illustrating methods for translating content stored in a server and providing the translated content according to exemplary embodiments.

Referring to FIG. 37, in operation 3701, the server may receive the content transmission request from the device. According to an exemplary embodiment, the content transmission request may include the device information or the receiver information.

In operation 3703, the server may read the content stored in the DB. Also, according to an exemplary embodiment, the server may acquire the content from another server or a content provider.

In operation 3705, the server may acquire the receiver information based on the content transmission request. Also, the server may acquire the device information based on the content transmission request. According to an exemplary embodiment, since the server has acquired the receiver information based on the content transmission request, the server may identify the device requesting the content based on the receiver information and transmit the content.

In operation 3707, the server may determine the content translation target language. The content translation target language may include the language corresponding to the receiver and the user of the device. According to an exemplary embodiment, the server may determine the translation target language based on at least one of the device information and the receiver information acquired in operation 3705. Since this feature corresponds to a feature described above, a detailed description thereof will be omitted for conciseness.

In operation 3709, the server may translate the content based on the translation target language.

In operation 3711, the server may transmit the translated content to the device. According to an exemplary embodiment, the server may transmit the original content to the device separately from the translated content.

In operation 3713, the device may output the translated content received from the server. Also, according to an exemplary embodiment, when receiving the original content from the server, the device may display the translated content and the original content together.

Referring to FIG. 38, in operation 3801, the server may receive the content transmission request from the device.

In operation 3803, the server may read the content stored in the DB.

In operation 3805, the server may acquire the receiver information based on the content transmission request. Since operations 3801, 3803 and 3805 correspond to operations 3701, 3703 and 3705 illustrated in FIG. 37, detailed descriptions thereof will be omitted for conciseness.

In operation 3807, the server may transmit the content to the device. That is, unlike in FIG. 37, in FIG. 38, the server may provide the original content without translating the content.

In operation 3809, the device may determine the content translation target language based on the content received from the server. Since the method of determining the content translation target language corresponds to a feature described above, detailed descriptions thereof will be omitted for conciseness.

In operation 3811, the device may translate the content based on the determined translation target language.

In operation 3813, the device may output the translated content. Since operations 3811 and 3813 correspond to operations 3709 and 3713 illustrated in FIG. 37, detailed descriptions thereof will be omitted for conciseness.

Figure 39:
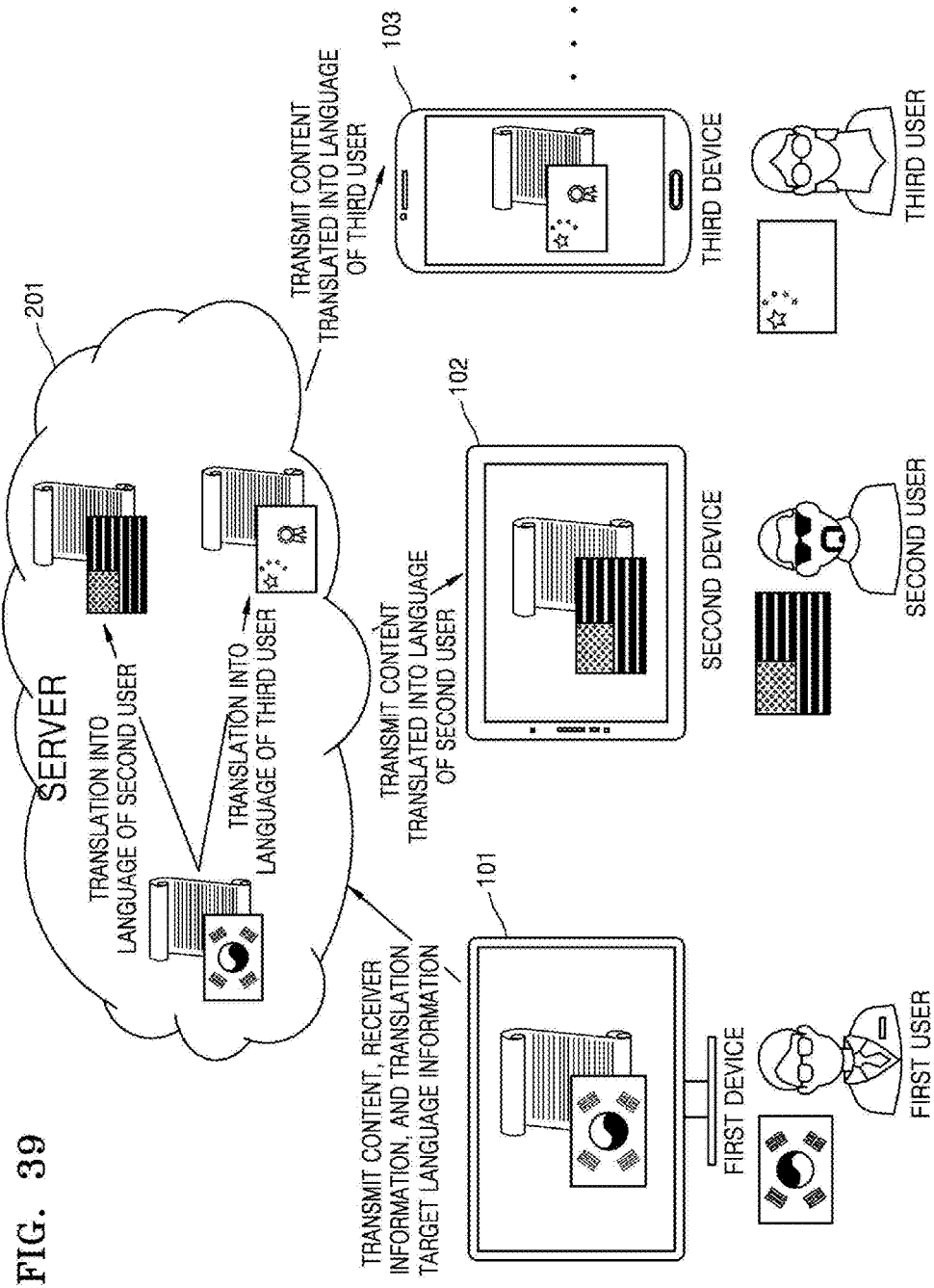
FIG. 39 is a diagram illustrating a method for translating content other than content attached to mail and providing the translated content according to an exemplary embodiment.

FIG. 39 is a diagram illustrating a method for translating content other than content attached to mail and providing the translated content according to an exemplary embodiment.

Referring to FIG. 39, according to an exemplary embodiment, the first device 101 may transmit mail and various types of data to at least one of the second device 102 and the third device 103 through the server.

According to an exemplary embodiment, the first device 101 may perform a voice call operation with the second device 102 through the server. That is, the first device 101 may transmit voice data to the second device 102. Also, according to an exemplary embodiment, the first device 101 may transmit video information for a video call operation with the third device 103 and may transmit text or image data for chatting.

Figure 40:
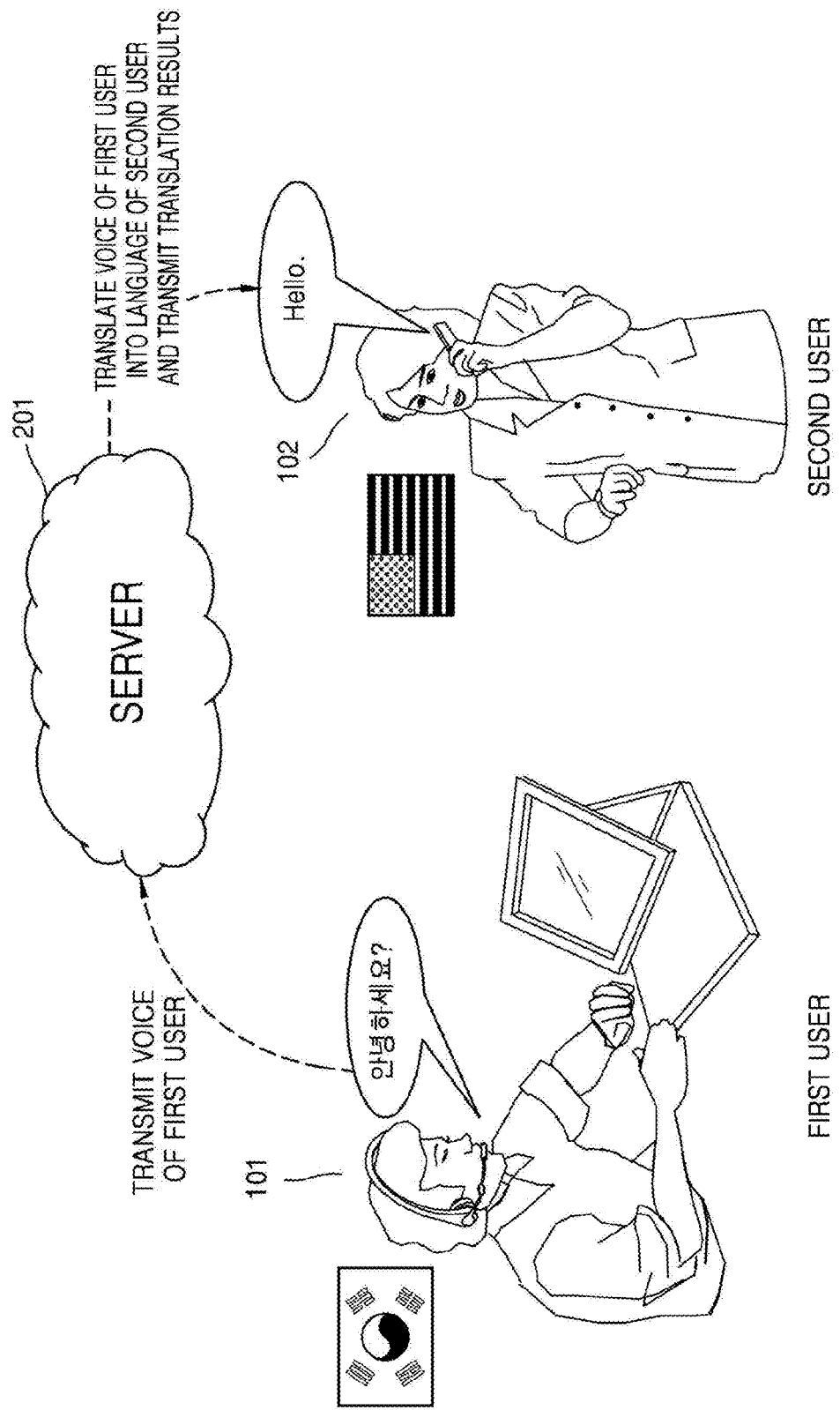
FIG. 40 is a diagram illustrating a method for translating voice call content and providing the translated content according to an exemplary embodiment.

FIG. 40 is a diagram illustrating a method for translating voice call content and providing the translated content according to an exemplary embodiment.

Referring to FIG. 40, the first device 101 may transmit voice data of the first user to the server or the second device 102. According to an exemplary embodiment, the first user data may be audio data. According to an exemplary embodiment, the server 201 may translate the voice data of the first user into the language of the second user and transmit the translated voice data to the second device 102 used by the second user. As described above, the translation may be performed by one of the first device 101, the second device 102, and the server 201. Voice call data of the first user may be translated and provided to the second user in real time.

According to an exemplary embodiment, at least one of the first device 101 and the server 201 may acquire the receiver information and determine the translation target language, which is the language corresponding to the receiver, based on the acquired receiver information. Also, according to an exemplary embodiment, the second device 102 may acquire the translation target language from the first device 101 or the server 201 or determine the translation target language based on the user input and perform a translation. Since this feature corresponds to a feature described above, a detailed description thereof will be omitted for conciseness.

According to an exemplary embodiment, the voice data may be converted into text data, the text data may be translated, and the translated text data may be provided to the second device 102. Also, the voice data may be converted into text data, the text data may be translated, and the translated text data may be reconverted into voice data; however, exemplary embodiments are not limited thereto.

Figure 41:
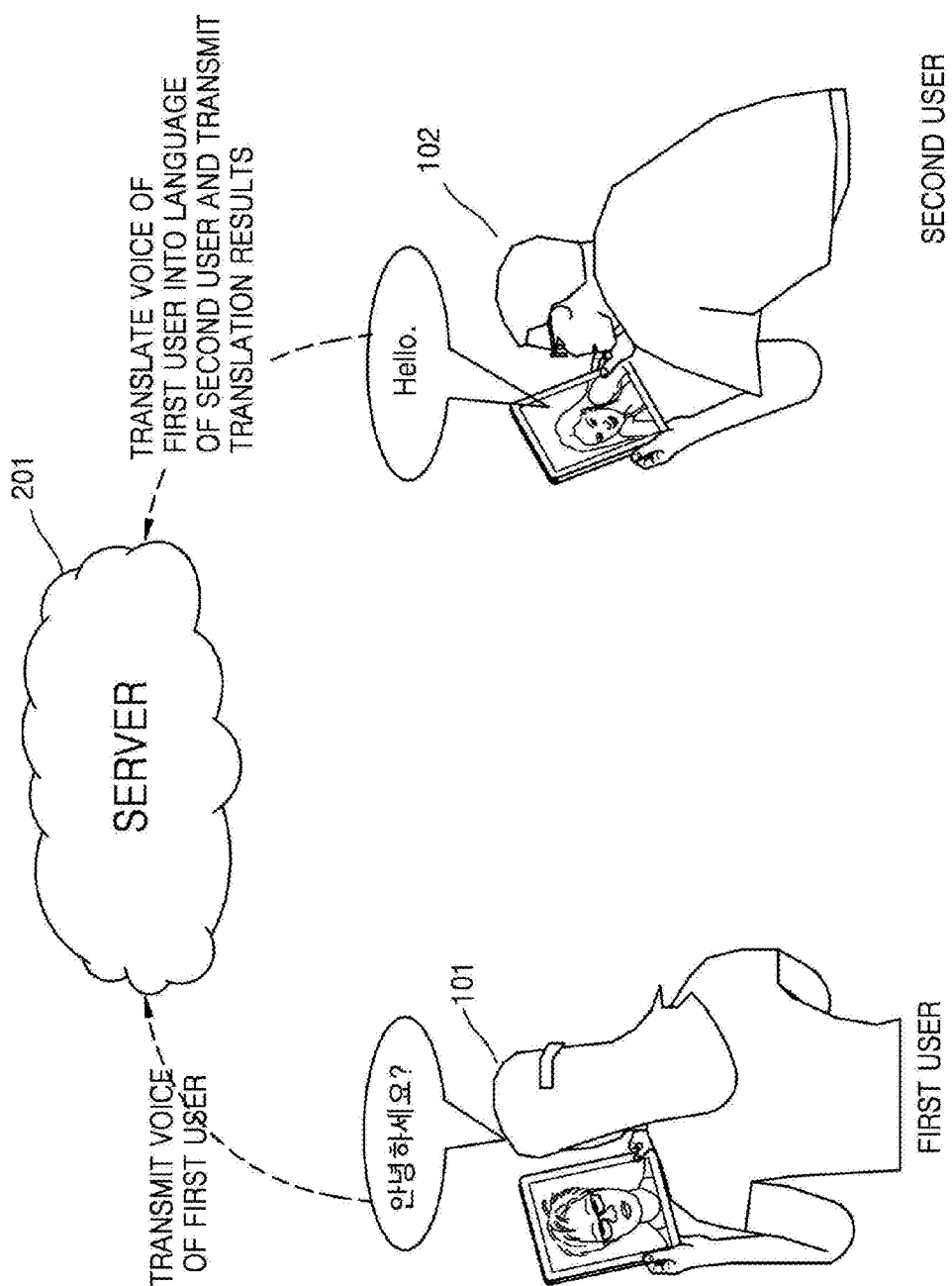
FIG. 41 is a diagram illustrating a method for translating video call content and providing the translated content according to an exemplary embodiment.

FIG. 41 is a diagram illustrating a method for translating video call content and providing the translated content according to an exemplary embodiment.

Referring to FIG. 41, the first device 101 may transmit video call data of the first user to the server 201 or the second device 102. According to an exemplary embodiment, the video call data may include audio data and video data. The server 201 may translate the video call data of the first user into the language of the second user and transmit the translated video call data to the second device 102 used by the second user. As described above, the translation may be performed by one of the first device 101, the second device 102, and the server 201.

According to an exemplary embodiment, at least one of the first device 101 and the server 201 may acquire the receiver information and determine the translation target language, which is the language corresponding to the receiver, based on the acquired receiver information. Also, according to an exemplary embodiment, the second device 102 may acquire the translation target language from the first device 101 or the server 201 or determine the translation target language based on the user input and perform a translation. Since this feature corresponds to a feature described above, detailed descriptions thereof will be omitted for conciseness.

According to an exemplary embodiment, the translation of the video call data may refer to the translation of the audio data or the translation of the text included in the video data. The video data may include at least one frame, and the frame may include image data. The text included in the image data may be parsed and translated. The video call data of the first user may be translated and provided to the second user in real time.

Figure 42:
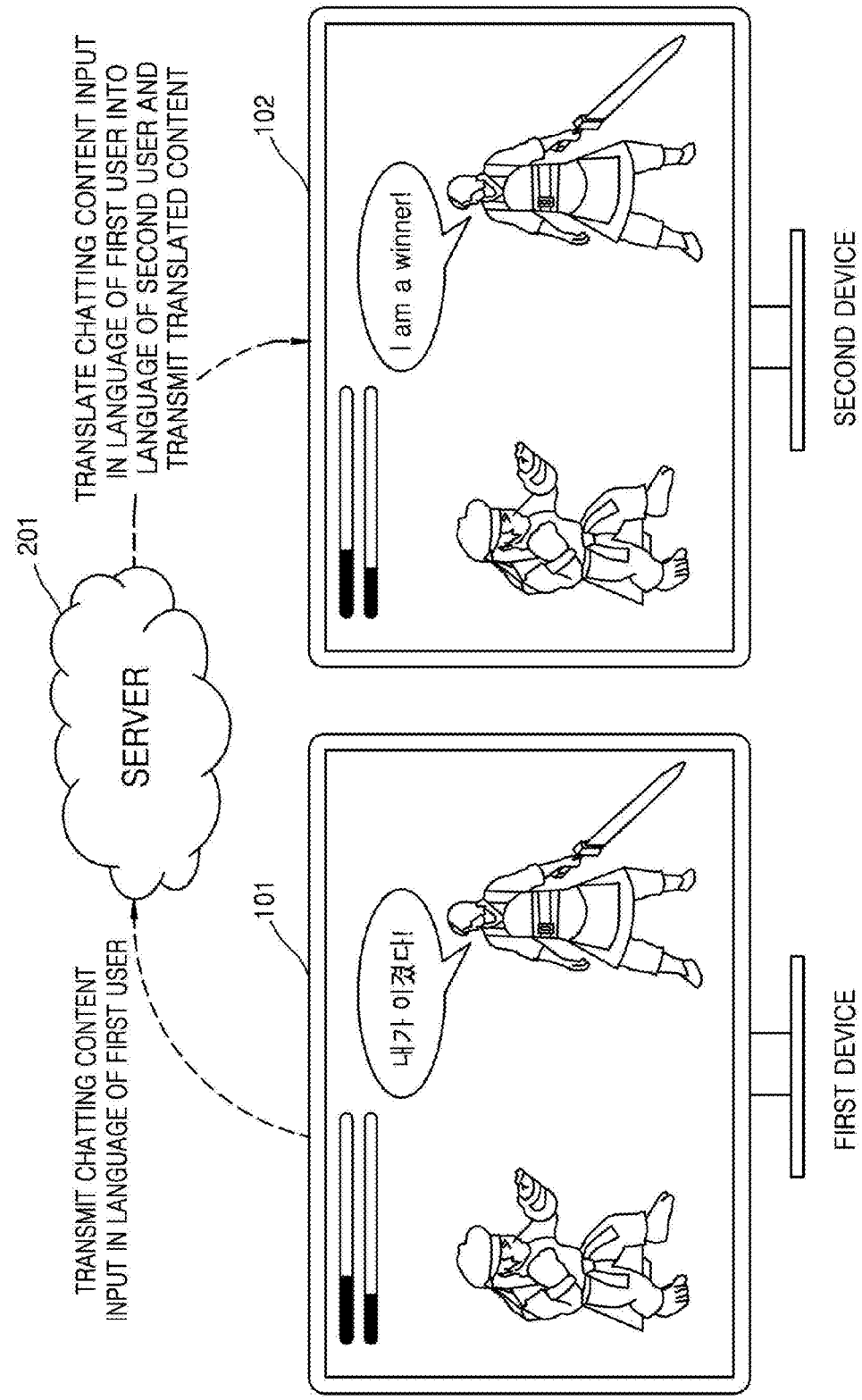
FIG. 42 is a diagram illustrating a method for translating chatting content and providing the translated content according to an exemplary embodiment.

FIG. 42 is a diagram illustrating a method for translating chatting content and providing the translated content according to an exemplary embodiment.

Referring to FIG. 42, the first device 101 may transmit chatting data of the first user to the server 201 or the second device 102. According to an exemplary embodiment, the chatting data may include text data. That is, the chatting data may include text data that is transmitted or received bidirectionally and sequentially. The server 201 may translate the chatting data of the first user into the language of the second user and transmit the translated chatting data to the second device 102 used by the second user. As described above, the translation may be performed by one of the first device 101, the second device 102, and the server 201.

According to an exemplary embodiment, the image data may be transmitted together with the chatting data as illustrated in FIG. 42. According to an exemplary embodiment, the text included in the image data transmitted together with the chatting data may also be translated and provided. Since the method of selecting the translation subject and the translation target language corresponds to features described above, detailed descriptions thereof will be omitted for conciseness.

Figure 43:
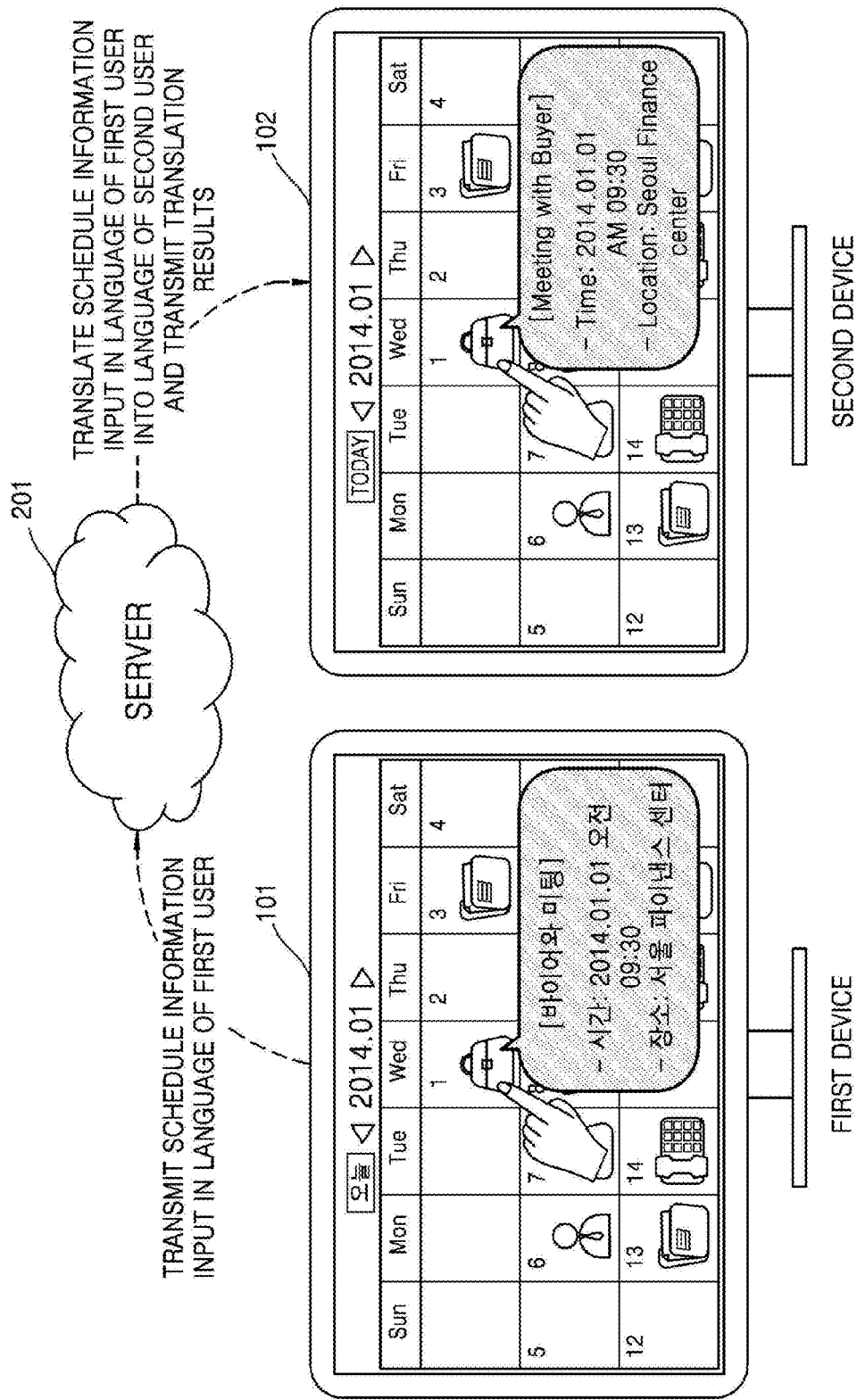
FIG. 43 is a diagram illustrating a method for translating schedule content and providing the translated content according to an exemplary embodiment.

FIG. 43 is a diagram illustrating a method for translating schedule content and providing the translated content according to an exemplary embodiment.

Referring to FIG. 43, the first device 101 may transmit the content including the schedule information to the server 201. The server 201 may translate the content including the schedule information and provide the translation content to the second device. Of course, as described above, the translation may be performed by many devices, such as one of the first device 101, the second device 102, and the server 201.

According to an exemplary embodiment, when the content including the schedule information is translated, the time information included in the schedule information may be converted and provided with respect to the user of the first device (e.g., the transmitter) or the user of the second device (e.g., the receiver).

Figure 44:
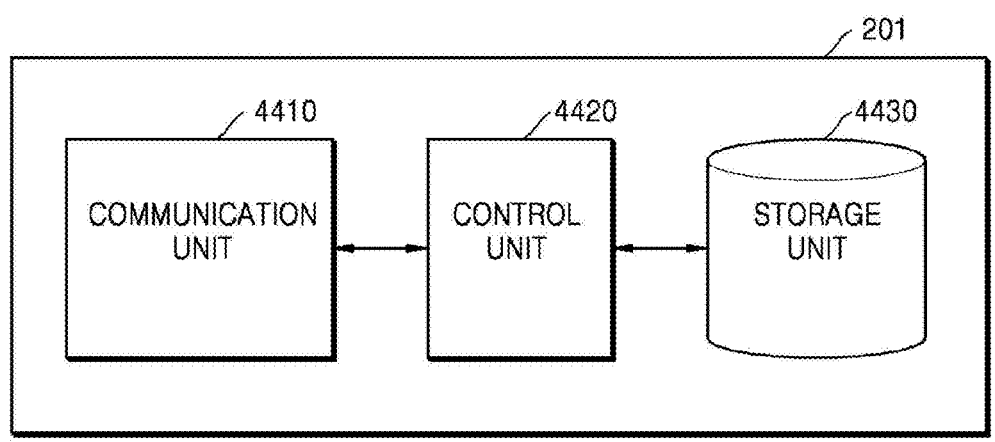
FIG. 44 is a block diagram of a server according to an exemplary embodiment.

FIG. 44 is a block diagram of a server according to an exemplary embodiment.

Referring to FIG. 44, a server 201 according to an exemplary embodiment may include a communication unit 4410 (e.g., communicator), a control unit 4420 (e.g., controller), and a storage unit 4430 (e.g., storage).

According to an exemplary embodiment, the communication unit 4410 may receive mail, content, and receiver information from the first device 101. Also, the communication unit 4410 may receive a translation request from the first device 101. According to an exemplary embodiment, the communication unit 4410 may receive transmitter information and translation target language information. Also, according to an exemplary embodiment, the communication unit 4410 may receive a content transmission request from at least one device.

According to an exemplary embodiment, the control unit 4420 may translate content. The control unit 4420 may determine a translation target language based on the receiver information and translate the content based on the determined translation target language. Also, according to an exemplary embodiment, the control unit 4420 may translate the content based on the translation target language information. Also, according to an exemplary embodiment, the control unit 4420 may read content from the storage unit 4430.

According to an exemplary embodiment, the storage unit 4430 may include a database (DB). According to an exemplary embodiment, the storage unit 4430 may store content and transmission/reception history information. Also, according to other exemplary embodiments, the storage unit 4430 may store receiver information, transmitter information, and the like.

Figure 45:
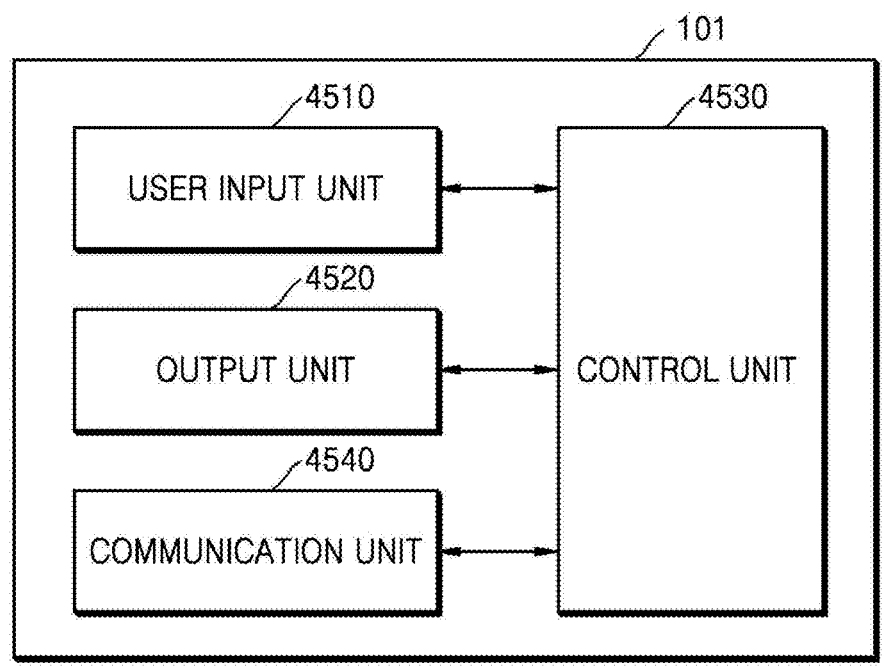
FIGS. 45 and 46 are block diagrams of a device according to exemplary embodiments.
Figure 46:
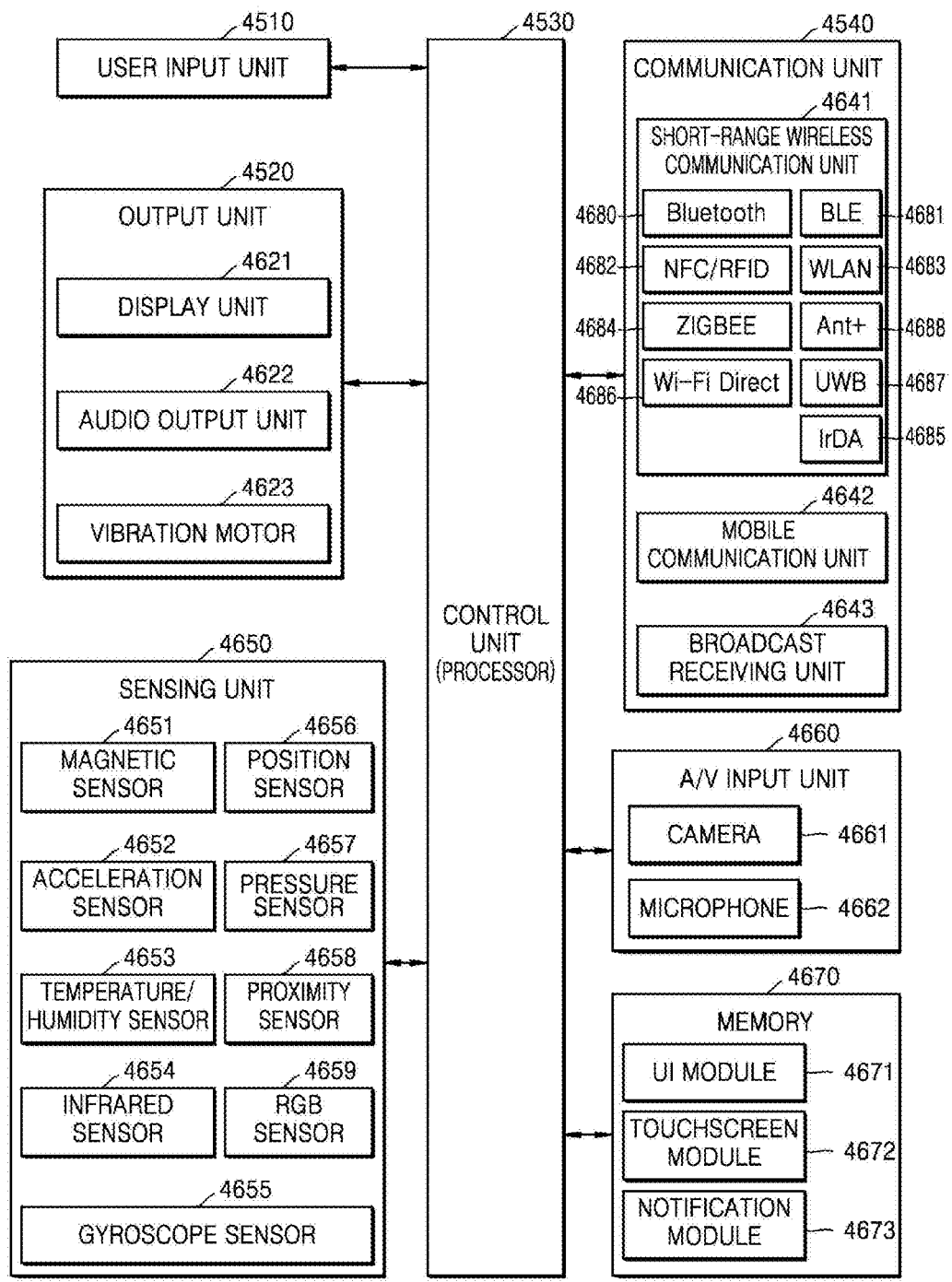

FIGS. 45 and 46 are block diagrams of the first device 101 according to exemplary embodiments.

Referring to FIG. 45, the first device 101 according to an exemplary embodiment may include a user input unit 4510 (e.g., user inputter), an output unit 4520 (e.g., outputter), a control unit 4530 (e.g., controller), and a communication unit 4540 (e.g., communicator).

According to an exemplary embodiment, the user input unit 4510 may acquire receiver information about a receiver and content. According to an exemplary embodiment, the user input unit 4510 may acquire content to be included in mail. Since the receiver information corresponds to the receiver information described above, a detailed description thereof will be omitted for conciseness.

Also, according to an exemplary embodiment, the user input unit 4510 may acquire an external signal for selecting a language. The control unit 4530 may determine a language corresponding to the receiver based on at least one of the receiver information and the external signal.

Also, according to an exemplary embodiment, the user input unit 4510 may acquire receiver mail account information, receiver identification value information, and receiver name information based on user input and acquire other information included in the receiver information based on the receiver mail account information, the receiver identification value information, and the receiver name information. Also, the user input unit 4510 may acquire the receiver information based on at least one of address book information, content transmission/reception history information, and receiver-related information included in the content.

Also, according to an exemplary embodiment, the user input unit 4510 may select content, acquire user input for selecting the receiver, or receive input of receiver identification information indicating the receiver and content to be transmitted to the receiver.

According to an exemplary embodiment, the output unit 4520 may display an object into which the receiver information is input. Also, the output unit 4520 may display respective fields in which information is included.

Also, according to an exemplary embodiment, the output unit 4520 may display content. According to an exemplary embodiment, the output unit 4520 may display translated content or may display original content and translated content. In addition, the output unit 4520 may display various types of information together with the content. Since this feature corresponds to a feature described above, a detailed description thereof will be omitted for conciseness.

According to an exemplary embodiment, the control unit 4530 may determine a language corresponding to the receiver.

According to an exemplary embodiment, the control unit 4530 may translate the content in a determined language. For example, the control unit 4530 may determine a language corresponding to the receiver based on the receiver information input by the user input unit 4510, and translate the content based on the determined language. Since this feature corresponds to a feature described above, a detailed description thereof will be omitted for conciseness.

Also, according to an exemplary embodiment, the control unit 4530 may determine a language corresponding to the receiver corresponding to the receiver identification information based on the address book information. The address book information may be stored in a storage unit.

According to an exemplary embodiment, the communication unit 4540 may transmit the mail and the content to the server 201 or the second device 102. Also, the communication unit 4540 may transmit a content translation request to the server 201 or the second device 102. Also, according to an exemplary embodiment, the communication unit 4540 may transmit at least one of the transmitter information, the receiver information, and the translation target language information to the server 201.

According to an exemplary embodiment, when the content included in the mail includes link information of a web page address, the communication unit 4540 may transmit a request for translation of the content included in the web page to the server 201 or the second device 102.

Also, according to an exemplary embodiment, the communication unit 4540 may transmit a content transmission request to the server 201 and may receive a content transmission request from the server 201 or the second device 102.

Also, the communication unit 4540 may receive the original content or the translated content from another device.

According to an exemplary embodiment, the second device 102 and the third device 103 may have the same structure as the first device 101.

FIG. 46 is a block diagram of the first device 101 according to an exemplary embodiment.

Referring to FIG. 46, the first device 101 according to an exemplary embodiment may include the user input unit 4510, the output unit 4520, the control unit 4530, the communication unit 4540, a sensing unit 4650 (e.g., sensor), an audio/video (A/V) input unit 4660 (e.g., audio/video (A/V) inputter), and a memory 4670.

Since the operations of the user input unit 4510 correspond to operations described above, detailed descriptions thereof will be omitted for conciseness.

According to an exemplary embodiment, the output unit 4520 may include a display unit 4621 (e.g., display), an audio output unit 4622 (e.g., audio outputter), and a vibration motor 4623.

The output unit 4520 may output an audio signal, a video signal, or a vibration signal.

The display unit 4621 may display information processed in the first device 101.

The display unit 4621 may include a touchscreen with a layer structure of a touch pad, and thus may be used as an input device in addition to an output device. The display unit 4621 may include at least one of a liquid crystal display (LCD), a thin film transistor liquid crystal display (TFT-LCD), an organic light-emitting diode (OLED) display, a flexible display, a three-dimensional (3D) display, and an electrophoretic display. Also, the first device 101 may include two or more display units 4621 according to exemplary embodiments. In this case, the two or more display units 4621 may be disposed to face each other through a hinge structure.

The audio output unit 4622 may output audio data received from the communication unit 4540 or stored in the memory 4670. Also, the audio output unit 4622 may output audio signals related to functions (e.g., call signal reception, message reception, and notification) performed in the first device 101. The audio output unit 4622 may include a speaker and a buzzer.

The vibration motor 4623 may output a vibration signal. For example, the vibration motor 4623 may output a vibration signal corresponding to an output of audio data or video data (e.g., a call signal reception sound and a message reception sound). Also, the vibration motor 4623 may output a vibration signal when a touch is input to the touchscreen.

Since the operations of the output unit 4520 correspond to operations described above, detailed descriptions thereof will be omitted for conciseness.

The control unit 4530 may control an overall operation of the first device 101. Since this feature corresponds to a feature described above, a detailed description thereof will be omitted for conciseness.

The communication unit 4540 may include one or more elements for enabling communication between the first device 101 and the server 201 or between the first device 101 and the second device 102. For example, the communication unit 4540 may include a short-range wireless communication unit 4641 (e.g., short-range wireless communicator), a mobile communication unit 4642 (e.g., mobile communicator), and a broadcast receiving unit 4643 (e.g., broadcast receiver).

The short-range wireless communication unit 4641 may include, but is not limited to including, a Bluetooth communication unit 4680 (e.g., Bluetooth communicator), a Bluetooth Low Energy (BLE) communication unit 4681

(e.g., Bluetooth Low Energy (BLE) communicator), a near field communication unit 4682 (e.g., near field communicator), a WLAN (WiFi) communication unit 4683 (e.g., WLAN (WiFi) communicator), a ZigBee communication unit 4684 (e.g., Zigbee communicator), an infrared data association (IrDA) communication unit 4685 (e.g., infrared data association (IrDA) communicator), a WiFi Direct (WFD) communication unit 4686 (e.g., WiFi Direct (WFD) communicator), a ultra wideband (UWB) communication unit 4687 (e.g., ultra wideband (UWB) communicator), and an Ant+ communication unit 4688 (e.g., Ant+ communicator).

The mobile communication unit 4642 may communicate wireless signals with at least one of a base station, an external terminal, and a server on a mobile communication network. Herein, the wireless signals may include voice call signals, video call signals, or various types of data for transmission and reception of text or multimedia messages.

The broadcast receiving unit 4643 may receive broadcast signals and/or broadcast-related information from external devices through broadcast channels. The broadcast channels may include satellite channels and terrestrial channels. In some exemplary embodiments, the first device 101 may not include the broadcast receiving unit 4643. Since the operations of the communication unit 4540 correspond to operations described above, detailed descriptions thereof will be omitted for conciseness.

The sensing unit 4650 may detect a state of the first device 101 or a peripheral state of the first device 101 and transmit the detected information to the control unit 4530.

The sensing unit 4650 may include, but is not limited to including, at least one of a magnetic sensor 4651, an acceleration sensor 4652, a temperature/humidity sensor 4653, an infrared sensor 4654, a gyroscope sensor 4655, a position sensor (e.g., GPS sensor) 4656, a pressure sensor 4657, a proximity sensor 4658, and an RGB sensor 4659. Since those of ordinary skill in the art may intuitively infer the respective functions of the various types of sensors included in the sensing unit 4650 from the respective names thereof, detailed descriptions thereof will be omitted.

The A/V input unit 4660 may be used to input audio signals or video signals and may include a camera 4661 and a microphone 4662. The camera 4661 may obtain a video frame such as a still image or a moving image through an image sensor in a video call mode or a photographing mode. The image captured through the image sensor may be processed by the control unit 4530 or a separate image processing unit.

The image frame processed by the camera 4661 may be stored in the memory 4670, or may be transmitted to an external device through the communication unit 4540. Two or more cameras 4661 may be provided according to the configurations of the first device 101.

The microphone 4662 may receive an input of an external audio signal and process the same into electrical audio data. For example, the microphone 4662 may receive an audio signal from the second device 102 or the user. The microphone 4662 may use various noise cancellation algorithms for cancelling a noise that may be generated during the input of an external audio signal.

According to an exemplary embodiment, the memory 4670 may be a portion of the storage unit. The memory 4670 may store a program for processing and control operations performed by the control unit 4530 and may store data input or output to or from the first device 101. According to an exemplary embodiment, the memory 4670 may store address book information including receiver identification information about receivers. The address book information may include receiver nation information and receiver language information as described above.

The memory 4670 may include at least one type of storage medium from among flash memory type, hard disk type, multimedia card micro type, card type memory (e.g., SD and XD memories), random-access memory (RAM), static random-access memory (SRAM), read-only memory (ROM), electronically erasable programmable read-only memory (EEPROM), programmable read-only memory (PROM), magnetic memory, magnetic disk, and optical disk.

The programs stored in the memory 4670 may be classified into a plurality of modules according to their functions and may be classified into, for example, a user interface (UI) module 4671, a touchscreen module 4672, and a notification module 4673.

The UI module 4671 may provide a specialized UI and a graphical user interface (GUI) that interlock with the first device 101. The touchscreen module 4672 may sense a touch gesture of the user on a touchscreen and transfer information about the touch gesture to the control unit 4530. In some exemplary embodiments, the touchscreen module 4672 may detect and analyze a touch code. The touchscreen module 4672 may include separate hardware including a controller.

Various sensors may be provided in or near the touchscreen to sense a proximity touch or a touch to the touchscreen. An example of the sensor for sensing a touch to the touchscreen is a tactile sensor. The tactile sensor refers to a sensor that senses a touch of an object with the precision of a human touch or even greater precision. The tactile sensor may sense a variety of information, such as the roughness of a touch surface, the hardness of a touch object, and the temperature of a touch point.

Another example of the sensor for sensing a touch to the touchscreen is a proximity sensor.

The proximity sensor refers to a sensor that detects the presence of an object approaching a detection surface or an object located in the proximity thereof without mechanical contact by using an electromagnetic force or infrared rays. Examples of the proximity sensor may include transmission type photoelectric sensors, direct reflection type photoelectric sensors, mirror reflection type photoelectric sensors, high frequency oscillation type proximity sensors, electrostatic capacity type proximity sensors, magnetic type proximity sensors, and infrared proximity sensors. Examples of the touch gesture of the user may include tap, touch & hold, double tap, drag, panning, flick, drag & drop, and swipe.

The notification module 4673 may generate a signal for notifying the occurrence of an event in the first device 101. Examples of the event occurring in the first device 101 may include call signal reception, message (e.g., mail or content) reception, key signal input, and schedule notification. The notification module 4673 may output a notification signal of a video signal type through the display unit 4621, output a notification signal of an audio signal type through the audio output unit 4622, and output a notification signal of a vibration signal type through the vibration motor 4623. Since the operations of the memory 4670 correspond to operations described above, detailed descriptions thereof will be omitted for conciseness.

According to an exemplary embodiment, the second device 102 and the third device 103 may have the same structure as the first device 101, although are not limited thereto.

The apparatuses according to the exemplary embodiments may include a processor, a memory for storing and executing program data, a permanent storage such as a disk drive, a communication port for communicating with an external device, and user interface (UI) devices such as a touch panel, keys, and buttons. The methods implemented by software modules or algorithms may be stored on a computer-readable recording medium as computer-readable codes or program commands that are executable on the processor. Examples of the computer-readable recording medium include magnetic storage media (e.g., read-only memories (ROMs), random-access memories (RAMs), floppy disks, and hard disks) and optical recording media (e.g., compact disk read-only memories (CD-ROMs) and digital versatile disks (DVDs)). The computer-readable recording medium may also be distributed over network-coupled computer systems so that the computer-readable codes may be stored and executed in a distributed fashion. The computer-readable recording medium is readable by a computer, and may be stored in a memory and executed in a processor.

All references, including publications, patent applications, and patents, cited herein may be hereby incorporated by reference to the same extent as if each reference is individually and specifically indicated to be incorporated by reference or is set forth in its entirety herein.

For the purpose of promoting an understanding of the exemplary embodiments, reference has been made to certain exemplary embodiments illustrated in the drawings, and particular terms have been used to describe the exemplary embodiments. However, the scope of the inventive concept is not limited by the particular terms, and the inventive concept may encompass all elements that may be generally conceived by those of ordinary skill in the art.

The exemplary embodiments may be described in terms of functional block components and various processing operations. Such functional blocks may be implemented by any number of hardware and/or software components that execute particular functions. For example, the exemplary embodiments may employ various integrated circuit (IC) components, such as memory elements, processing elements, logic elements, and lookup tables, which may execute various functions under the control of one or more microprocessors or other control devices. Similarly, where the elements of the exemplary embodiments may be implemented by software programming or software elements, the exemplary embodiments may be implemented by any programming or scripting language such as C, C++, Java, or assembly language, with various algorithms being implemented by any combination of data structures, processes, routines, or other programming elements. Functional aspects may be implemented by an algorithm that is executed in one or more processors. Also, the exemplary embodiments may employ the related art for electronic environment setting, signal processing, and/or data processing. Terms such as "mechanism", "element", "unit", and "configuration" may be used in a broad sense, and are not limited to mechanical and physical configurations. The terms may include the meaning of software routines in conjunction with processors or the like.

Particular implementations described herein are merely exemplary, and do not limit the scope of the inventive concept in any way. For the sake of conciseness, descriptions of related art electronic configurations, control systems, software, and other functional aspects of the systems may be omitted. Also, the connection lines or connection members between various elements illustrated in the drawings represent exemplary functional connections and/or physical or logical connections between the various elements, and various alternative or additional functional connections, physical connections, or logical connections may be present in an apparatus implemented according to exemplary embodiments. Also, no element may be essential to the practice of the exemplary embodiments unless the element is specifically described as "essential" or "critical".

The use of the terms "a", "an", and "the" and similar referents in the context of the specification (especially in the context of the following claims) may be construed to cover both the singular and the plural. Also, recitation of a range of values herein are merely intended to serve as a shorthand method of referring individually to each separate value falling within the range, unless otherwise indicated herein, and each separate value is incorporated into the specification as if the separate value was individually recited herein. Also, the operations of the method described herein may be performed in any suitable order unless otherwise indicated herein or otherwise clearly contradicted by the context. The scope of the inventive concept is not limited to the above-described operation order. All examples or exemplary terms (e.g., "such as") provided herein are merely used to describe the exemplary embodiments in detail, and the scope of the inventive concept is not limited by the examples or exemplary terms. Also, those of ordinary skill in the art will readily understand that various modifications and combinations may be made according to design conditions and factors without departing from the spirit and scope of the exemplary embodiments as defined by the following claims.

As described above, according to the exemplary embodiments, the translated content may be provided based on the language used by the content receiver. Also, the attached file attached to the content may be translated based on the language used by the content receiver. Also, the content translation target language information may be acquired by analyzing the content details. Also, the content transmitter-related information may be provided together with the translated content.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electronic device comprising:
a display;
a memory storing instructions; and
a processor configured to execute the instructions that are stored to:
acquire content to be sent to a plurality of mail accounts, the content comprising text included in a text body, and the plurality of mail accounts being electronic mail accounts;
display, on the display, a plurality of translation option icons corresponding to the plurality of mail accounts, respectively;
generate a plurality of inquiries corresponding to the plurality of mail accounts, respectively, based on information estimated as receiver-related information included in the text of the text body of the content;
acquire, based on an input to a corresponding translation option icon for each of the plurality of mail accounts, translation option information indicating whether to perform translation for the plurality of mail accounts;

acquire, based on the plurality of inquiries corresponding to the plurality of mail accounts, respectively, translation language information indicating a translation language for the plurality of mail accounts;

determine whether to perform the translation, and a translation language for each of the plurality of mail accounts, based on the translation option information and the translation language information for the plurality of mail accounts; and transmit, to a server, a request for translating the content, based on the determination, wherein the content comprises a first Web page address linking to a first Web page comprising first text in a language corresponding to the electronic device, the request comprises instructions instructing the server to convert the first Web page address to a second Web page address linking to a second Web page comprising second text in a translation language corresponding to one of the plurality of mail accounts, and the second Web page corresponds to the first Web page.

2. The electronic device of claim 1, wherein the processor is further configured to execute the instructions that are stored to acquire identification information of each of the plurality of mail accounts, and the identification information comprises at least one of mail account information, phone number information, and name information of each of the plurality of mail accounts.

3. The electronic device of claim 1, wherein the content is related to electronic mail to be transmitted to each of the plurality of mail accounts.

4. The electronic device of claim 1, wherein the processor is further configured to execute the instructions that are stored to display an object into which the information regarding the content is to be input.

5. The electronic device of claim 1, wherein the processor is further configured to execute the instructions that are stored to display an object into which identification information is to be input.

6. The electronic device of claim 1, wherein the processor is further configured to execute the instructions that are stored to request the server to translate content included in the first Web page based on the determination.

7. The electronic device of claim 1, wherein the processor is further configured to execute the instructions that are stored to transmit the content to the server in response to receiving a content transmission request for the content.

8. The electronic device of claim 1, wherein the processor is further configured to:
execute the instructions that are stored to receive additional content from the server;
translate the additional content that is received; and
output the additional content that is translated.

9. A method for providing translated content, the method comprising:
acquiring, by a device, content to be sent to a plurality of mail accounts, the content comprising text included in a text body, and the plurality of mail accounts being electronic mail accounts;
displaying, on a display of the device, a plurality of translation option icons corresponding to the plurality of mail accounts, respectively;
generating a plurality of inquiries corresponding to the plurality of mail accounts, respectively, based on information estimated as receiver-related information included in the text of the text body of the content;
acquiring, based on an input to a corresponding translation option icon for each of the plurality of mail accounts, translation option information indicating whether to perform translation for the plurality of mail accounts;
acquiring, based on the plurality of inquiries corresponding to the plurality of mail accounts, respectively, translation language information indicating a translation language for the plurality of mail accounts;
determining, by the device, whether to perform the translation, and a translation language for each of the plurality of mail accounts, based on the translation option information and the translation language information for the plurality of mail accounts; and
transmitting, by the device, a request for translating the content to a server, based on the determining,
wherein the content comprises a first Web page address linking to a first Web page comprising first text in a language corresponding to the device,
the request comprises instructions instructing the server to convert the first Web page address to a second Web page address linking to a second Web page comprising second text in a translation language corresponding to one of the plurality of mail accounts, and
the second Web page corresponds to the first Web page.

10. The method of claim 9, further comprising acquiring identification information of each of the plurality of mail accounts, wherein the identification information comprises at least one of mail account information, phone number information, and name information of each of the plurality of mail accounts.

11. The method of claim 9, wherein the content is related to electronic mail to be transmitted to the plurality of mail accounts.

12. The method of claim 9, further comprising displaying, on the display of the device, an object into which the information regarding the content is to be input.

13. The method of claim 9, further comprising displaying, on the display of the device, an object into which identification information is to be input.

14. The method of claim 9, wherein the transmitting, by the device, of the request for translating the content comprises requesting the server to translate content included in the first Web page based on the determining.

15. The method of claim 9, wherein the transmitting, by the device, of the request for translating the content comprises:
receiving, by the device, a content transmission request for the content; and
transmitting, by the device, the content to the server.

16. The method of claim 9, further comprising:
receiving, by the device, additional content from the server;
translating, by the device, the additional content that is received; and
outputting, by the device, the additional content that is translated.

* * * * *